US012066769B2

(12) United States Patent
Sato et al.

(10) Patent No.: US 12,066,769 B2
(45) Date of Patent: Aug. 20, 2024

(54) TONER CONTAINER HAVING A SHUTTER AND AN ENGAGING PORTION EXPOSED FROM THE SHUTTER

(71) Applicant: CANON KABUSHIKI KAISHA, Tokyo (JP)

(72) Inventors: Masaaki Sato, Kanagawa (JP); Hiroyuki Munetsugu, Kanagawa (JP); Isao Koishi, Kanagawa (JP); Hiroshi Takarada, Kanagawa (JP); Shohei Katsuya, Kanagawa (JP); Shunsuke Hijikata, Kanagawa (JP); Goshi Ozaki, Kanagawa (JP); Mitsuhiro Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/073,733

(22) Filed: Dec. 2, 2022

(65) Prior Publication Data

US 2023/0096202 A1 Mar. 30, 2023

Related U.S. Application Data

(63) Continuation of application No. PCT/JP2021/013825, filed on Mar. 31, 2021.

(30) Foreign Application Priority Data

Jun. 8, 2020 (JP) ................................. 2020-099728
Mar. 17, 2021 (JP) ................................. 2021-043868

(51) Int. Cl.
*G03G 15/08* (2006.01)

(52) U.S. Cl.
CPC ..... *G03G 15/0868* (2013.01); *G03G 15/0863* (2013.01); *G03G 15/0886* (2013.01);
(Continued)

(58) Field of Classification Search
USPC ........................................................ 399/258
See application file for complete search history.

(56) References Cited

U.S. PATENT DOCUMENTS 6,363,233 B1 3/2002 Nakajima
7,003,247 B2 2/2006 Koishi
(Continued)

FOREIGN PATENT DOCUMENTS

JP H08-030084 A 2/1996
JP H08-179611 A 7/1996
(Continued)

OTHER PUBLICATIONS

International Search Report for International Patent Application No. PCT/JP2021/031825.
(Continued)

*Primary Examiner* — Quana Grainger
(74) *Attorney, Agent, or Firm* — Venable LLP

(57) ABSTRACT

A toner container includes a toner storage unit, a container base portion including a discharge port provided on an outer surface of the container base portion, the outer surface extending in a first direction, the discharge port communicating with the toner storage unit, and a container shutter configured to be rotatable about a rotation axis extending in a direction along the first direction between a shielding position and an open position. The container base portion includes an engaging portion configured to be engaged with an engaged portion of the image forming apparatus so that rotation of the container base portion with respect to the image forming apparatus about the rotation axis is restricted. At least a part of the engaging portion of the container base portion is exposed from the container shutter in a case where the container shutter is in the shielding position.

20 Claims, 64 Drawing Sheets

(52) U.S. Cl.
CPC ............... *G03G 2215/0682* (2013.01); *G03G 2215/0692* (2013.01)

(56) References Cited

U.S. PATENT DOCUMENTS

| | | | |
|---|---|---|---|
| 7,046,938 | B2 | 5/2006 | Yamamoto |
| 7,072,601 | B2 | 7/2006 | Kakitani |
| 7,139,502 | B2 | 11/2006 | Koishi |
| 7,149,457 | B2 | 12/2006 | Miyabe |
| 7,155,140 | B2 | 12/2006 | Arimitsu |
| 7,155,141 | B2 | 12/2006 | Sato |
| 7,158,736 | B2 | 1/2007 | Sato |
| 7,158,749 | B2 | 1/2007 | Ueno |
| 7,164,873 | B2 | 1/2007 | Yamamoto |
| 7,200,349 | B2 | 4/2007 | Sato |
| 7,218,882 | B2 | 5/2007 | Toba |
| 7,224,925 | B2 | 5/2007 | Sato |
| 7,283,766 | B2 | 10/2007 | Arimitsu |
| 7,315,710 | B2 | 1/2008 | Ueno |
| 7,321,744 | B2 | 1/2008 | Hosokawa |
| 7,349,657 | B2 | 3/2008 | Sato |
| 7,412,193 | B2 | 8/2008 | Sato |
| 7,457,566 | B2 | 11/2008 | Koishi |
| 7,480,476 | B2 | 1/2009 | Hosokawa |
| 7,499,663 | B2 | 3/2009 | Sato |
| 7,519,317 | B2 | 4/2009 | Hosokawa |
| 7,660,550 | B2 | 2/2010 | Mori |
| 7,689,146 | B2 | 3/2010 | Sato |
| 7,697,870 | B2 | 4/2010 | Hosokawa |
| 7,720,408 | B2 | 5/2010 | Ueno |
| 7,809,299 | B2 | 10/2010 | Yamamoto |
| 7,813,668 | B2 | 10/2010 | Ueno |
| 7,813,671 | B2 | 10/2010 | Nittani |
| 7,835,673 | B2 | 11/2010 | Hosokawa |
| 7,856,192 | B2 | 12/2010 | Koishi |
| 7,890,012 | B2 | 2/2011 | Koishi |
| 8,005,406 | B2 | 8/2011 | Hosokawa |
| 8,139,979 | B2 | 3/2012 | Koishi |
| 8,155,553 | B2 | 4/2012 | Takarada |
| 8,160,478 | B2 | 4/2012 | Munetsugu |
| 8,165,493 | B2 | 4/2012 | Chadani |
| 8,195,070 | B2 | 6/2012 | Hosokawa |
| 8,249,485 | B2 | 8/2012 | Horikawa |
| 8,515,306 | B2 | 8/2013 | Kawai |
| 8,526,841 | B2 | 9/2013 | Koishi |
| 8,559,849 | B2 | 10/2013 | Suzuki |
| 8,781,355 | B2 | 7/2014 | Koishi |
| 8,862,015 | B2 | 10/2014 | Koishi |
| 8,879,944 | B2 | 11/2014 | Takarada |
| 9,052,675 | B2 | 6/2015 | Takarada |
| 9,134,696 | B2 | 9/2015 | Sato |
| 9,213,306 | B2 | 12/2015 | Morioka |
| 9,274,489 | B2 | 3/2016 | Takarada |
| 9,367,025 | B2 | 6/2016 | Takarada |
| 9,377,714 | B2 | 6/2016 | Nakazawa |
| 9,395,679 | B2 | 7/2016 | Kawakami |
| 9,423,767 | B2 | 8/2016 | Fujino |
| 9,429,877 | B2 | 8/2016 | Sato |
| 9,429,906 | B2 | 8/2016 | Yoshimura |
| 9,501,031 | B2 | 11/2016 | Hayashi |
| 9,529,298 | B2 | 12/2016 | Sato |
| 9,632,451 | B2 | 4/2017 | Hayashi |
| 9,688,008 | B2 | 6/2017 | Takarada |
| 9,791,825 | B2 | 10/2017 | Kamoshida |
| 9,804,560 | B2 | 10/2017 | Sato |
| 9,817,338 | B2 | 11/2017 | Hoshi |
| 9,823,619 | B2 | 11/2017 | Kawakami |
| 9,836,020 | B2 | 12/2017 | Yoshimura |
| 9,885,974 | B2 | 2/2018 | Sato |
| 10,139,777 | B2 | 11/2018 | Sato |
| 10,168,664 | B2 | 1/2019 | Yoshimura |
| 10,203,652 | B2 | 2/2019 | Kamoshida |
| 10,228,652 | B2 | 3/2019 | Sato |
| 10,254,712 | B2 | 4/2019 | Uneme |
| 10,353,339 | B2 | 7/2019 | Koishi |
| 10,386,786 | B2 | 8/2019 | Sato |
| 10,401,762 | B2 | 9/2019 | Hoshi |
| 10,401,788 | B2 | 9/2019 | Yoshimura |
| 10,427,867 | B2 | 10/2019 | Koishi |
| 10,459,402 | B2 | 10/2019 | Kashiide |
| 10,509,360 | B2 | 12/2019 | Hijikata |
| 10,534,313 | B2 | 1/2020 | Sugimoto |
| 10,591,868 | B2 | 3/2020 | Yoshimura |
| 10,635,045 | B2 | 4/2020 | Kawakami |
| 10,635,047 | B2 | 4/2020 | Kamoshida |
| 10,671,015 | B2 | 6/2020 | Kamoshida |
| 10,678,185 | B2 | 6/2020 | Uneme |
| 10,705,480 | B2 | 7/2020 | Sato |
| 10,712,708 | B2 | 7/2020 | Sato |
| 10,754,292 | B2 | 8/2020 | Miyoshi |
| 10,782,647 | B2 | 9/2020 | Kashiide |
| 10,824,110 | B2 | 11/2020 | Sugimoto |
| 10,901,365 | B2 | 1/2021 | Sato |
| 10,996,623 | B2 | 5/2021 | Sato |
| 11,036,181 | B2 | 6/2021 | Uneme |
| 11,048,207 | B2 | 6/2021 | Kimura |
| 11,067,950 | B2 | 7/2021 | Kashiide |
| 11,099,521 | B2 | 8/2021 | Uneme |
| 11,112,751 | B2 | 9/2021 | Sato |
| 11,131,960 | B2 | 9/2021 | Sato |
| 11,156,954 | B2 | 10/2021 | Yoshimura |
| 11,163,259 | B2 | 11/2021 | Kawakami |
| 11,175,624 | B2 | 11/2021 | Sugimoto |
| 11,199,807 | B2 | 12/2021 | Kamoshida |
| 11,256,209 | B2 | 2/2022 | Kimura |
| 11,307,529 | B2 | 4/2022 | Sato |
| 11,307,531 | B2 | 4/2022 | Uneme |
| 11,314,199 | B2 | 4/2022 | Sato |
| 11,353,822 | B2 | 6/2022 | Kashiide |
| 11,385,593 | B2 | 7/2022 | Sato |
| 11,520,284 | B2 | 12/2022 | Sato |
| 11,567,445 | B2 | 1/2023 | Munetsugu |
| 11,573,524 | B2 | 2/2023 | Sugimoto |
| 11,579,561 | B2 | 2/2023 | Kamoshida |
| 2004/0223790 | A1 | 11/2004 | Hosokawa et al. |
| 2007/0177905 | A1 | 8/2007 | Hosokawa |
| 2008/0003021 | A1 | 1/2008 | Hosokawa |
| 2008/0286013 | A1 | 11/2008 | Hosokawa |
| 2009/0175660 | A1 | 7/2009 | Hosokawa |
| 2011/0026973 | A1 | 2/2011 | Hosokawa |
| 2011/0249991 | A1 | 10/2011 | Hosokawa |
| 2012/0099887 | A1* | 4/2012 | Shokaku ............ G03G 15/0886 399/102 |
| 2020/0301352 | A1 | 9/2020 | Matsumaru |
| 2021/0263467 | A1 | 8/2021 | Sato |
| 2021/0389720 | A1 | 12/2021 | Kawakami |
| 2021/0405583 | A1 | 12/2021 | Yoshimura |
| 2022/0075312 | A1 | 3/2022 | Ozaki |
| 2022/0137551 | A1 | 5/2022 | Kimura |
| 2022/0155708 | A1 | 5/2022 | Sato |
| 2022/0155722 | A1 | 5/2022 | Kashiide |
| 2022/0197211 | A1 | 6/2022 | Sato |
| 2022/0221820 | A1 | 7/2022 | Ozaki |
| 2022/0283538 | A1 | 9/2022 | Sato |
| 2022/0350292 | A1 | 11/2022 | Sato |
| 2022/0404738 | A1 | 12/2022 | Toba |
| 2022/0413414 | A1 | 12/2022 | Ozaki |
| 2023/0017354 | A1 | 1/2023 | Ozaki |
| 2023/0031856 | A1 | 2/2023 | Munetsugu |
| 2023/0048100 | A1 | 2/2023 | Matsumaru |
| 2023/0082891 | A1 | 3/2023 | Koishi et al. |
| 2023/0093103 | A1 | 3/2023 | Yoshimura et al. |

FOREIGN PATENT DOCUMENTS

| | | | |
|---|---|---|---|
| JP | 2004-280064 | A | 10/2004 |
| JP | 2005-300911 | A | 10/2005 |
| JP | 2012-093460 | A | 5/2012 |

OTHER PUBLICATIONS

Co-pending U.S. Appl. No. 18/076,576, filed Dec. 7, 2022.
Co-pending U.S. Appl. No. 18/112,610, filed Feb. 22, 2023.

(56) References Cited

OTHER PUBLICATIONS

Co-pending U.S. Appl. No. 18/117.557, filed Mar. 6, 2023.
Co-pending U.S. Appl. No. 18/098,766, filed Jan. 19, 2023.
Co-pending U.S. Appl. No. 18/106,584, filed Feb. 7, 2023.
Co-pending U.S. Appl. No. 18/110.428, filed Feb. 16, 2023.
Co-pending U.S. Appl. No. 18/116,910, filed Mar. 3, 2023.
Jun. 14, 2024 Extended Search Report in European Patent Application Pub. No. 21 821 289.2.

* cited by examiner

TONER CONTAINER HAVING A SHUTTER AND AN ENGAGING PORTION EXPOSED FROM THE SHUTTER

CROSS-REFERENCE TO RELATED APPLICATIONS

This application is a Continuation of International Patent Application No. PCT/JP2021/013825, filed Mar. 31, 2021, which claims the benefit of Japanese Patent Application No. 2020-099728, filed Jun. 8, 2020, and Japanese Patent Application No. 2021-043868, filed Mar. 17, 2021, which are hereby incorporated by reference herein in their entirety.

BACKGROUND OF THE INVENTION

Field of the Invention

The present invention relates to a toner container and an image forming system that forms an image on a recording material.

Description of the Related Art

In general, an electrophotographic image forming apparatus forms an image by transferring a toner image formed on a surface of a photosensitive drum to a transfer material as a transfer medium. As a developer replenishing method, for example, a process cartridge method and a toner replenishing method are known. The process cartridge method is a method in which a photosensitive drum and a developing container are integrated as a process cartridge, and the process cartridge is replaced with a new one when the developer runs out.

On the other hand, the toner replenishing method is a method of newly replenishing toner to a developing container when toner runs out. According to Japanese Patent Application Laid-Open No. H08-30084, there has been proposed a one-component developing device of a toner replenishing method in which a toner supply box capable of replenishing toner is connected to a toner conveyance path through which toner is conveyed. Toner stored in the toner supply box is conveyed to the toner conveying path by a conveying screw.

In recent years, image forming apparatuses are required by users to be used in various ways such as the process cartridge method and the toner replenishing method described above. In addition, various forms of toner containers mounted on the image forming apparatus for replenishing toner are required by users.

SUMMARY OF THE INVENTION

According to a first aspect of the present invention, a toner container mountable to and dismountable from an image forming apparatus includes a toner storage unit configured to store a toner, a container base portion including a discharge port provided on an outer surface of the container base portion, the outer surface extending in a first direction, the discharge port communicating with the toner storage unit, and a container shutter configured to be rotatable with respect to the container base portion about a rotation axis extending in a direction along the first direction between a shielding position where the discharge port is shielded and an open position where the discharge port is opened. The container base portion includes an engaging portion configured to be engaged with an engaged portion of the image forming apparatus in a case where the toner container is mounted on the image forming apparatus so that rotation of the container base portion with respect to the image forming apparatus about the rotation axis is restricted. At least a part of the engaging portion of the container base portion is exposed from the container shutter in a case where the container shutter is in the shielding position.

According to a second aspect of the present invention, an image forming system includes an apparatus main body; and a toner container mountable on the apparatus main body. The toner container includes a first toner storage unit configured to store a toner, a container base portion connected to the first toner storage unit, the container base portion including a discharge port for discharging the toner stored in the first-toner storage unit to an outside, and a first shutter configured to rotate about a rotation axis with respect to the container base portion between a first open position where the discharge port is opened and a first shielding position where the discharge port is shielded, the first shutter including a first engaging portion and a first engaged portion. The apparatus main body includes a main body base portion on which the toner container is detachably mounted, the main body base portion including a receiving port for receiving the toner from the toner container, a second toner storage unit configured to store the toner received from the receiving port, a second shutter configured to rotate about the rotation axis with respect to the main body base portion between a second open position where the receiving port is opened and a second shielding position where the receiving port is shielded, the second shutter including a second engaged portion, and a lever configured to be rotatable about the rotation axis with respect to the main body base portion and rotatable with respect to the second shutter, the lever including a second engaging portion. In a state where the toner container is mounted on the main body base portion, (i) the second engaging portion of the lever engages with the first engaged portion of the first shutter such that the first shutter rotates together with the lever, and (ii) the first engaging portion of the first shutter engages with a second engaged portion of the second shutter such that the second shutter rotates together with the first shutter.

Further features of the present invention will become apparent from the following description of exemplary embodiments with reference to the attached drawings.

DESCRIPTION OF THE EMBODIMENTS

Hereinafter, exemplary embodiments for carrying out the present invention will be described with reference to the attached drawings.

First Embodiment

Figure 1A:
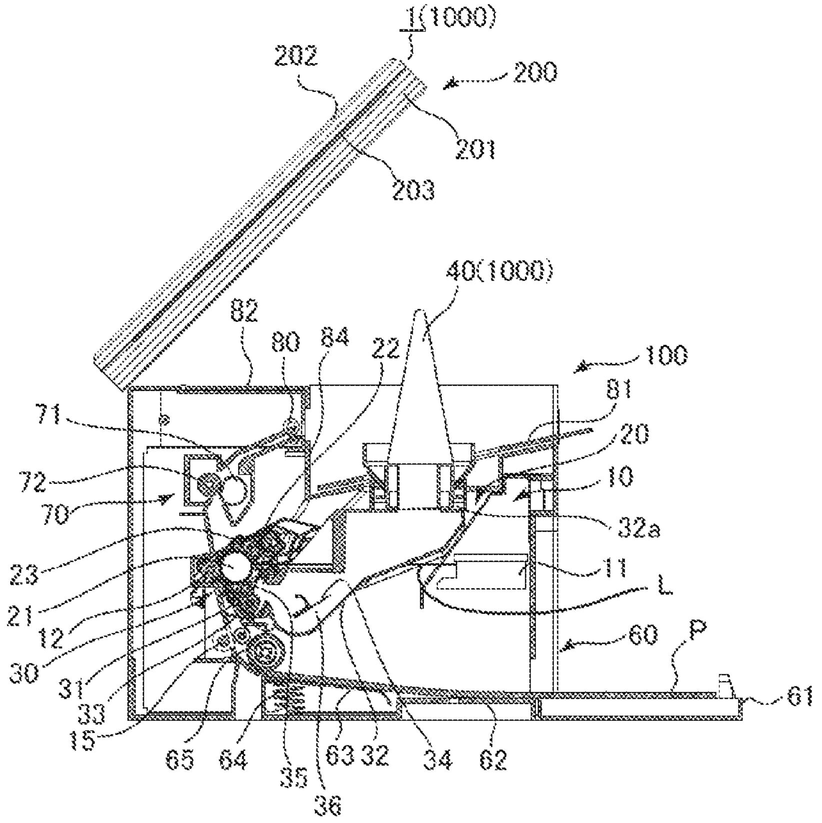
FIG. 1A is a cross-sectional view illustrating an image forming apparatus according to a first embodiment.

FIG. 1A is a schematic view illustrating a configuration of an image forming apparatus 1 according to a first embodiment. The image forming apparatus 1 is a monochrome printer that forms an image on a recording material based on image information input from an external device. Examples of the recording material include various sheet materials having different materials such as plain paper and thick paper, a plastic film such as a sheet for an overhead projector, a sheet having a special shape such as an envelope or index paper, and cloth.

Overall Configuration

Figure 1B:
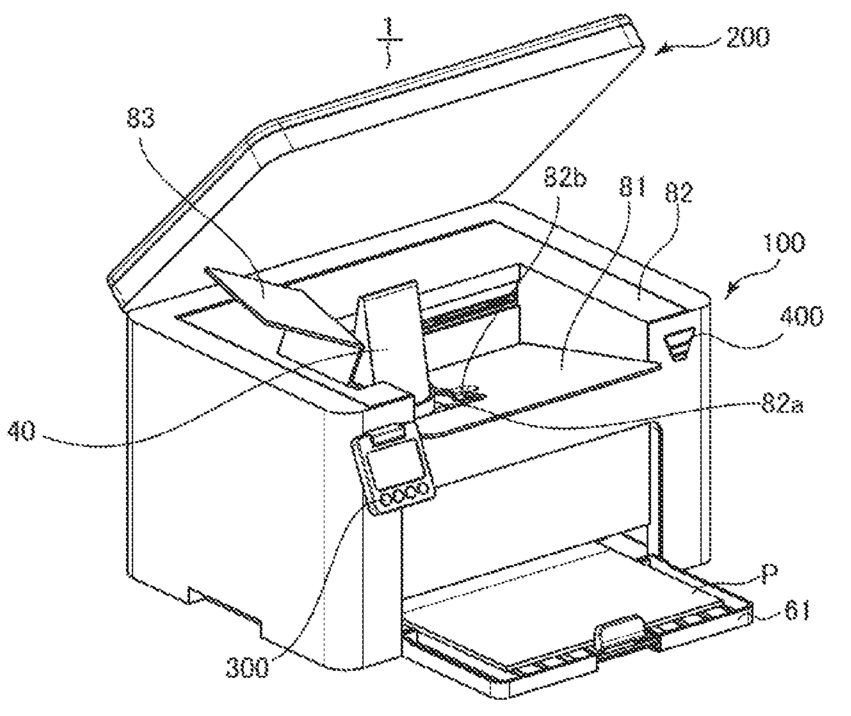
FIG. 1B is a perspective view illustrating the image forming apparatus.

As illustrated in FIGS. 1A and 1B, the image forming apparatus 1 includes a printer main body 100 as an apparatus main body, a reading device 200 openably supported by the printer main body 100, and an operation unit 300 attached to an exterior surface of the printer main body 100. The printer main body 100 includes an image forming unit 10 that forms a toner image on the recording material, a feeding unit 60 that feeds the recording material to the image forming unit 10, a fixing unit 70 that fixes the toner image formed by the image forming unit 10 to the recording material, and a discharge roller pair 80.

The image forming unit 10 includes a scanner unit 11, an electrophotographic process cartridge 20, and a transfer roller 12 that transfers a toner image formed on a photosensitive drum 21 of the process cartridge 20 to the recording material. The process cartridge 20 includes the photosensitive drum 21, a charging roller 22 disposed around the photosensitive drum 21, a pre-exposure device 23, and a developing device 30 including a developing roller 31.

The photosensitive drum 21 is a photosensitive member formed in a cylindrical shape. The photosensitive drum 21 of the present embodiment has a photosensitive layer formed of a negatively charged organic photosensitive member on a drum-shaped substrate formed of aluminum. In addition, the photosensitive drum 21 as an image carrier is rotationally driven at a predetermined process speed in a predetermined direction (clockwise direction in the drawing) by a motor.

The charging roller 22 is in contact with the photosensitive drum 21 with a predetermined pressure contact force to form a charging unit. In addition, the charging roller 22 uniformly charges the surface of the photosensitive drum 21 to a predetermined potential by applying a desired charging voltage by a charging high-voltage power supply. In the present embodiment, the photosensitive drum 21 is negatively charged by the charging roller 22. The pre-exposure device 23 neutralizes the surface potential of the photosensitive drum 21 before entering the charging unit in order to generate stable discharge in the charging unit.

The scanner unit 11 as an exposure unit scans and exposes the surface of the photosensitive drum 21 by irradiating the photosensitive drum 21 with a laser beam corresponding to image information input from the external device or the reading device 200 using a polygon mirror. By this exposure, an electrostatic latent image corresponding to the image information is formed on the surface of the photosensitive drum 21. Note that the scanner unit 11 is not limited to a laser scanner device, and, for example, an LED exposure device having an LED array in which a plurality of LEDs are arranged along the longitudinal direction of the photosensitive drum 21 may be adopted.

The developing device 30 includes the developing roller 31 as a developer carrier that carries a developer, a developing container 32 as a frame member of the developing device 30, and a supply roller 33 that can supply the developer to the developing roller 31. The developing roller 31 and the supply roller 33 are rotatably supported by the developing container 32. The developing roller 31 is disposed in an opening portion of the developing container 32 so as to face the photosensitive drum 21. The supply roller 33 rotatably abuts on the developing roller 31, and toner as the developer stored in the developing container 32 is applied to the surface of the developing roller 31 by the supply roller 33. Note that the supply roller 33 is not necessarily required as long as the toner can be sufficiently supplied to the developing roller 31.

The developing device 30 of the present embodiment uses a contact developing method as a developing method. That is, the toner layer carried on the developing roller 31 comes into contact with the photosensitive drum 21 in a developing unit (developing region) where the photosensitive drum 21 and the developing roller 31 face each other. A developing voltage is applied to the developing roller 31 by a developing high-voltage power supply. Under the developing voltage, the toner carried on the developing roller 31 is transferred from the developing roller 31 to the surface of the photosensitive drum 21 according to the potential distribution on the surface of the photoconductive drum, whereby the electrostatic latent image is developed into a toner image. In the present embodiment, a reversal development method is adopted. That is, the toner adheres to the surface region of the photosensitive drum 21 in which the charge amount is attenuated by being exposed in an exposure step after being charged in the charging step, whereby a toner image is formed.

In the present embodiment, a toner having a particle size of 6 m and a normal charging polarity of negative polarity is used. As an example of the toner of the present embodiment, a polymerization toner generated by a polymerization method is adopted. In addition, the toner of the present embodiment does not contain a magnetic component, and is a so-called non-magnetic one-component developer in which the toner is carried on the developing roller 31 mainly by an intermolecular force or an electrostatic force (mirror image force). However, a one-component developer containing a magnetic component may be used. In addition, the one-component developer may contain an additive (for example, wax or silica fine particles) for adjusting fluidity and charging performance of the toner in addition to the toner particles. As the developer, a two-component developer composed of a nonmagnetic toner and a magnetic carrier may be used. When a developer having magnetism is used, for example, a cylindrical developing sleeve with a magnet disposed inside is used as the developer carrier.

The developing container 32 is provided with a storage unit 36 as a second toner storage unit that stores toner, and a stirring member 34 as a stirring portion disposed inside the storage unit 36. The stirring member 34 is driven by a motor (not illustrated) to rotate, thereby stirring the toner in the developing container 32 and feeding the toner toward the developing roller 31 and the supply roller 33. In addition, the stirring member 34 has a function of circulating the toner not used for development but peeled off from the developing roller 31 in the developing container to make the toner in the developing container uniform. Note that the stirring member 34 is not limited to a rotating type. For example, a swing type of stirring member may be employed.

In addition, a developing blade 35 that regulates the amount of toner carried on the developing roller 31 is disposed in the opening portion of the developing container 32 in which the developing roller 31 is disposed. The toner supplied to the surface of the developing roller 31 passes through a portion facing the developing blade 35 along with the rotation of the developing roller 31, so that the toner is uniformly thinned and charged to a negative polarity by frictional charging.

As illustrated in FIGS. 1A and 1B, the feeding unit 60 includes a front door 61 supported by the printer main body 100 so as to be openable and closable, a tray portion 62, an intermediate plate 63, a tray spring 64, and a pickup roller 65. The tray portion 62 constitutes a bottom surface of a recording material storage space appearing when the front door 61 is opened, and the intermediate plate 63 is supported by the tray portion 62 so as to be movable up and down. The tray spring 64 biases the intermediate plate 63 upward, and presses a recording material P stacked on the intermediate plate 63 against the pickup roller 65. Note that the front door 61 closes the recording material storage space in a state of being closed with respect to the printer main body 100, and supports the recording material P together with the tray portion 62 and the intermediate plate 63 in a state of being opened with respect to the printer main body 100.

The fixing unit 70 is of a heat fixing type that performs image fixing processing by heating and melting toner on the recording material. The fixing unit 70 includes a fixing film 71, a fixing heater such as a ceramic heater that heats the fixing film 71, a thermistor that measures the temperature of the fixing heater, and a pressure roller 72 that comes into pressure contact with the fixing film 71.

Next, an image forming operation of the image forming apparatus 1 will be described. When an image forming command is input to the image forming apparatus 1, an image forming process by the image forming unit 10 is started on the basis of the image information input from an external computer or the reading device 200 connected to the image forming apparatus 1. The scanner unit 11 irradiates the photosensitive drum 21 with a laser beam on the basis of the input image information. At this time, the photosensitive drum 21 is charged in advance by the charging roller 22, and an electrostatic latent image is formed on the photosensitive drum 21 by being irradiated with the laser beam. Thereafter, the electrostatic latent image is developed by the developing roller 31, and a toner image is formed on the photosensitive drum 21.

In parallel with the above-described image forming process, the pickup roller 65 of the feeding unit 60 feeds the recording material P supported by the front door 61, the tray portion 62, and the intermediate plate 63. The recording material P is fed to the registration roller pair 15 by the pickup roller 65 and abuts against a nip of the registration roller pair 15 to correct skew feeding. Then, the registration roller pair 15 is driven in accordance with the transfer timing of the toner image, and conveys the recording material P toward a transfer nip formed by the transfer roller 12 and the photosensitive drum 21.

A transfer voltage is applied from a transfer high-voltage power supply to the transfer roller 12 as a transfer portion, and the toner image carried on the photosensitive drum 21 is transferred to the recording material P conveyed by the registration roller pair 15. The recording material P to which the toner image has been transferred is conveyed to the fixing unit 70, and the toner image is heated and pressurized when passing through a nip portion between the fixing film 71 and the pressure roller 72 of the fixing unit 70. As a result, the toner particles are melted and then fixed, whereby the toner image is fixed to the recording material P. The recording material P having passed through the fixing unit 70 is discharged to the outside of the image forming apparatus 1 (outside the apparatus) by the discharge roller pair 80 as a discharge unit, and is stacked on a discharge tray 81 as a stacking unit formed in an upper portion of the printer main body 100.

The discharge tray 81 is inclined upward toward the downstream side in a discharge direction of the recording material, and the recording material discharged to the discharge tray 81 slides down the discharge tray 81, so that the rear end is aligned by a regulating surface 84.

The reading device 200 includes a reading unit 201 incorporating a reading section (not illustrated) therein, and a platen 202 supported by the reading unit 201 so as to be openable and closable. An upper surface of the reading unit 201 is provided with a platen glass 203 that transmits light emitted from the reading section and on which a document is placed.

When the image of a document is to be read by the reading device 200, a user places the document on the platen glass 203 with the platen 202 opened. Then, the platen 202 is closed to prevent misalignment of the document on the platen glass 203, and for example, a reading command is output to the image forming apparatus 1 by operating the operation unit 300. When reading operation is started, the reading section in the reading unit 201 reciprocates in a sub-scanning direction, that is, in a left-right direction in a state where the operation unit 300 of the image forming apparatus 1 faces the front. The reading section emits light from a light emitting unit to the document, receives the light reflected by the document by a light receiving unit, and photoelectrically converts the light to read the image of the document. Hereinafter, a front-back direction, a left-right direction, and an up-down direction are defined based on a state in which the operation unit 300 faces the front.

Figure 2:
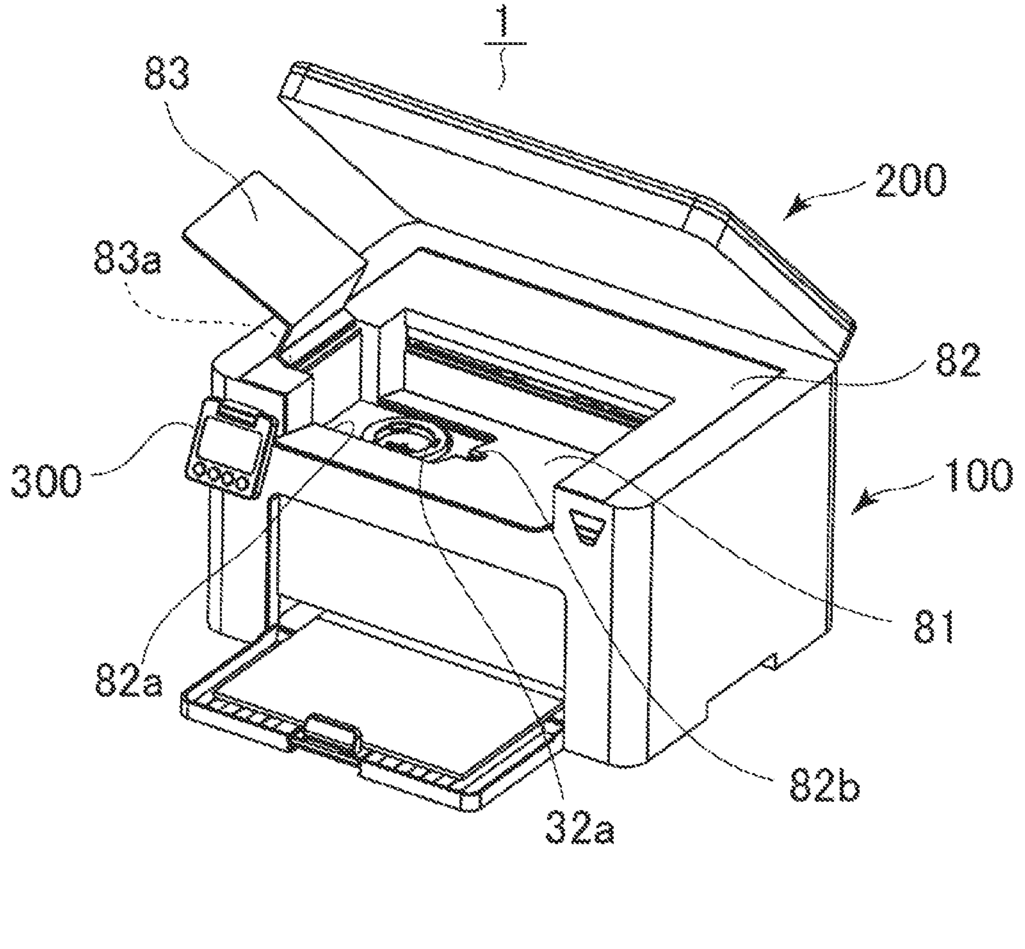
FIG. 2 is a perspective view illustrating the image forming apparatus in a state where a reading device is opened.

Atop cover 82 as a stacking tray is provided in an upper portion of the printer main body 100, and the discharge tray 81 as a stacking surface is formed on an upper surface of the top cover 82. As illustrated in FIGS. 1B and 2, an opening/closing member 83 is supported on the top cover 82 so as to be openable and closable about a rotation shaft 83*a* extending in the front-back direction. An opening portion 82*a* opened upward is formed in the discharge tray 81 of the top cover 82.

The opening/closing member 83 is configured to be movable between a closed position where the opening/closing member covers a replenishing port 32*a* so that a toner pack 40 cannot be mounted on the developing container 32 and an open position where the replenishing port 32*a* is exposed so that the toner pack 40 can be mounted on the developing container 32. The opening/closing member 83 functions as apart of the discharge tray 81 at the closed position. The opening/closing member 83 and the opening portion 82*a* are formed on the left side of the discharge tray 81. In addition, the opening/closing member 83 is opened in the left direction by hanging a finger from the groove 82*b* provided in the top cover 82. The opening/closing member 83 is formed in a substantially L shape along the shape of the top cover 82.

The opening portion 82*a* of the discharge tray 81 is opened such that the replenishing port 32*a* formed in the upper portion of the developing container 32 is exposed, and the opening/closing member 83 is opened, so that the user can access the replenishing port 32*a*. In the present embodiment, a method (direct replenishing method) is adopted in which a user replenishes toner from the toner pack 40 (see FIGS. 1A and 1B) filled with toner for replenishing to the developing device 30 while the developing device 30 is mounted on the image forming apparatus 1. At least a part of the toner pack 40 is exposed to the outside in a state of being mounted on the image forming apparatus 1.

Therefore, in a case where the remaining amount of toner in the process cartridge 20 decreases, it is not necessary to take out the process cartridge 20 from the printer main body 100 and replace it with a new process cartridge, so that usability can be improved. In addition, it is possible to replenish the toner to the developing container 32 at a lower cost than replacing the entire process cartridge 20. Note that, in the direct replenishing method, since it is not necessary to replace various rollers, gears, and the like, cost can be reduced even compared with a case where only the developing device 30 of the process cartridge 20 is replaced. The image forming apparatus 1 and the toner pack 40 constitute an image forming system 1000.

Collection of Transfer Residual Toner

In the present embodiment, a cleaner-less configuration is adopted in which transfer residual toner remaining on the photosensitive drum 21 without being transferred to the recording material P is collected and reused in the developing device 30. The transfer residual toner is removed in the following steps. The transfer residual toner includes toner charged in a positive polarity and toner charged in a negative polarity but not having a sufficient charge. The photosensitive drum 21 after the transfer is neutralized by the pre-exposure device 23, and uniform discharge is generated by the charging roller 22, so that the transfer residual toner is charged to the negative polarity again. The transfer residual toner charged to the negative polarity again in the charging unit reaches the developing unit with the rotation of the photosensitive drum 21. Then, the surface region of the photosensitive drum 21 that has passed through the charging unit is exposed by the scanner unit 11 to write an electrostatic latent image in a state where the transfer residual toner adheres to the surface.

Here, the behavior of the transfer residual toner that has reached the developing unit will be described separately for the exposed portion and the non-exposed portion of the photosensitive drum 21. The transfer residual toner adhering to the non-exposed portion of the photosensitive drum 21 is transferred to the developing roller 31 due to the potential difference between the potential of the non-exposed portion (dark potential) of the photosensitive drum 21 and the developing voltage in the developing unit, and is collected in the developing container 32. This is because assuming that the normal charging polarity of the toner is negative, the developing voltage applied to the developing roller 31 is relatively positive with respect to the potential of the non-exposed portion. The toner collected in the developing container 32 is stirred and dispersed with the toner in the developing container by the stirring member 34, and is carried by the developing roller 31 to be used again in the developing step.

On the other hand, the transfer residual toner adhering to the exposed portion of the photosensitive drum 21 remains on the surface of the drum without being transferred from the photosensitive drum 21 to the developing roller 31 in the developing unit. This is because assuming that the normal charging polarity of the toner is negative, the developing voltage applied to the developing roller 31 is more negative than the potential of the exposed portion (bright portion potential). The transfer residual toner remaining on the drum surface is carried on the photosensitive drum 21 together with other toner transferred from the developing roller 31 to the exposed portion, moves to the transfer portion, and is transferred to a recording material S in the transfer portion.

As described above, in the present embodiment, the cleaner-less configuration in which the transfer residual toner is collected and reused in the developing device 30 is adopted, but the transfer residual toner may be collected using a conventionally known cleaning blade that abuts on the photosensitive drum 21. In this case, the transfer residual toner collected by the cleaning blade is collected in a collection container installed separately from the developing device 30. However, by adopting the cleaner-less configuration, the installation space of the collection container for collecting the transfer residual toner and the like becomes unnecessary, and the image forming apparatus 1 can be further downsized; and further, the printing cost can be reduced by reusing the transfer residual toner.

Configuration of Toner Pack

Next, a configuration of the toner pack 40 as a toner container that can be mounted on and dismounted from the image forming apparatus 1 and store toner will be described. As illustrated in FIGS. 3A to 5, the toner pack 40 includes a shutter member 41, a seal member 504, a replenishing base 501, an outer ring member 510, an inner ring member 511, and a pouch 503, and these members are assembled. The pouch 503 as a toner storage unit and a first toner storage unit is a flexible container that stores the toner. A rotation axis z indicated by a one-dot broken line in FIGS. 3A to 5 is a rotation center line of the toner pack 40.

The replenishing base 501 as a container base portion includes an outer peripheral portion 501*b* as a side surface and an outer surface extending along an axial direction D1 as a first direction parallel to the rotation axis z, and a toner discharge port 501*r* formed in the outer peripheral portion 501*b*. The replenishing base 501 includes a concave portion 501*f* recessed radially inward with respect to the outer peripheral portion 501*b* and protrusions 501*y* and 501*y* protruding radially outward from the outer peripheral portion 501*b*. The toner discharge port 501*r* as a discharge port and a first opening portion is a through hole communicating with the pouch 503. The protrusions 501*y* and 501*y* are arranged with phases different from each other by 180 degrees.

As illustrated in FIGS. 4 to 7, the outer ring member 510 is a resin member whose outer peripheral surface is formed in a substantially hexagonal shape, and the outer ring member 510 is formed with engaging portions 510*y* and 510*y* with which the protrusions 501*y* and 501*y* of the replenishing base 501 can be engaged. The outer ring member 510 is disposed so as to cover the inner ring member 511, and forms the outermost shape of the toner pack 40 so as to function as a grip when gripping the toner pack 40. That is, since the outer ring member 510 is operated at a position more distant from the rotation axis z in the radial direction, it is possible to reduce the force required when the user operates the outer ring member 510 so as to improve the usability.

Similar to the outer ring member 510, the inner ring member 511 as a support member is a resin member having an outer peripheral surface formed in a substantially hexagonal shape, and is coupled to an opening portion 503*a* (see FIG. 10 A) of the pouch 503. As a result, the opening portion 503*a* of the pouch 503 is supported by the inner ring member 511 such that the opening portion 503*a* is maintained in an open state. As described below, the inner ring member 511 is fixed to the replenishing base 501 such that the opening portion 503*a* and the toner discharge port 501*r* communicate with each other. The inner ring member 511 and the pouch 503 may be coupled by any method. Examples of the method include a method using various adhesives such as hot melt, a method of thermally welding and coupling the pouch 503 to the inner ring member 511, and the like. It is preferable that the outer peripheral surface of the outer ring member 510 has a shape such as a polygon that is less slippery when the user grips and rotates the outer peripheral surface.

In the inner ring member 511, concave portions 511*y* and 511*y* with which the protrusions 501*y* and 501*y* can be engaged are formed. The concave portions 511*y* and 511*y* have a groove shape through which the protrusions 501*y* and 501*y* can pass, and the engaging portions 510*y* and 510*y* have a rib shape surrounding the protrusions 501*y* and 501*y*.

Figure 6:
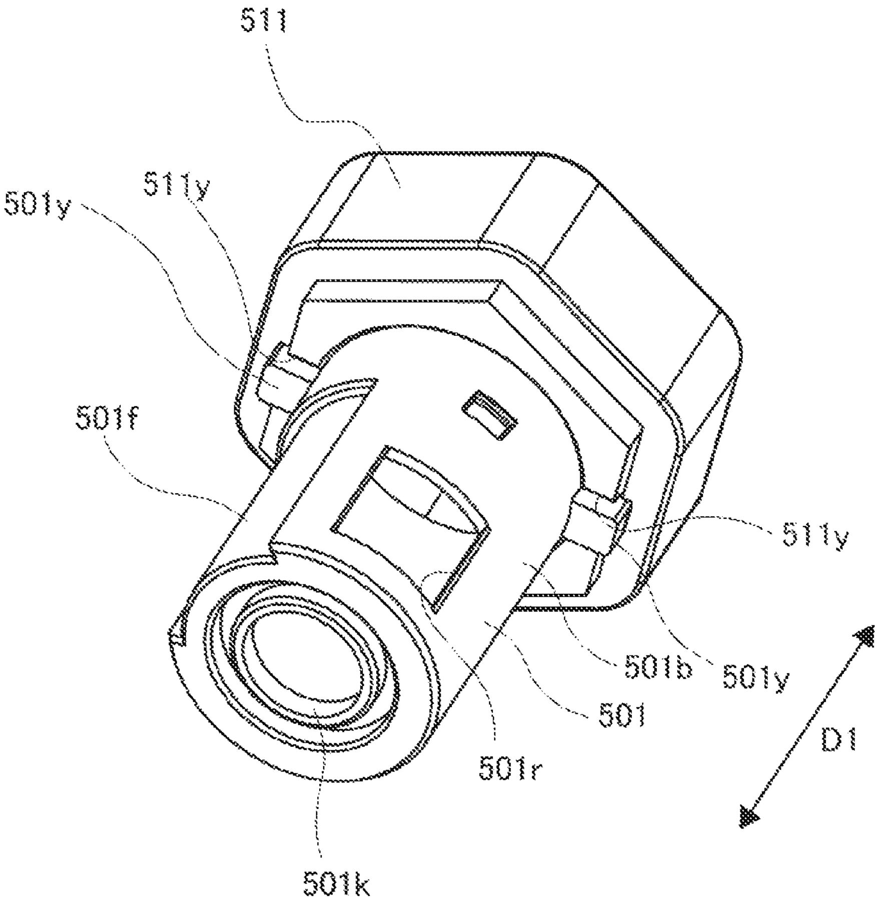
FIG. 6 is a perspective view illustrating an inner ring member and a replenishing base.
Figure 7:
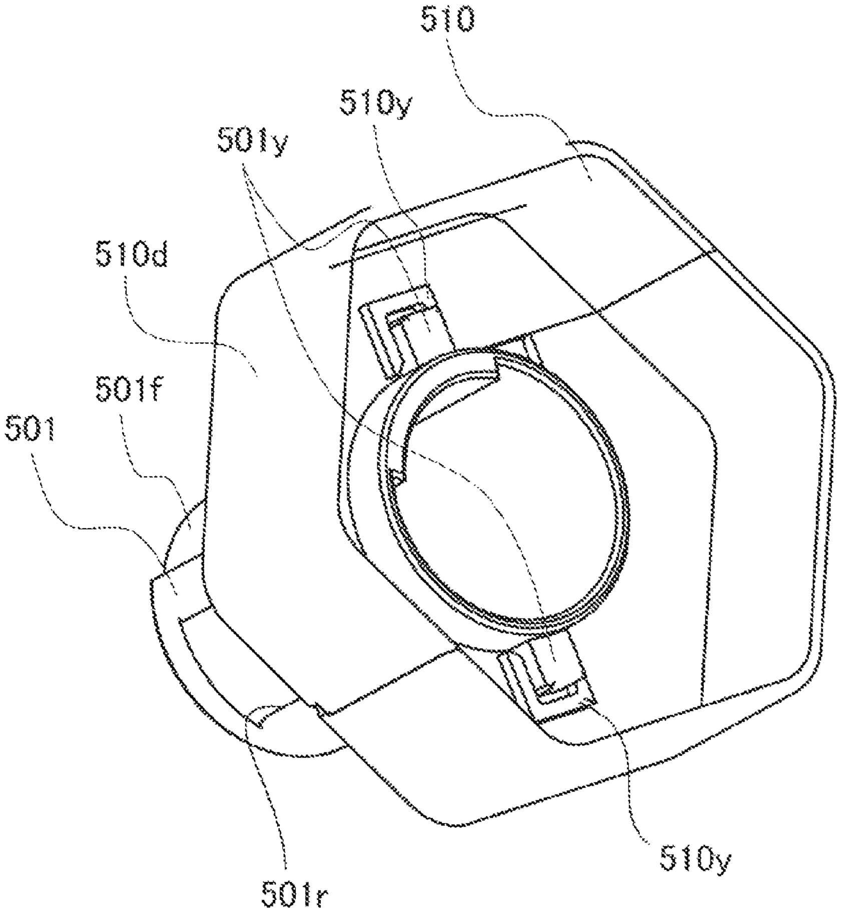
FIG. 7 is a perspective view illustrating an outer ring member and the replenishing base.

As illustrated in FIG. 6, the inner ring member 511 is assembled to the replenishing base 501 such that the protrusion 501*y* and the concave portion 511*y* are engaged with each other. As illustrated in FIG. 7, the outer ring member 510 is assembled such that the protrusion 501*y* and the engaging portion 510*y* are engaged with each other. As a result, the outer ring member 510 and the inner ring member 511 are supported by the replenishing base 501 such that relative rotation with respect to the replenishing base 501 is restricted.

Figure 8A:
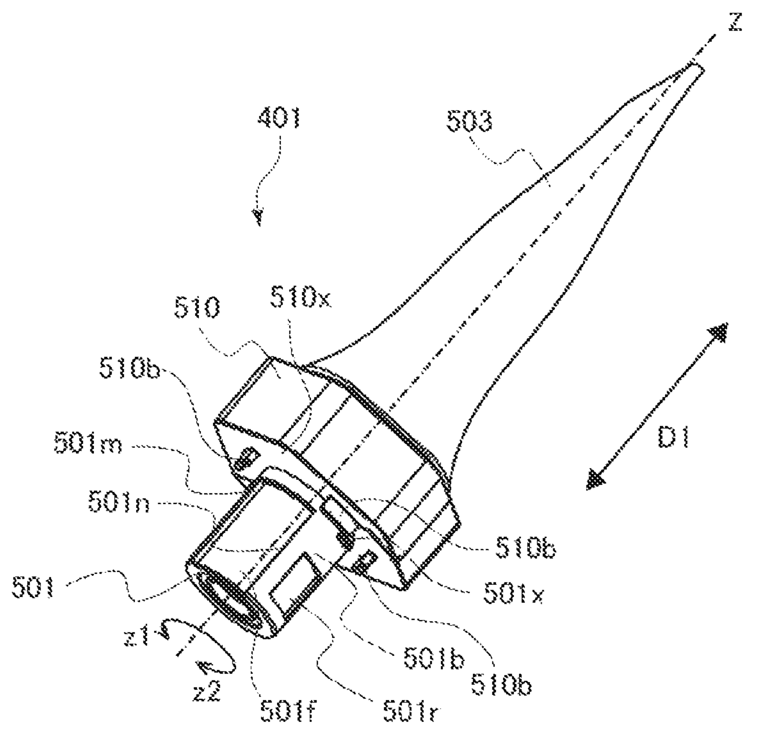
FIG. 8A is a perspective view illustrating a rotary container unit of the toner pack.
Figure 8B:
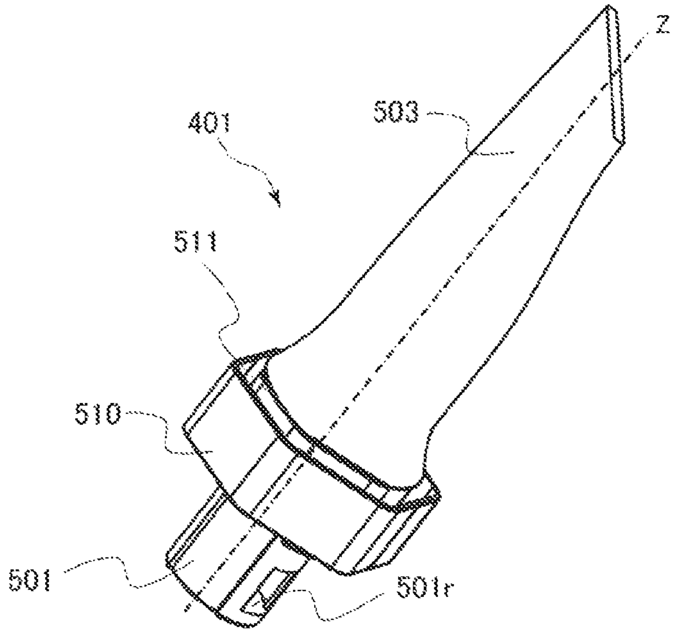
FIG. 8B is a perspective view illustrating the rotary container unit.

Further, the protrusion 501*y* is coupled to the concave portion 511*y* and the engaging portion 510*y* in the axial direction D1 of the rotation axis z and the radial direction orthogonal to the axial direction D1. For example, the protrusion 501*y* may be press-fitted into the concave portion 511*y* and the engaging portion 510*y*, or may be coupled by welding or using an adhesive. As a result, the replenishing base 501, the outer ring member 510, the inner ring member 511, and the pouch 503 are integrally coupled as illustrated in FIGS. 8A and 8B. The outer ring member 510 is a cylindrical member having an outer peripheral surface 510*d* at a position farther from the rotation axis z than the replenishing base 501 in the radial direction orthogonal to the axial direction D1. The inner ring member 511 is fixed to the replenishing base 501 inside the outer ring member 510.

Figure 5:
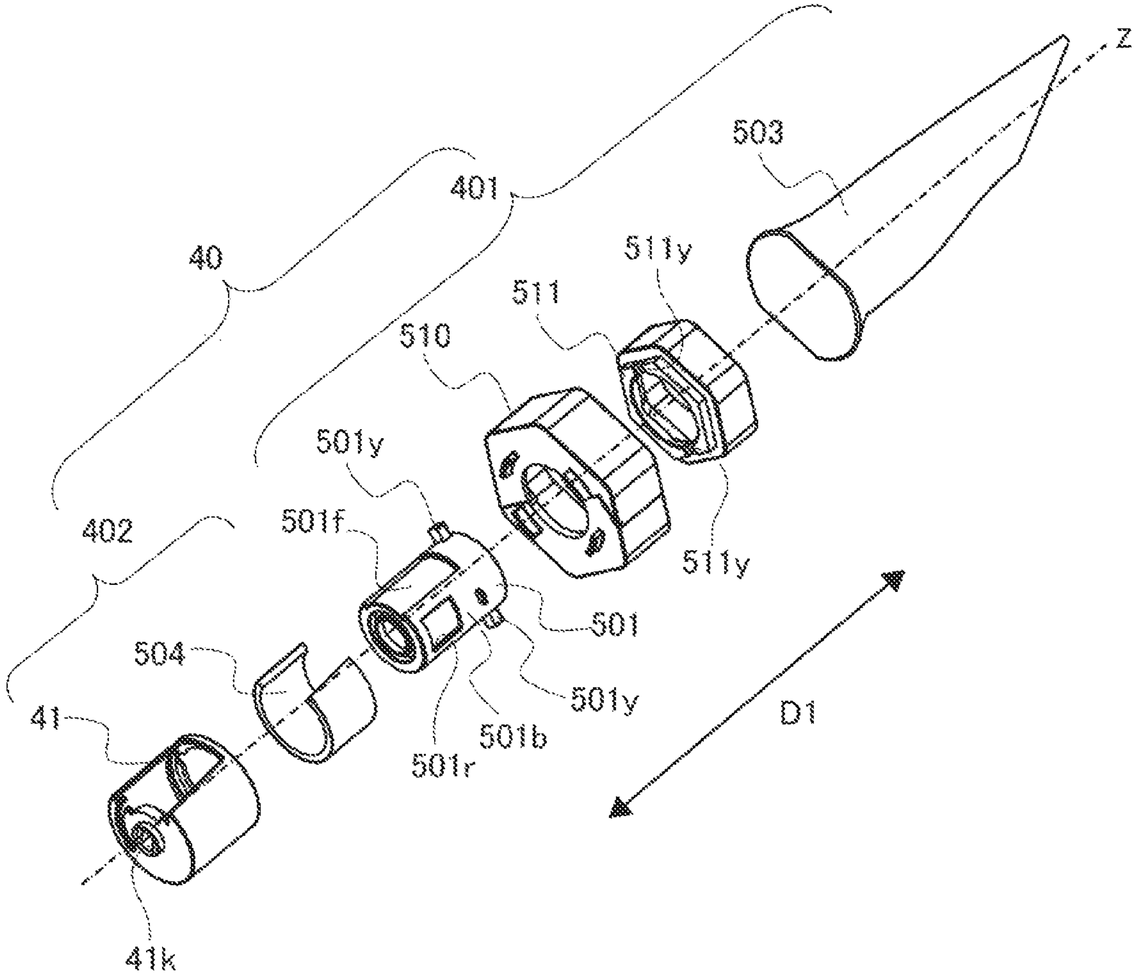
FIG. 5 is an exploded perspective view illustrating the toner pack.

Hereinafter, the replenishing base 501, the outer ring member 510, the inner ring member 511, and the pouch 503 that are integrally coupled are referred to as a rotary container unit 401, and the shutter member 41 and the seal member 504 that are integrally coupled as described below are referred to as a container shutter unit 402. That is, as illustrated in FIG. 5, the toner pack 40 includes the container shutter unit 402 and the rotary container unit 401 that is relatively rotatable with respect to the container shutter unit 402. As illustrated in FIG. 8A, the rotary container unit 401 is rotatable in a z1 direction and a z2 direction opposite to the z1 direction about the rotation axis z with respect to the container shutter unit 402.

Figure 9A:
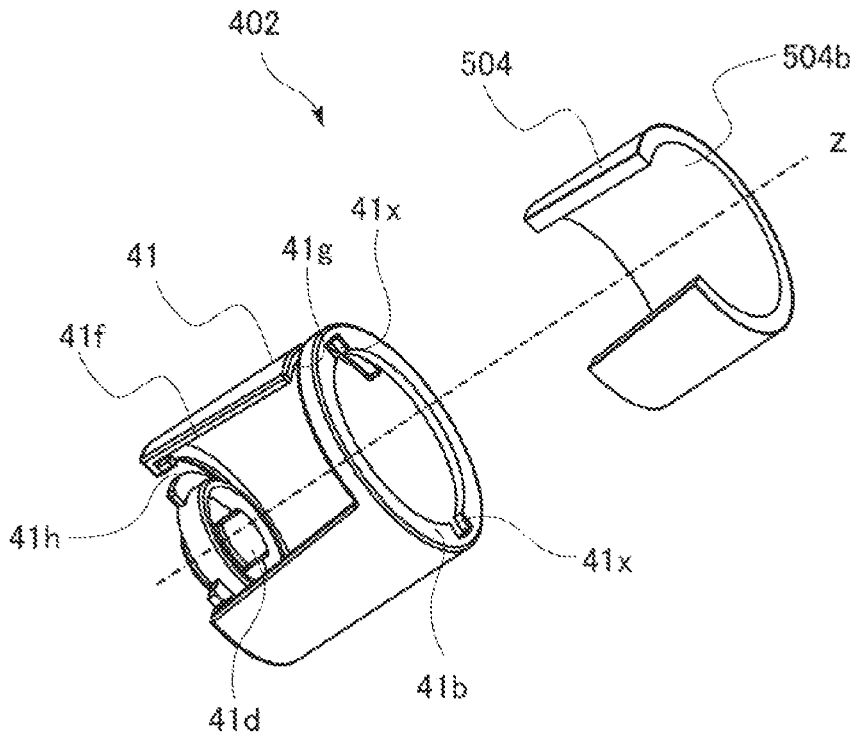
FIG. 9A is an exploded perspective view illustrating a shutter member and a seal member.
Figure 9B:
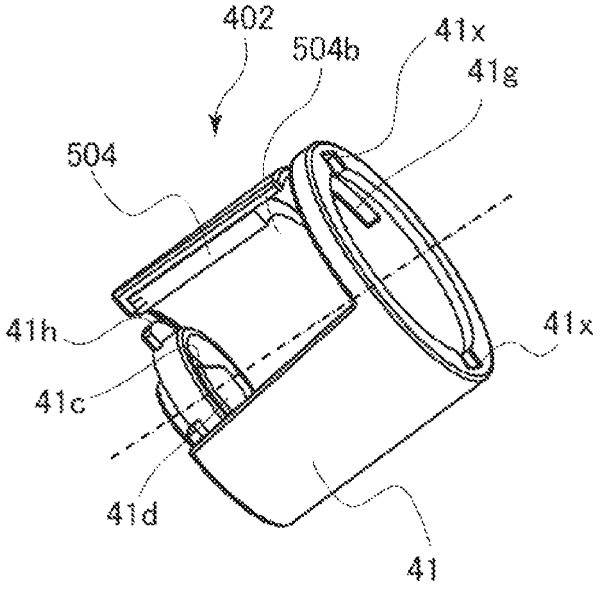
FIG. 9B is a perspective view illustrating the shutter member and the seal member.

As illustrated in FIGS. 9A and 9B, the shutter member 41 as a container shutter is formed of a substantially cylindrical resin member, and the shutter member 41 is formed with a cutout portion 41*f* and grooves 41*g* and 41*h*. The cutout portion 41*f* and the groove 41*g* are formed in an outer peripheral portion of the shutter member 41, and the groove 41*h* is formed in a bottom surface portion of the shutter member 41. The cutout portion 41*f* has a substantially rectangular shape, and the groove 41*g* is formed to extend circumferentially in a partial range (about 90°) of the shutter member 41 in the circumferential direction. In addition, the groove 41*h* is formed to extend circumferentially in a partial range (about 90°) of the shutter member 41 in the circumferential direction in the bottom surface portion.

The seal member 504 is made of a material such as an elastically deformable foamed urethane or a nonwoven fabric, and is fixed to an inner surface of the shutter member 41 with a double-sided tape or the like. More specifically, the seal member 504 is disposed at a position different from the cutout portion 41*f* of the shutter member 41. That is, the seal member 504 and the shutter member 41 are integrally coupled to each other to constitute the container shutter unit 402. As a result, the container shutter unit 402 can suppress toner leakage at the interface between the seal member 504 and the shutter member 41.

As illustrated in FIGS. 8A to 10B, when the rotary container unit 401 is assembled to the container shutter unit 402, a rib 501*x* protruding from the outer peripheral portion 501*b* of the replenishing base 501 and a concave portion 41*x* formed in the shutter member 41 are aligned. A state in which the rib 501*x* is assembled penetrating the concave portion 41*x* is illustrated in FIG. 10A. At this time, a cylindrical portion 41*c* of the shutter member 41 is inserted into a groove-shaped inner diameter portion 501*e* formed in an end portion of the replenishing base 501. The inner diameter portion 501*e* and the cylindrical portion 41*c* are respectively cylindrical groove and protrusion concentric with the rotation axis z. Therefore, when the cylindrical portion 41*c* (an annular rib) is inserted into the inner diameter portion 501*e* (an annular groove), the replenishing base 501 is guided to be rotatable about the rotation axis z with respect to the shutter member 41.

Further, the replenishing base 501 is provided with a hole 501*k* disposed on the radially inner side of the inner diameter portion 501*e* (see FIG. 6). The shutter member 41 is provided with a mounting portion 41*d* (see FIG. 9A) to be inserted into the hole 501*k*. The mounting portion 41*d* is formed with an engaged portion 41*k* that opens to the distal end side of the toner pack 40, and the engaged portion 41*k* defines a hole having a two-chamfered shape. Therefore, the mounting portion 41*d* is a protrusion having a two-chamfered shaped in accordance with the shape of the engaged portion 41*k*. The outermost diameter of the mounting portion 41*d* is set to be smaller than the inner diameter of the hole 501*k*, and the mounting portion 41*d* is freely rotatable inside the hole 501*k*.

A plurality of (four in the present embodiment) ribs 510*b* extending in the axial direction D1 are formed on an end surface 510*x* of the outer ring member 510 on the shutter member 41 side. As illustrated in FIG. 10B, a proximal end portion 41*b* of the shutter member 41 is surrounded by the end surface 510*x* and the rib 501*x*, and the movement in the axial direction D1 and the radial direction orthogonal to the axial direction D1 is restricted. As a result, the rotary container unit 401 including the replenishing base 501 is attached to the container shutter unit 402 including the shutter member 41 so as to be relatively rotatable about the rotation axis z and so as to restrict the movement in the axial direction D1 and the radial direction.

The seal member 504 fixed to the shutter member 41 has a sliding surface 504*b* that slides with respect to the outer peripheral portion 501*b* of the replenishing base 501. The seal member 504 is pressed and deformed in a direction approaching the shutter member 41 by the outer peripheral portion 501*b*, that is, outward in the radial direction orthogonal to the axial direction, so as to generate a surface pressure between the outer peripheral portion 501*b* and the sliding surface 504*b*. As a result, toner leakage at the interface between the seal member 504 and the replenishing base 501 can be suppressed.

More specifically, when viewed in the axial direction D1 of the rotation axis z, the replenishing base 501 and the shutter member 41 are cylindrical members. The replenishing base 501 is configured to rotate about the rotation axis z along an inner peripheral surface 41*j* of the shutter member 41 inside the shutter member 41.

Figure 10A:
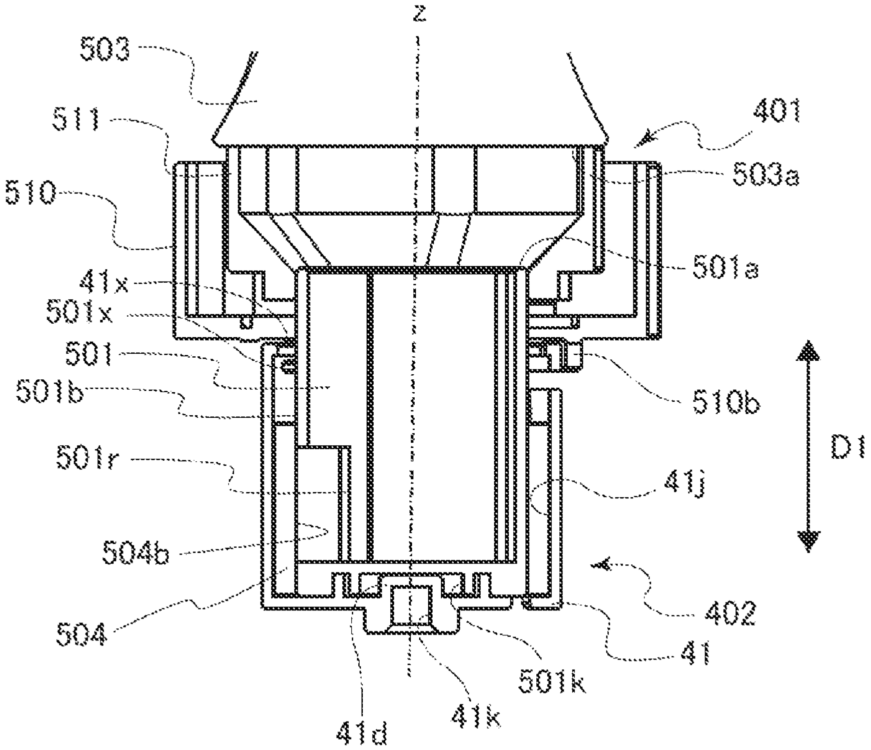
FIG. 10A is a cross-sectional view showing the toner pack in a shielded state.
Figure 10B:
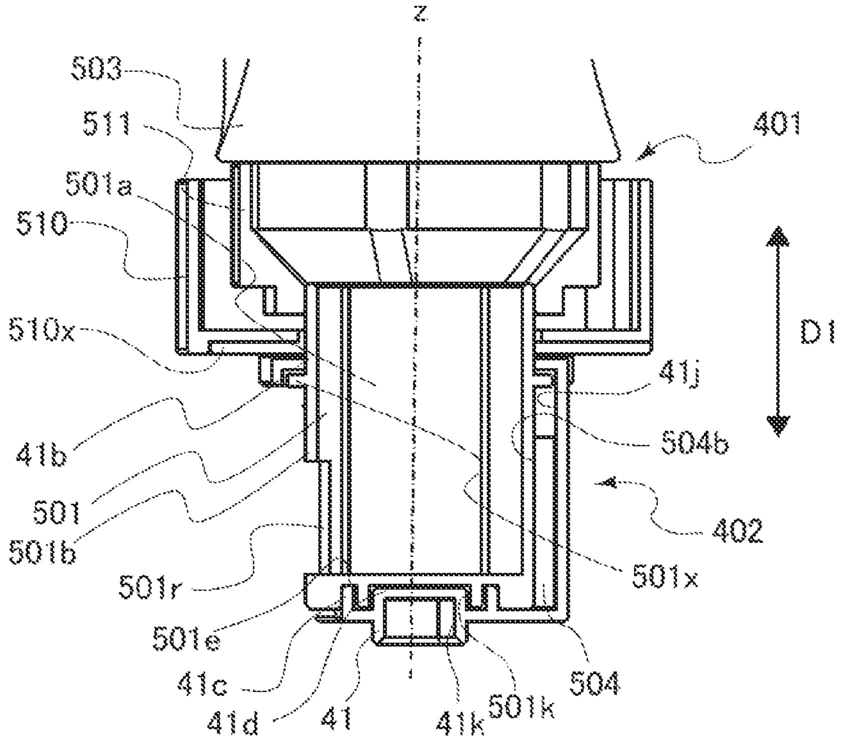
FIG. 10B is a cross-sectional view illustrating the toner pack in an open state.
Figure 11A:
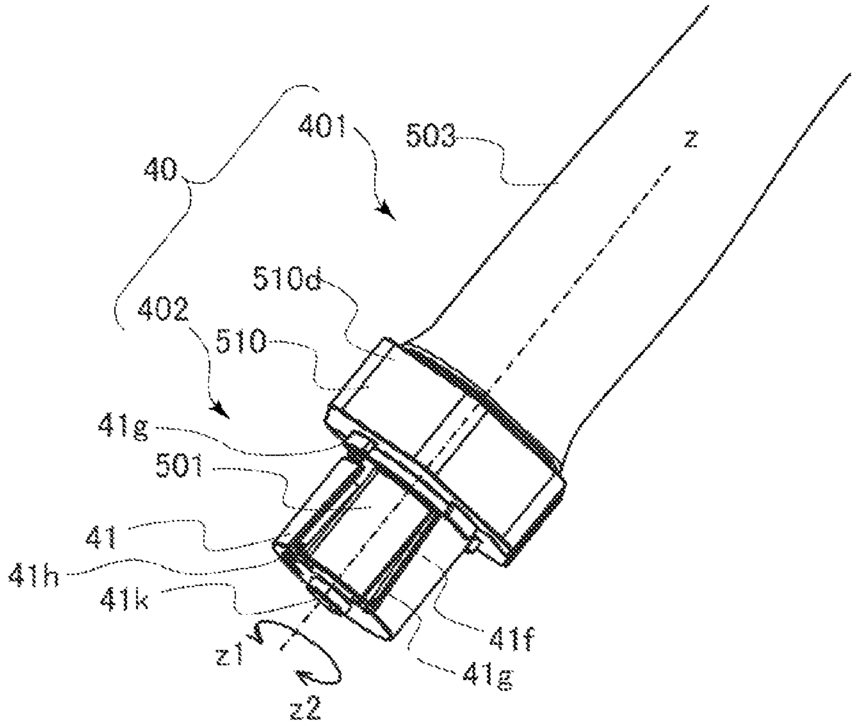
FIG. 11A is a perspective view illustrating the toner pack in the shielded state.

FIGS. 10A and 11A illustrate a state in which the toner discharge port 501*r* formed in the replenishing base 501 is shielded by the shutter member 41 and the seal member 504. At this time, the toner stored in the pouch 503 can pass through the opening portion 503*a* of the pouch 503, an inner space of the inner ring member 511, an opening portion 501*a* of the replenishing base 501, and an inner space of the replenishing base 501, and move to the toner discharge port 501*r*. However, since the toner discharge port 501*r* is shielded by the shutter member 41 and the seal member 504, in the state of the toner pack 40 alone, the toner stored in the pouch 503 is sealed so as not to leak to the outside. The opening portion 503*a* of the pouch 503 is provided at one end in the axial direction D1 of the pouch 503.

Figure 11B:
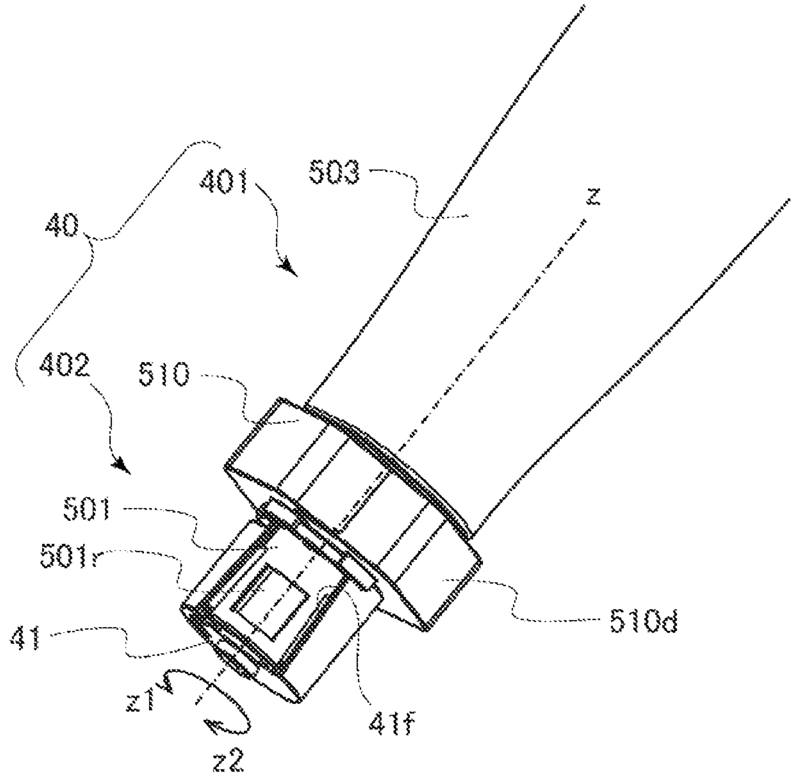
FIG. 11B is a perspective view illustrating the toner pack in the open state.

FIGS. 10B and 11B illustrate a state in which the toner discharge port 501*r* formed in the replenishing base 501 is opened without being shielded by the shutter member 41 and the seal member 504. At this time, the toner discharge port 501*r* faces the cutout portion 41*f* of the shutter member 41, and the toner stored in the pouch 503 can be discharged to the outside of the toner pack 40 via the toner discharge port 501*r* and the cutout portion 41*f*.

For example, the state of the toner pack 40 illustrated in FIG. 11A is defined as a shielded state, and the state of the toner pack 40 illustrated in FIG. 11B is defined as an open state. In this case, when the rotary container unit 401 is rotated about the rotation axis z by approximately 900 in a direction of arrow z1 from the shielded state, the toner pack 40 becomes the open state. When the rotary container unit 401 is rotated about the rotation axis z by approximately 90° in a direction of arrow z2 from the open state, the toner pack 40 becomes the shielded state. Note that how much the rotary container unit 401 should be rotated to make the toner pack 40 transition between the open state and the shielded state may be freely set.

As shown in FIG. 11A, the position of the replenishing base 501 when the toner pack 40 is in the shielded state is defined as a shielding position and a first shielding position, and as shown in FIG. 11B, the position of the replenishing base 501 when the toner pack 40 is in the open state is defined as an open position and a first open position.

When the replenishing base 501 is at the shielding position, the toner discharge port 501*r* is shielded by the shutter member 41. When the replenishing base 501 is at the open position, the toner discharge port 50 iris opened by the shutter member 41 so that the toner in the pouch 503 is discharged to the outside of the toner pack 40 via the toner discharge port 501*r*.

After mounting the toner pack 40 on the developing container 32, the user grips the outer peripheral surface of the outer ring member 510 and rotates the outer ring member 510 in the direction of arrow z1 about the rotation axis z. Consequently, the replenishing base 501 also rotates in the direction of arrow z1 about the rotation axis z, and the toner discharge port 501*r* of the replenishing base 501 is exposed through the cutout portion 41*f* As a result, the toner pack 40 is changed from the shielded state to the open state, and the toner in the pouch 503 can be discharged to the outside of the toner pack 40. Here, the axial direction D1 parallel to the rotation axis z is a direction along the vertical direction, and the mounting direction of the toner pack 40 with respect to the image forming apparatus 1 is a direction along the axial direction D1. That is, the toner pack 40 is configured to be mounted on the image forming apparatus 1 such that the axial direction D1, which is the direction of the rotation axis z, is a direction along the vertical direction.

Examples of the material of the pouch 503 include a resin sheet such as polyethylene (PE), polypropylene (PP), or polyethylene terephthalate (PET), a composite material thereof, a nonwoven fabric, a paper, a composite material with the resin, and the like. When the pouch 503 is made of a member that can be elastically deformed by the user, the user can easily discharge the toner in the pouch 503 by pushing or squeezing the pouch 503 with the finger.

When the user finishes discharging the toner in the pouch 503 to the developing container 32, the user grips the outer peripheral surface 510*d* of the outer ring member 510 and rotates the outer ring member 510 in the direction of arrow z2 about the rotation axis z. Consequently, the replenishing base 501 also rotates in the direction of arrow z2 about the rotation axis z, and the toner discharge port 501*r* of the replenishing base 501 is shielded by the shutter member 41 and the seal member 504. As a result, the toner pack 40 is switched from the open state to the shielded state, and the toner pack 40 can be removed from the developing container 32.

Toner Receiving Unit of Developing Container

Next, a toner receiving unit 600 provided in the developing container 32 will be described. As illustrated in FIGS. 12A to 15, the toner receiving unit 600 includes a receiving base unit 602 and a receiving shutter unit 601 rotatably supported about the rotation axis z with respect to the receiving base unit 602.

Figure 12A:
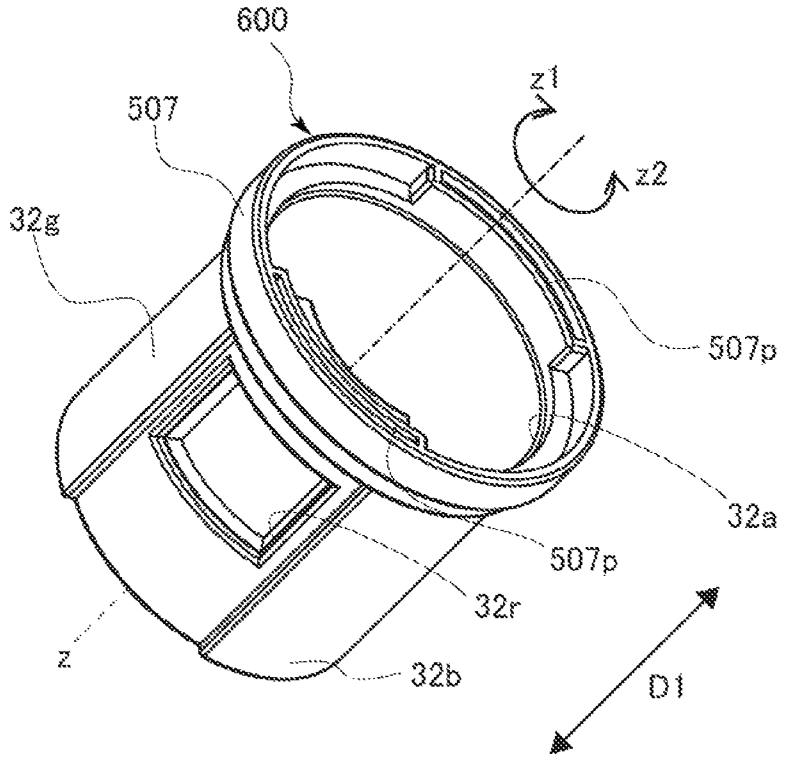
FIG. 12A is a perspective view illustrating a toner receiving unit in the shielded state.
Figure 12B:
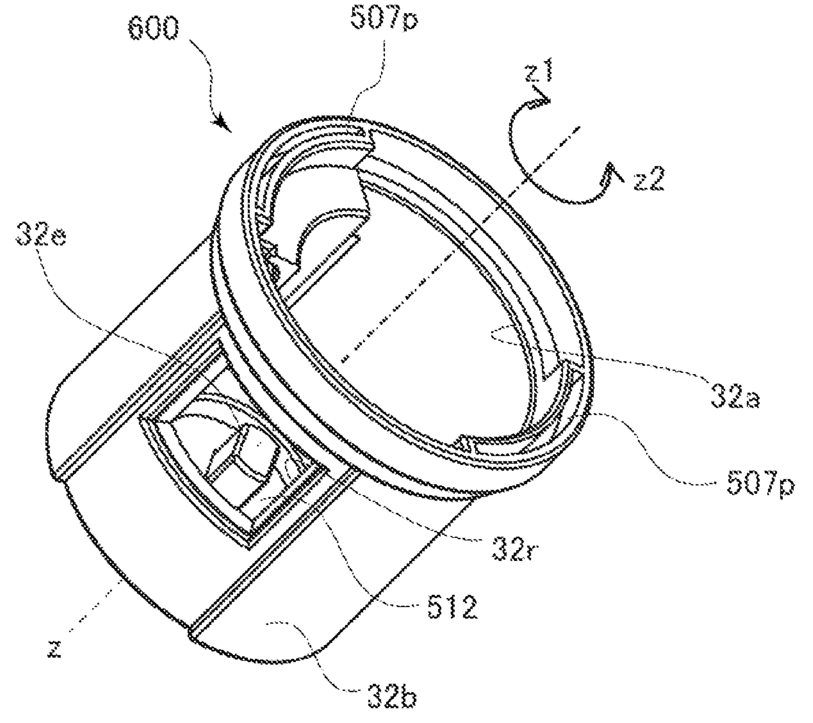
FIG. 12B is a perspective view illustrating the toner receiving unit in the open state.
Figure 13A:
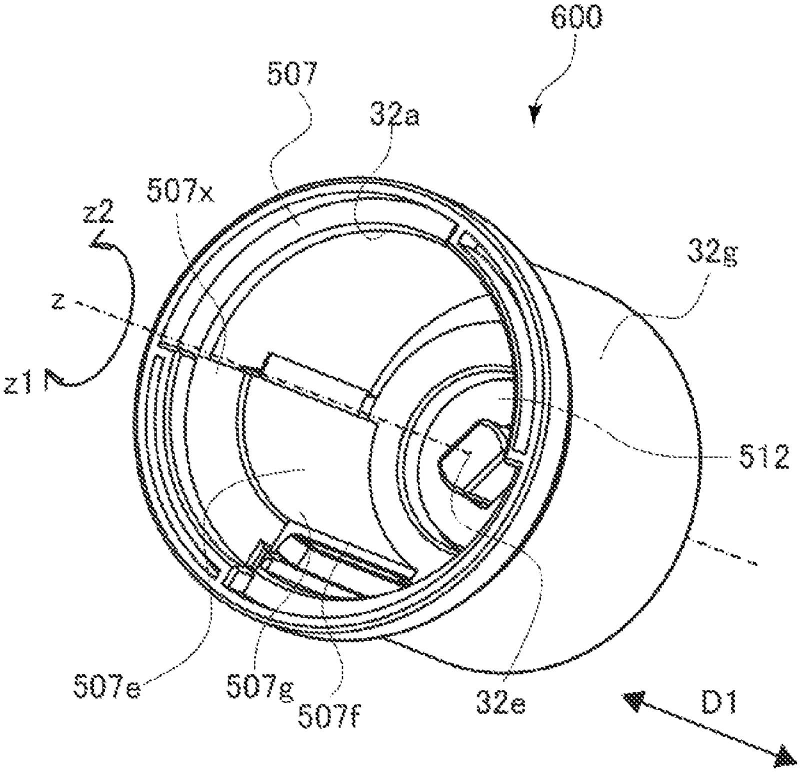
FIG. 13A is a perspective view illustrating the toner receiving unit in the shielded state.
Figure 13B:
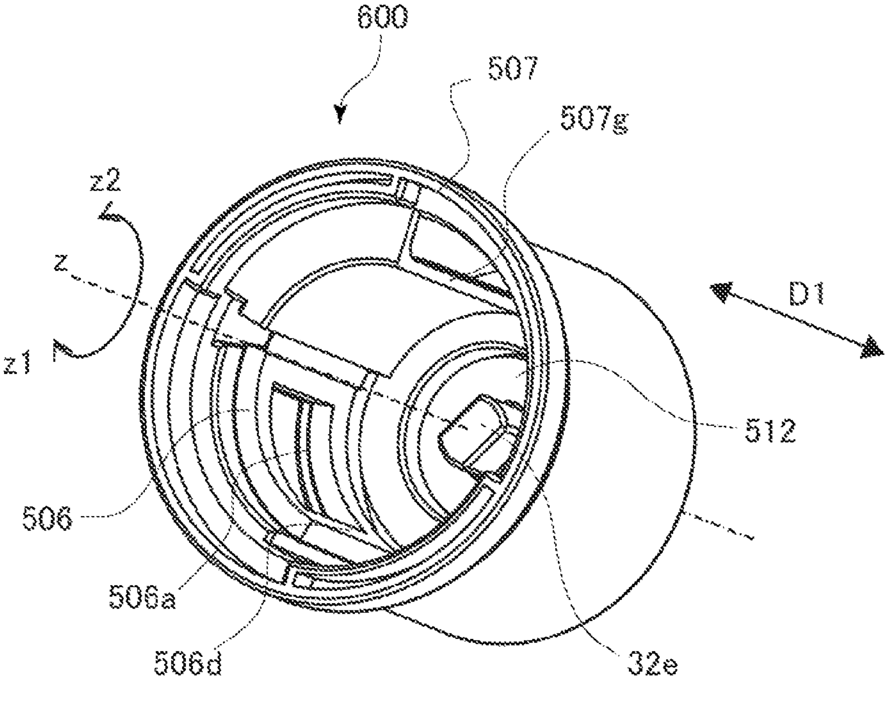
FIG. 13B is a perspective view illustrating the toner receiving unit in the open state.
Figure 14:
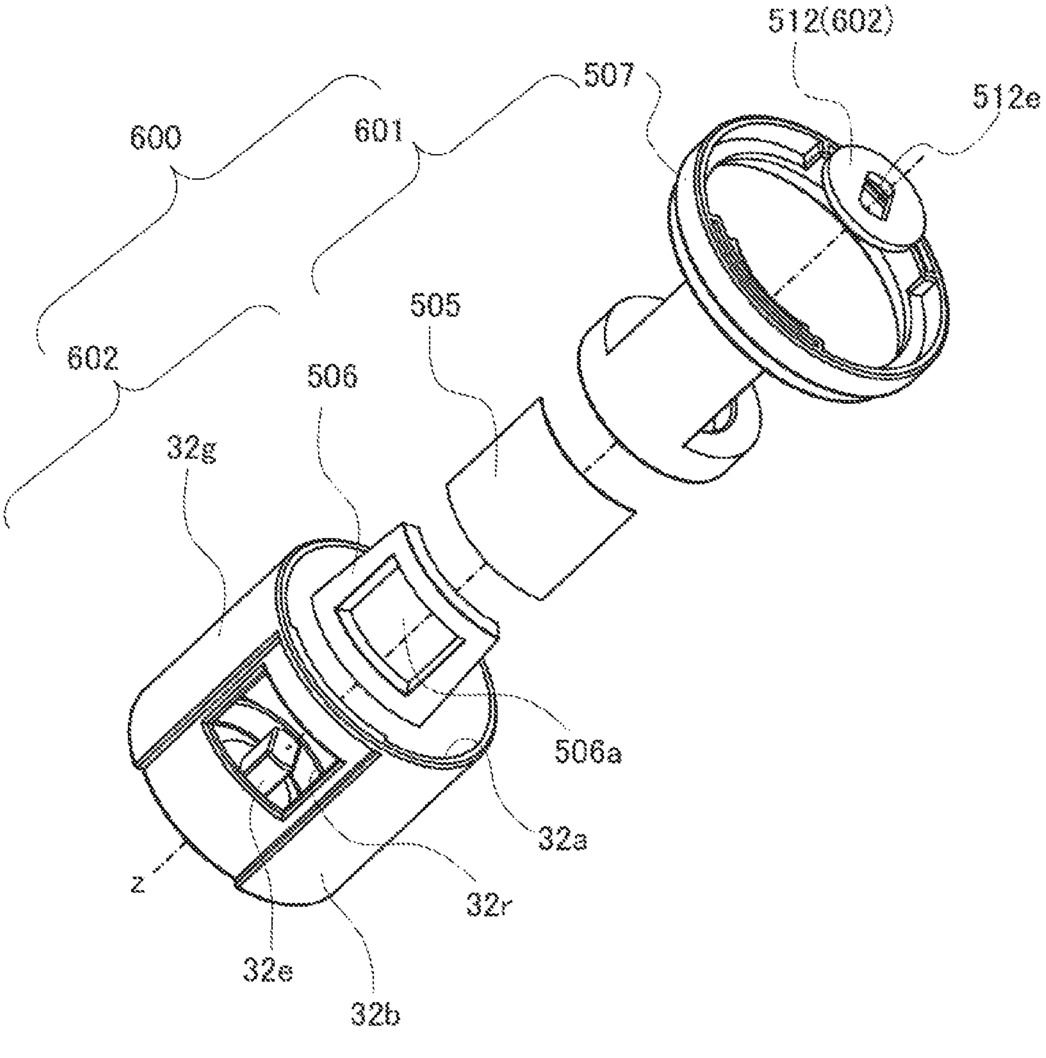
FIG. 14 is an exploded perspective view illustrating the toner receiving unit.

FIGS. 12A and 13A illustrate a state in which a toner supply port 32*r* as a second opening portion communicating with the storage unit 36 is shielded, and FIGS. 12B and 13B illustrate a state in which the toner supply port 32*r* is opened. Hereinafter, as illustrated in FIGS. 12A and 13A, the state of the toner receiving unit 600 in which the toner supply port 32*r* is shielded is defined as a shielded state, and as illustrated in FIGS. 12B and 13B, the state of the toner receiving unit 600 in which the toner supply port 32*r* is opened is defined as an open state.

The receiving base unit 602 includes a cylindrical portion 32*g* as a substantially cylindrical main body base portion, abase seal 506, and a shutter holding member 512. In the present embodiment, the cylindrical portion 32*g* is integrally formed with the developing container 32 (see FIG. 1A), but the present invention is not limited thereto. For example, the cylindrical portion 32*g* may be formed as a separate member from the developing container 32 and fixed to the developing container 32. Alternatively, the cylindrical portion 32*g* may be provided in a portion of the printer main body 100 other than the developing container 32, and toner may be replenished to the developing container 32 via the cylindrical portion 32*g*.

The cylindrical portion 32*g* has the replenishing port 32*a* for replenishing toner from the toner pack 40 to the storage unit 36 (see FIG. 1A) of the developing container 32, an outer peripheral portion 32*b* as a side surface extending along the axial direction D1, and the toner supply port 32*r* formed in the outer peripheral portion 32*b*. The cylindrical portion 32*g* has an engaging portion 32*e* protruding upward in the axial direction D1 from a bottom surface 32*h* thereof (see FIG. 19 A). The engaging portion 32*e* is engaged with the engaged portion 41*k* of the shutter member 41 as described below. That is, the engaging portion 32*e* has a two-chamfered boss shape corresponding to the engaged portion 41*k* having a two-chamfered hole shape.

Further, the engaging portion 32*e* is press-fitted into a hole 512*e* of the shutter holding member 512. Therefore, the hole 512*e* has a two-chamfered hole shape similarly to the engaging portion 32*e*. After a shutter member 507 of the receiving shutter unit 601 is assembled to the cylindrical portion 32*g*, the shutter holding member 512 is attached to the engaging portion 32*e* of the cylindrical portion 32*g*. In the present embodiment, the shutter holding member 512 is press-fitted and fixed to the engaging portion 32*e* of the cylindrical portion 32*g*, but the present invention is not limited thereto. For example, the shutter holding member 512 may be fixed to the cylindrical portion 32*g* by other methods such as welding, using an adhesive, or the like.

Figure 16A:
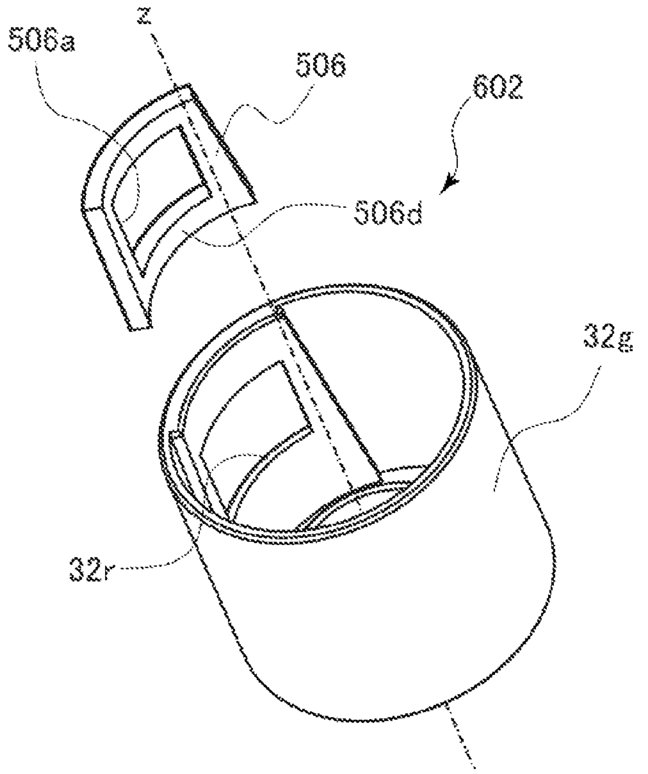
FIG. 16A is an exploded perspective view illustrating a cylindrical portion and a base seal.
Figure 16B:
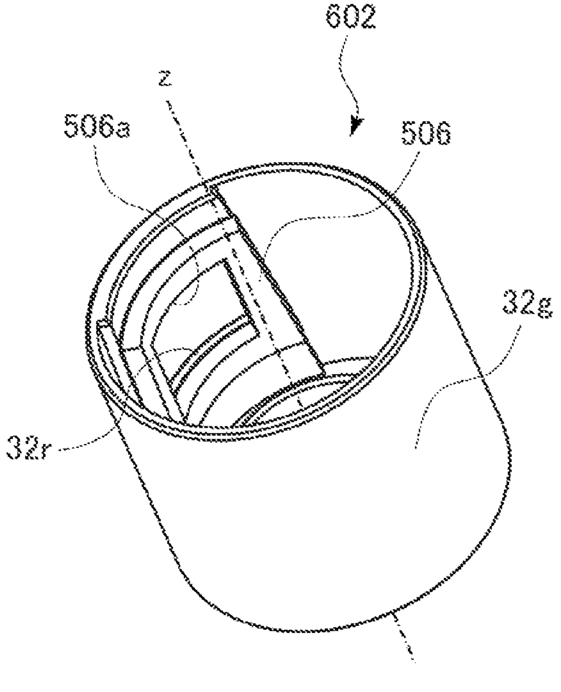
FIG. 16B is a perspective view illustrating the cylindrical portion and the base seal.

As illustrated in FIGS. 16A and 16B, the base seal 506 is made of a material such as an elastically deformable foamed urethane or a nonwoven fabric, and is fixed to the cylindrical portion 32*g* with a double-sided tape or the like. As a result, the base seal 506 can suppress toner leakage at the interface between the base seal 506 and the cylindrical portion 32*g*. The base seal 506 is provided with an opening portion 506*a* at a position corresponding to the toner supply port 32*r*, and the toner passing through the opening portion 506*a* is supplied to the storage unit 36 (see FIG. 1A) of the developing container 32 through the toner supply port 32*r*.

As illustrated in FIGS. 12A to 15 and 17, the receiving shutter unit 601 includes the shutter member 507 and a shutter sheet 505. The developing container 32 (see FIG. 1A) includes the storage unit 36, the cylindrical portion 32*g*, and the shutter member 507, and rotatably supports the developing roller 31. The toner pack 40 is configured to be mountable to the developing container 32.

The shutter member 507 includes an inner diameter portion 507*h*, an outer diameter portion 507*k*, and a protrusion 507*e* connecting the inner diameter portion 507*h* and the outer diameter portion 507*k*. The protrusion 507*e* protrudes radially inward from the outer diameter portion 507*k*, and includes a horizontal portion 507*x* having a substantially fan shape and a rising portion 507*s* extending in the axial direction D1 as illustrated in FIG. 13. The horizontal portion 507*x* is configured to pass through the groove 41*g* (see 9A) of the shutter member 41 of the toner pack 40. In addition, the rising portion 507*s* is configured to be able to pass through the groove 41*h* (see 9A) of the shutter member 41.

Figure 17A:
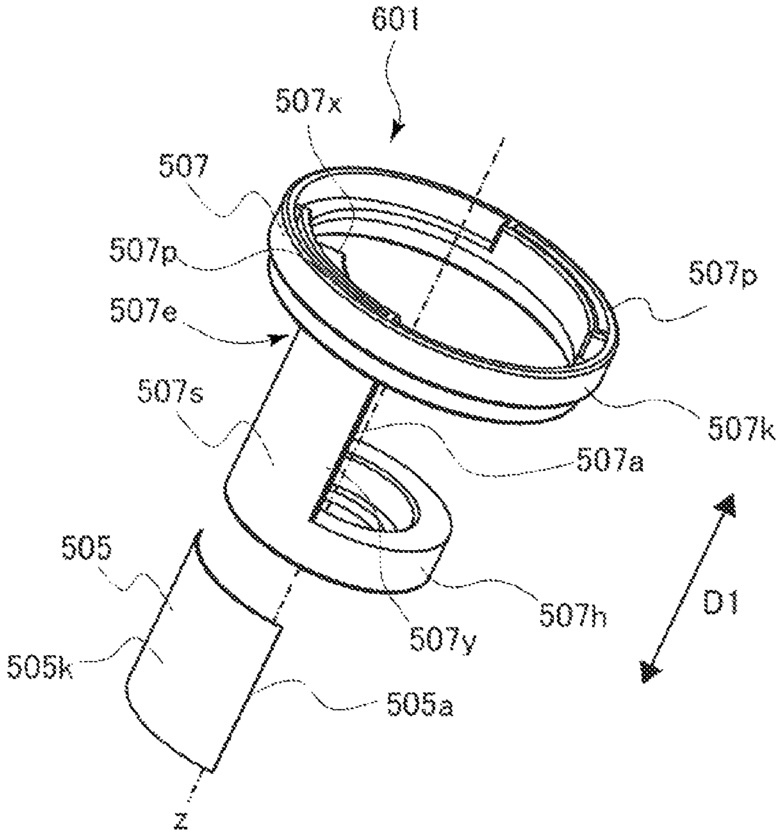
FIG. 17A is an exploded perspective view illustrating the shutter member and a shutter sheet.
Figure 17B:
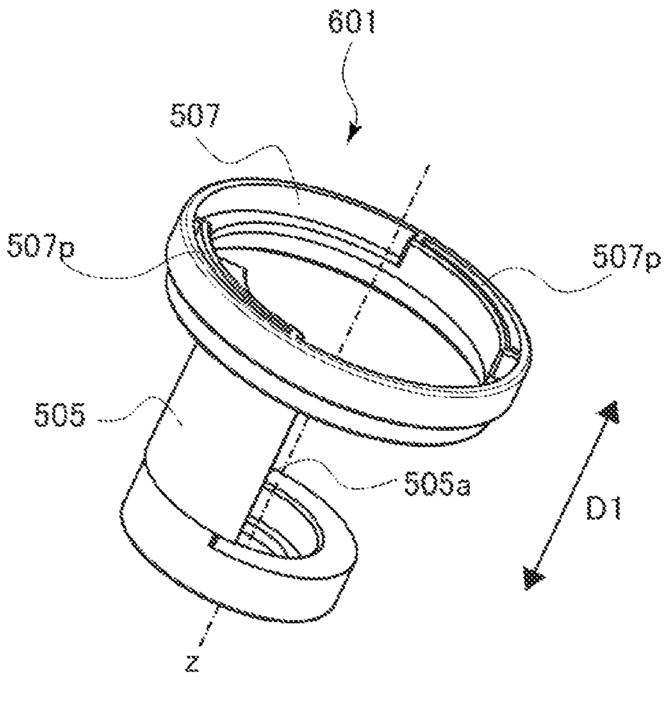
FIG. 17B is a perspective view illustrating the shutter member and the shutter sheet.

As illustrated in FIGS. 17A and 17B, the shutter sheet 505 is fixed to an outer peripheral surface of the rising portion 507*s* with a double-sided tape or the like. The shutter sheet 505 is a film having a thickness of about 100 [μm], and is disposed such that a leading end portion 505*a* of the shutter sheet 505 protrudes over an edge portion 507*a* of the rising portion 507*s*. A sliding surface 505*k* of the shutter sheet 505 is configured to be slidable with respect to a sliding surface 506*d* (see FIG. 16 A) of the base seal 506.

In the outer diameter portion 507*k* of the shutter member 507, grooves 507*p* and 507*p* with which the ribs 510*b* (see FIG. 8A) formed in the outer ring member 510 of the toner pack 40 can be engaged are formed. The grooves 507*p* and 507*p* are disposed to face each other in the radial direction, and are formed to extend circumferentially in a partial range (about 90°) of the outer diameter portion 507*k* in the circumferential direction. Therefore, the upper portion of the outer diameter portion 507*k* is divided into four sections by the grooves 507*p* and 507*p*, and the four ribs 510*b* of the outer ring member 510 are engaged with these four sections. As a result, the toner pack 40 is configured to be rotatable only in a range of about 90° in a state of being mounted on the toner receiving unit 600. Therefore, when the toner is replenished from the toner pack 40 to the developing container 32, the range in which the rotary container unit 401 of the toner pack 40 is rotated becomes clear, and usability can be improved.

Figure 18:
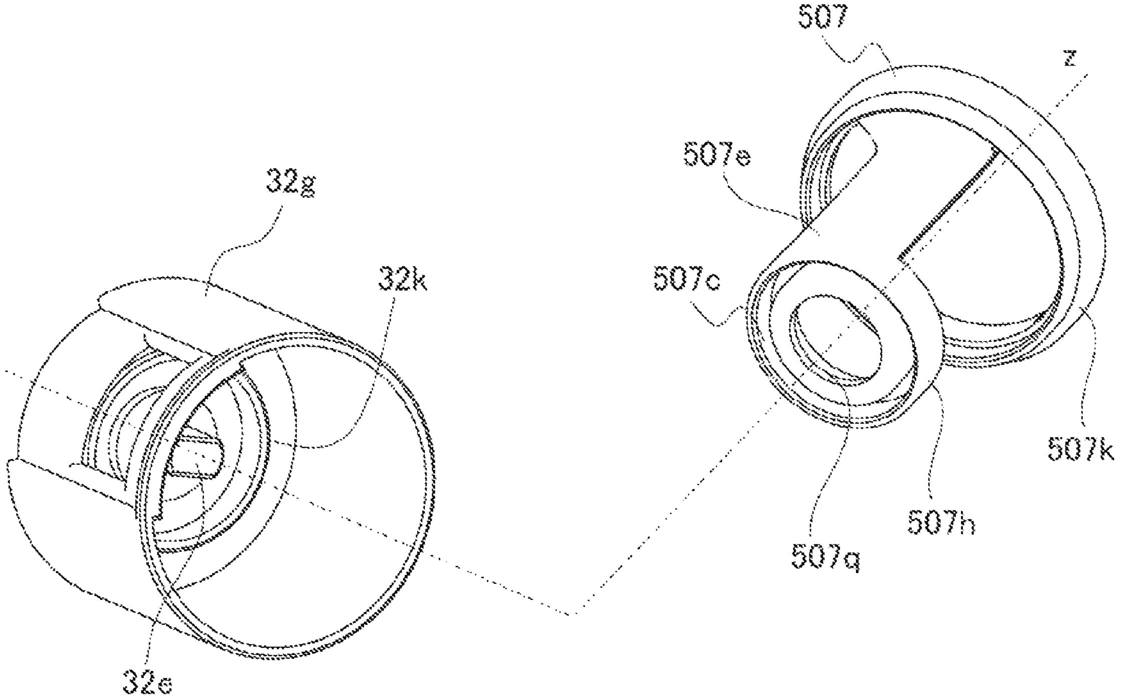
FIG. 18 is an exploded perspective view illustrating the cylindrical portion and the shutter member.
Figure 19A:
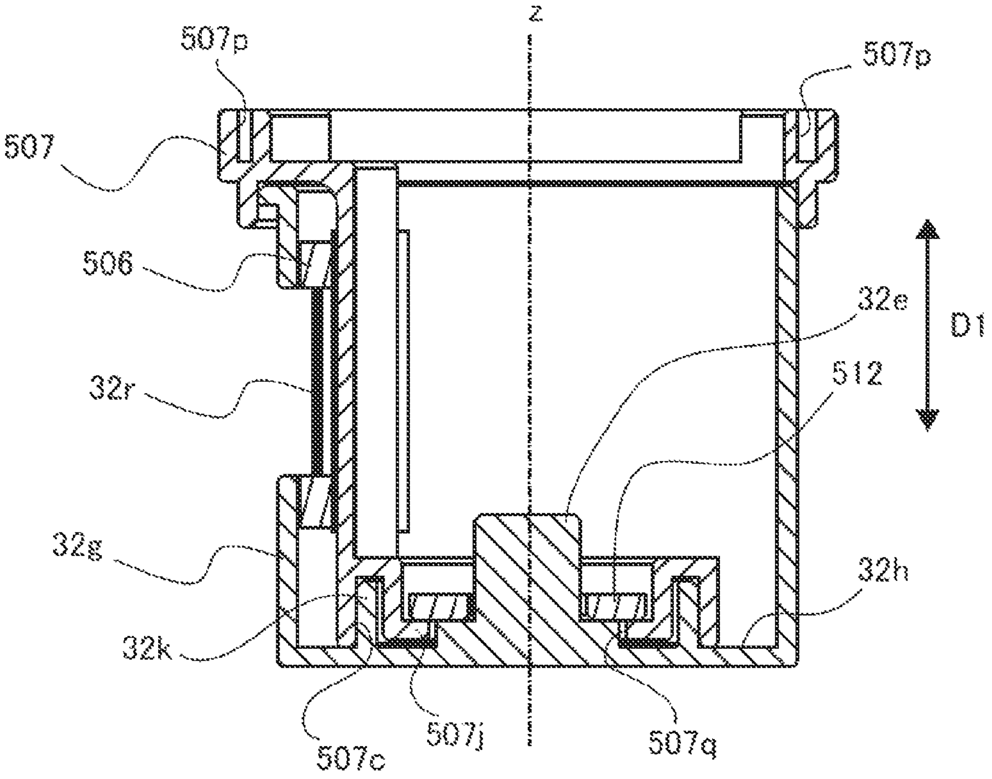
FIG. 19A is a cross-sectional view illustrating the toner receiving unit in the shielded state.
Figure 19B:
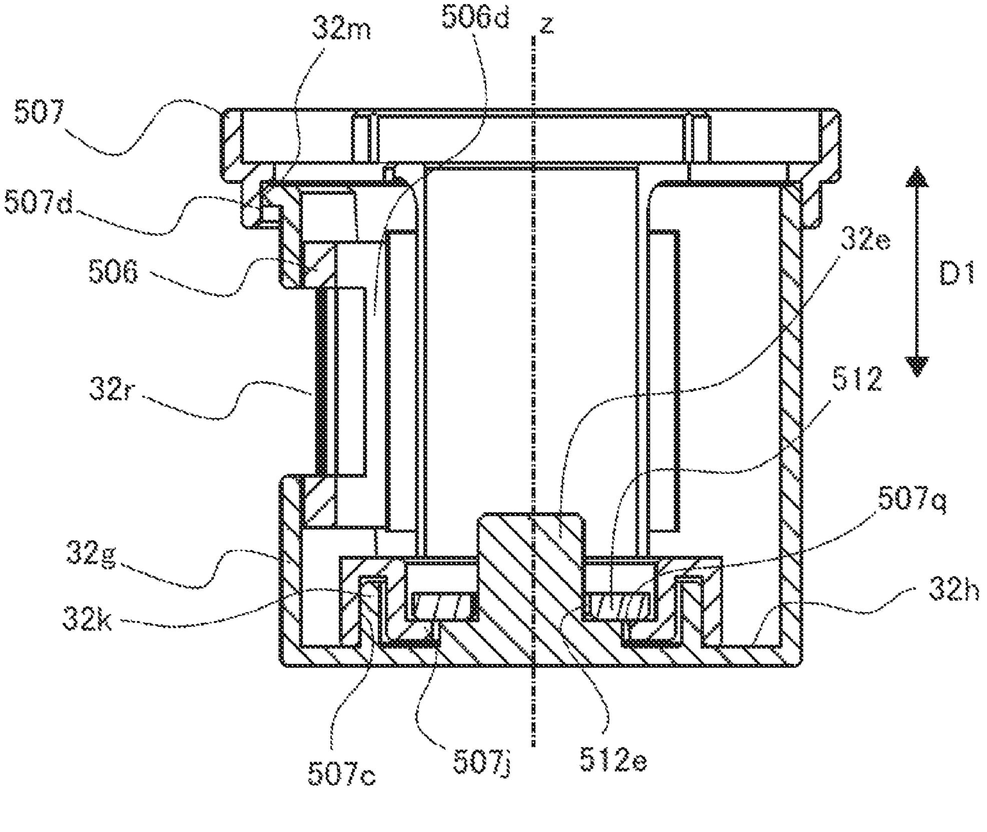
FIG. 19B is a cross-sectional view illustrating the toner receiving unit in the open state.

As illustrated in FIG. 18, a guide groove 507*c* is formed in the inner diameter portion 507*h* of the shutter member 507, and a guide rib 32*k* of the cylindrical portion 32*g* is inserted into the guide groove 507*c*. As illustrated in FIGS. 18 to 19B, the guide groove 507*c* and the guide rib 32*k* are respectively cylindrical groove and protrusion concentric with the rotation axis z. Therefore, when the guide rib 32*k* is inserted into the guide groove 507*c*, the shutter member 507 is guided to be rotatable about the rotation axis z with respect to the cylindrical portion 32*g*.

An inner peripheral surface 507*d* of the shutter member 507 is provided so as to be slidable on a rib 32*m* of the cylindrical portion 32*g*. In this manner, the shutter member 507 is supported so as to be rotatable about the rotation axis z with respect to the cylindrical portion 32*g*.

Furthermore, the inner diameter portion 507*h* of the shutter member 507 is formed with a hole 507*q* disposed on the radially inner side of the guide groove 507*c*. Although the engaging portion 32*e* penetrates the hole 507*q*, the outer diameter of the hole 507*q* is set to be larger than the outermost diameter of the engaging portion 32*e*, and the shutter member 507 is freely rotatable without interfering with the engaging portion 32*e*.

Then, after the shutter member 507 is assembled to the cylindrical portion 32*g*, the shutter holding member 512 is press-fitted into the engaging portion 32*e*. As a result, a rib 507*j* of the shutter member 507 is sandwiched between the bottom surface 32*h* of the cylindrical portion 32*g* and the shutter holding member 512 in the axial direction D1. As a result, the movement of the shutter member 507 in the axial direction D1 is restricted. That is, the receiving shutter unit 601 including the shutter member 507 is attached to the receiving base unit 602 including the cylindrical portion 32*g* and the shutter holding member 512 so as to be relatively rotatable about the rotation axis z and immovable in the axial direction D1 and the radial direction.

The base seal 506 fixed to the cylindrical portion 32*g* is pressed and deformed in a direction approaching the cylindrical portion 32*g*, that is, outward in the radial direction orthogonal to the axial direction D1 by the shutter sheet 505 fixed to the shutter member 507. As a result, a surface pressure is generated between the sliding surface 506*d* of the base seal 506 and the sliding surface 505*k* (see FIG. 17A) of the shutter sheet 505. Therefore, even when toner is stored in the developing container 32 in the state of the developing container 32 alone, toner leakage at the interface between the base seal 506 and the shutter sheet 505 can be suppressed.

Coupling Between Toner Pack and Cylindrical Portion of Developing Container

Figure 3A:
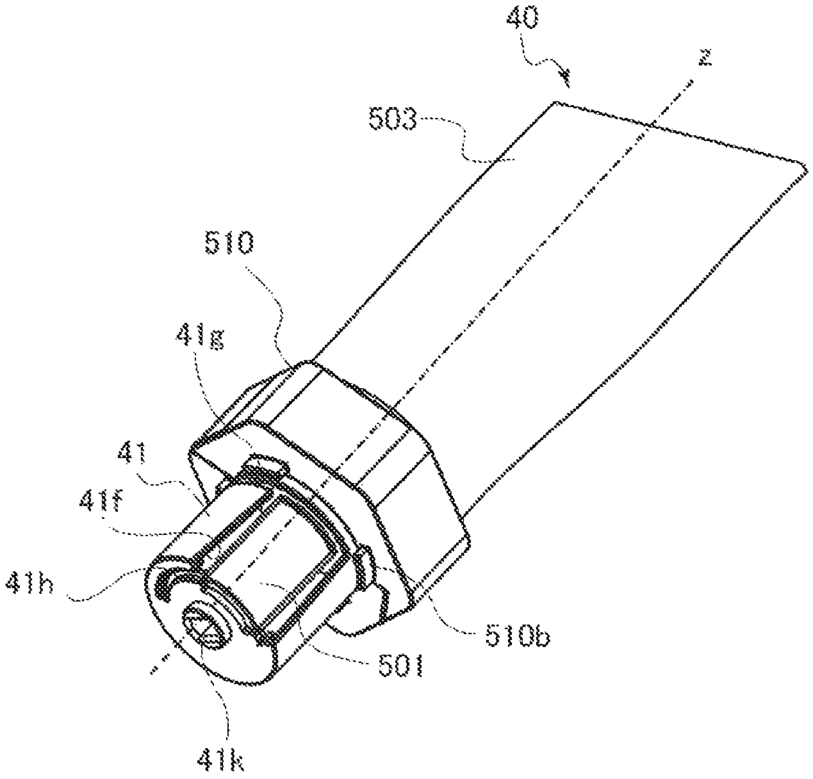
FIG. 3A is a perspective view illustrating a toner pack.
Figure 3B:
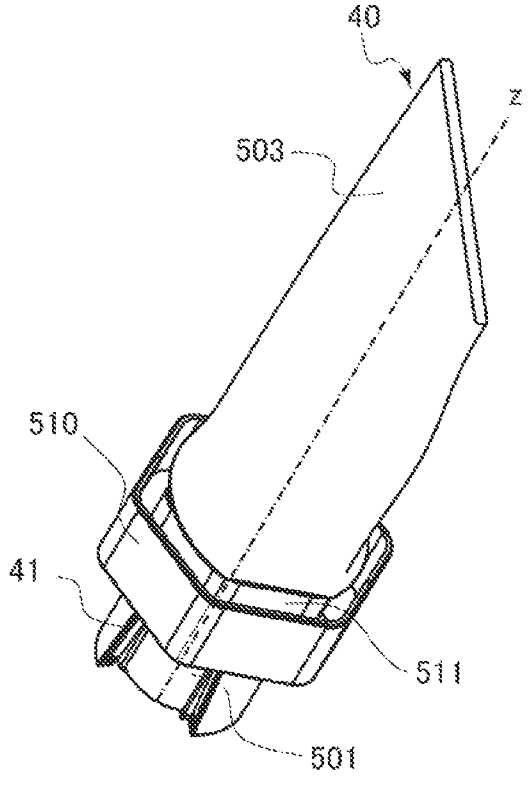
FIG. 3B is a perspective view illustrating the toner pack.
Figure 4:
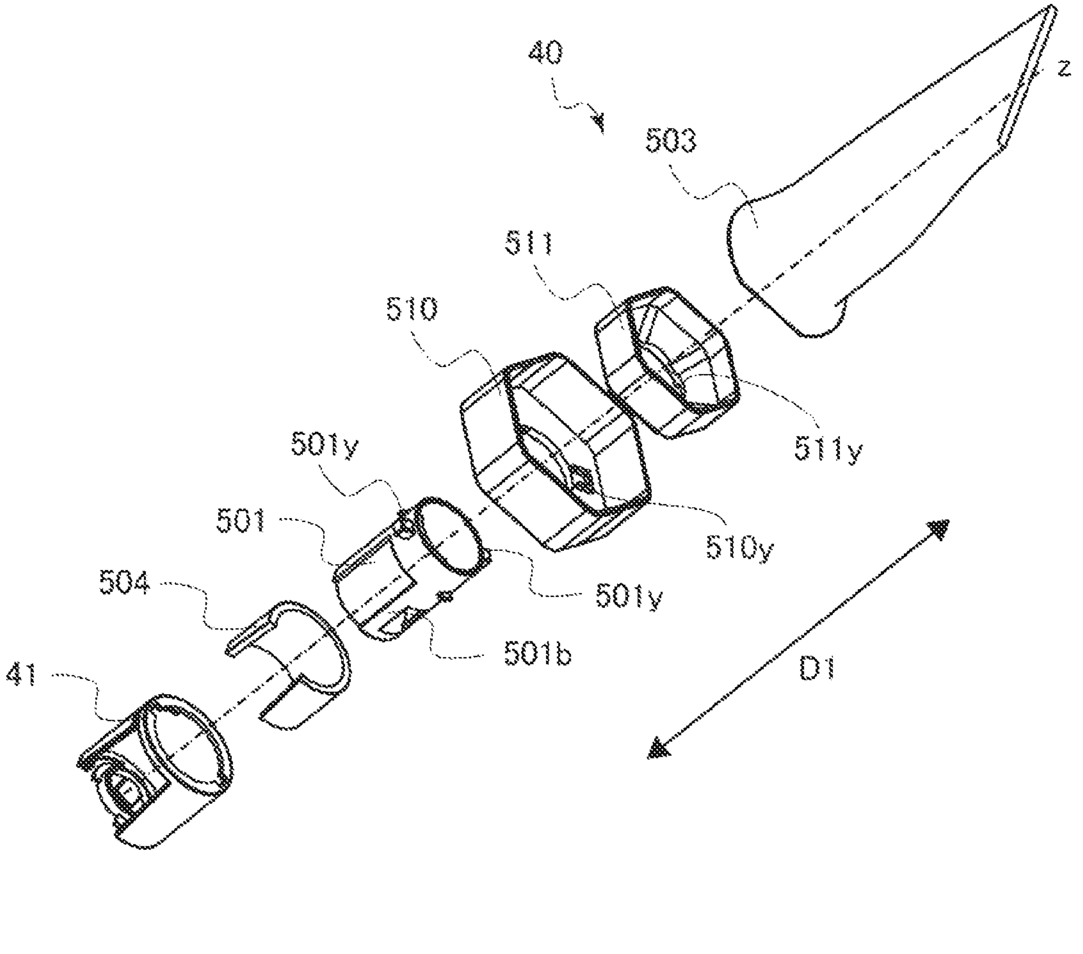
FIG. 4 is an exploded perspective view illustrating the toner pack.

Next, a coupling operation and an uncoupling operation between the toner pack 40 and the developing container 32, and an opening/closing operation of the toner discharge port 501*r* and the toner supply port 32*r* will be described. FIGS. 3A and 11A illustrate a shielded state of the toner pack 40 in which the toner discharge port 501*r* is shielded by the seal member 504 attached to the shutter member 41. FIGS. 12A and 13A illustrate a shielded state of the toner receiving unit 600 in which the toner supply port 32*r* is shielded by the shutter sheet 505 attached to the shutter member 507.

Normally, when the toner replenishing to the developing container 32 is started, both the toner pack 40 and the toner receiving unit 600 are in a shielded state. In other words, when the replenishing base 501 is at the first shielding position, the toner discharge port 501*r* is at a position that does not overlap the toner supply port 32*r* of the cylindrical portion 32*g* and the shutter member 507 is at a second shielding position when viewed from the radial direction orthogonal to the axial direction D1.

Figure 20A:
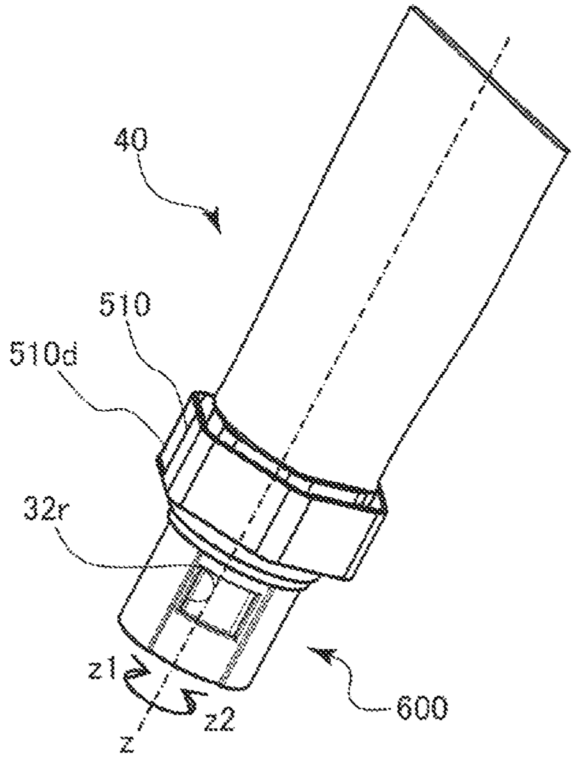
FIG. 20A is a perspective view illustrating the toner receiving unit and the toner pack in the shielded state.

Then, as illustrated in FIG. 20A, the user fits the toner pack 40 into the toner receiving unit 600. At this time, the engaged portion 41*k* (see FIG. 3A) formed in the shutter member 41 of the toner pack 40 is engaged with the engaging portion 32*e* formed in the cylindrical portion 32*g* of the toner receiving unit 600.

Each of the engaged portion 41*k* and the engaging portion 32*e* has a two-chamfered shape, and since these portions are engaged with each other, the shutter member 41 is attached to the cylindrical portion 32*g* so as not to be rotatable about the rotation axis z. That is, when the toner pack 40 is mounted on the image forming apparatus 1, the engaged portion 41*k* is engaged with the engaging portion 32*e* of the image forming apparatus 1 to restrict the rotation of the shutter member 41 about the rotation axis z.

In other words, the toner pack 40 is mounted on the image forming apparatus 1 so that the rotation of the shutter member 507 about the rotation axis z with respect to the cylindrical portion 32*g* is restricted and the replenishing base 501 rotates together with the shutter member 507.

In addition, the protrusion 507*e* (see FIG. 13 A) formed on the shutter member 507 of the toner receiving unit 600 penetrates the cutout portion 41*f* of the shutter member 41 of the toner pack 40 and is engaged with the concave portion 501*f*(see FIG. 8 A) formed in the replenishing base 501. In a case where both the toner pack 40 and the toner receiving unit 600 are in the shielded state, when the toner pack 40 is fitted into the toner receiving unit 600, the engagement of the engaged portion 41*k* and the engaging portion 32*e* and the engagement of the protrusion 507*e* and the concave portion 501*f* can be performed simultaneously.

Here, a case is considered in which the user rotates the outer peripheral surface 510*d* of the outer ring member 510 in the direction of arrow z1 about the rotation axis z from the state illustrated in FIG. 20A to replenish the toner in the toner pack 40 to the developing container 32. When the outer ring member 510 is rotated in the direction of arrow z1, the replenishing base 501 is also rotated in the direction of arrow z1 in conjunction therewith. At this time, a step portion 501*n* (see FIG. 8 A) of the concave portion 501*f* of the replenishing base 501 presses an end surface 507*f* (see FIG. 13 A) as an abutted portion of the protrusion 507*e* of the shutter member 507.

In other words, when the toner pack 40 is mounted on the image forming apparatus 1, the step portion 501*n* as an abutting portion abuts on the end surface 507*f* such that the shutter member 507 rotates together with the shutter member 41 about the rotation axis z. As a result, the shutter member 507 as a main body shutter rotates in the direction of arrow z1 about the rotation axis z together with the replenishing base 501.

On the other hand, since the cylindrical portion 32*g* of the toner receiving unit 600 and the shutter member 41 of the toner pack 40 are restricted from rotating as described above, they do not rotate. Therefore, as illustrated in FIG. 11B, the replenishing base 501 of the toner pack 40 rotates relative to the shutter member 41 in the direction of arrow z1, and the toner discharge port 501*r* faces the cutout portion 41*f* of the shutter member 41. That is, the toner pack 40 becomes the open state, and the toner stored in the toner pack 40 can be discharged.

At the same time, as illustrated in FIG. 13B, the shutter member 507 of the toner receiving unit 600 rotates relative to the cylindrical portion 32*g* in the direction of arrow z1, and the shutter sheet 505 fixed to the shutter member 507 is separated from the toner supply port 32*r*. That is, the toner receiving unit 600 becomes the open state and can receive the toner discharged from the toner pack 40. In other words, the shutter member 507 is located at a second open position that opens the toner supply port 32*r* such that the toner replenished from the toner pack 40 is received in the storage unit 36 of the developing container 32 via the toner supply port 32*r*. When the replenishing base 501 is at the first open position, the toner discharge port 501*r* is at a position overlapping the toner supply port 32*r* of the cylindrical portion 32*g* and the shutter member 507 is at the second open position when viewed from the radial direction orthogonal to the axial direction D1.

Figure 20B:
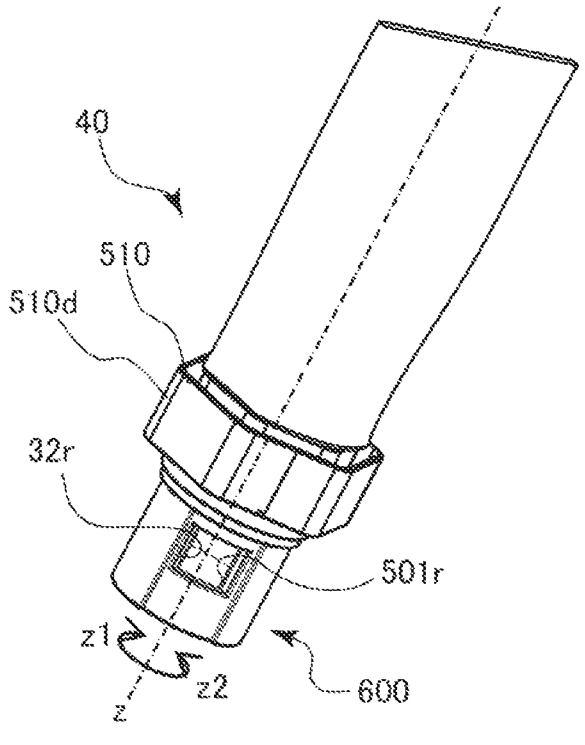
FIG. 20B is a perspective view illustrating the toner receiving unit and the toner pack in the open state.

As a result, as illustrated in FIG. 20B, the toner stored in the toner pack 40 is replenished to the developing container 32 through the toner supply port 32*r* and the toner discharge port 501*r*. The rotation angle of the outer ring member 510 is restricted to approximately 90° by the engagement between the protrusion 507*e* of the shutter member 507 and the grooves 41*g* and 41*h* of the shutter member 41 and the engagement between the rib 510*b* of the outer ring member 510 and the groove 507*p* of the shutter member 507. Note that the rotation angle of the outer ring member 510 is not limited to about 90°, and may be less than 90° or 90° or more.

In addition, since the protrusion 507*e* of the shutter member 507 is engaged with the groove 41*g* of the shutter member 41, the toner pack 40 cannot move in the axial direction D1 with respect to the toner receiving unit 600, and the toner pack 40 can be locked with respect to the toner receiving unit 600. As a result, it is possible to reduce scattering of the toner inside the image forming apparatus 1 due to unintentional detachment of the toner pack 40 from the toner receiving unit 600 during toner replenishing, and it is possible to improve workability of the toner replenishing operation.

Next, a case will be considered in which the user rotates the outer peripheral surface 510*d* of the outer ring member 510 in the direction of arrow z2 about the rotation axis z from the state illustrated in FIG. 20B to detach the toner pack 40 from the cylindrical portion 32*g* of the developing container 32. When the outer ring member 510 is rotated in the direction of arrow z2, the replenishing base 501 is also rotated in the direction of arrow z2 in conjunction therewith. At this time, a step portion 501*m* (see FIG. 8A) of the concave portion 501*f* of the replenishing base 501 presses an end surface 507*g* (see FIG. 13B) of the protrusion 507*e* of the shutter member 507. As a result, the shutter member 507 rotates in the direction of arrow z2 about the rotation axis z together with the replenishing base 501.

On the other hand, since the cylindrical portion 32*g* of the toner receiving unit 600 and the shutter member 41 of the toner pack 40 are restricted from rotating as described above, they do not rotate. Therefore, as illustrated in FIG. 11A, the replenishing base 501 of the toner pack 40 rotates relative to the shutter member 41 in the direction of arrow z2, and the toner discharge port 501*r* faces the seal member 504 (see FIG. 10 A) fixed to the shutter member 41. That is, the toner pack 40 is in the shielded state, and the toner stored in the toner pack 40 cannot be discharged.

At the same time, as illustrated in FIG. 13A, the shutter member 507 of the toner receiving unit 600 rotates relative to the cylindrical portion 32*g* in the direction of arrow z2, and the shutter sheet 505 fixed to the shutter member 507 covers the toner supply port 32*r*. That is, the toner receiving unit 600 becomes the shielded state and cannot receive the toner discharged from the toner pack 40. At this time, the shutter member 507 is located at the second shielding position that shields the toner supply port 32*r*.

In this state, since the protrusion 507*e* of the shutter member 507 is separated from the grooves 41*g* and 41*h* of the shutter member 41, the toner pack 40 can be removed from the toner receiving unit 600. Since both the toner pack 40 and the toner receiving unit 600 are in the shielded state, the toner pack 40 can be removed from the toner receiving unit 600 without scattering the toner.

Toner Leakage Suppression Configuration

Next, a configuration for suppressing toner leakage between the toner pack 40 and the toner receiving unit 600 will be described with reference to FIGS. 21A to 23B. FIGS. 21A to 23B are schematic cross-sectional views illustrating an arrangement relationship between the toner pack 40 and the toner receiving unit 600 of the developing container 32. Each of the seal member 504 and the base seal 506 is disposed on a cylindrical curved surface, but is schematically illustrated as a plane here.

In FIGS. 21A to 23B, the toner pack 40 and the toner receiving unit 600 are viewed in the axial direction D1. When the outer ring member 510 (see FIG. 20A) of the toner pack 40 is rotated in the direction of arrow z1, the replenishing base 501 moves in the left direction in FIGS. 21A to 23B.

Figure 21A:
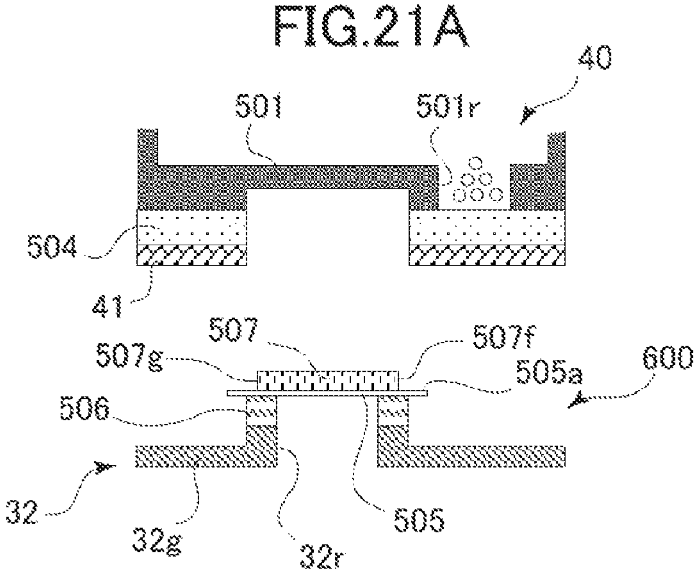
FIG. 21A is a cross-sectional view illustrating a state before the toner pack is mounted on a developing container.
Figure 21B:
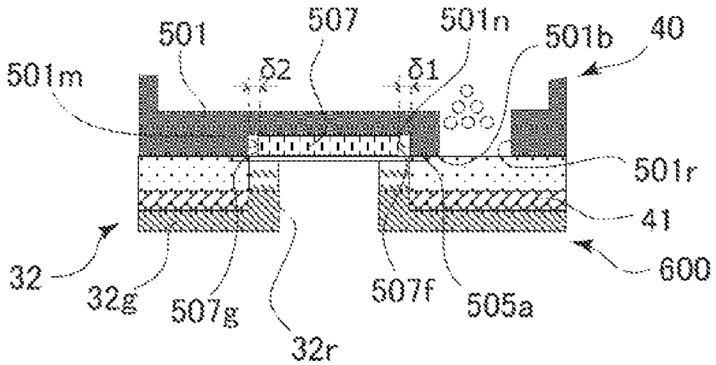
FIG. 21B is a cross-sectional view illustrating a state in which the toner pack is mounted on the developing container.

FIG. 21A illustrates a state before the developing container 32 and the toner pack 40 are coupled. FIG. 21B illustrates a state in which the toner pack 40 is mounted on the developing container 32 from the state illustrated in FIG. 21A, and illustrates a state before the replenishing base 501 of the toner pack 40 and the shutter member 507 of the toner receiving unit 600 rotate. In the state illustrated in FIG. 21B, the toner supply port 32*r* and the toner discharge port 501*r* are shielded, and the toner stored in the pouch 503 (see FIG. 3A) is not discharged to the outside of the toner pack 40.

Figure 21C:
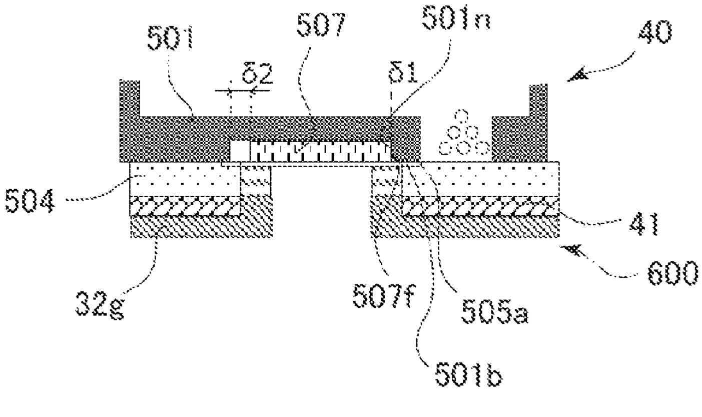
FIG. 21C is a cross-sectional view illustrating a state in which the replenishing base rotates by a predetermined angle from the state illustrated in FIG. 21B.
Figure 22A:
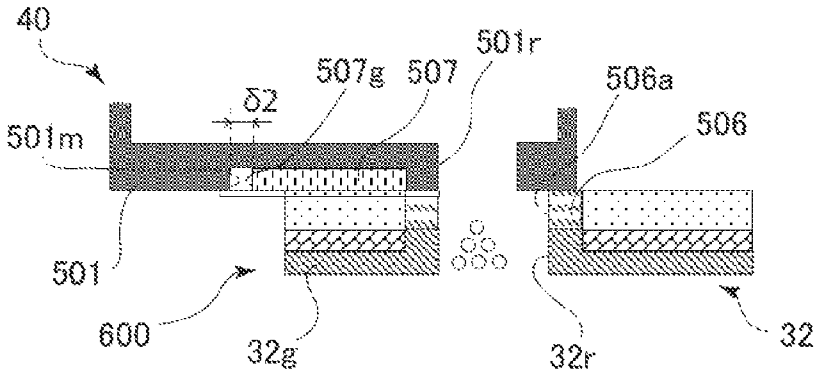
FIG. 22A is a cross-sectional view illustrating a state in which a toner supply port and a toner discharge port are opened.

FIG. 21C illustrates a state in which the replenishing base 501 and the shutter member 507 are rotated by an angle Θ1 (0°<Θ1<90°) in the direction of arrow z1 (see FIG. 20A) about the rotation axis z from the state illustrated in FIG. 21B. FIG. 22A illustrates a state in which the replenishing base 501 and the shutter member 507 are rotated by 90° in the direction of arrow z1 (see FIG. 20*a*) from the state illustrated in FIG. 21B, and illustrates a state in which the toner supply port 32*r* and the toner discharge port 501*r* are opened.

As illustrated in FIG. 21B, in a state where the toner pack 40 in the shielded state is mounted on the toner receiving unit 600 in the shielded state, the leading end portion 505*a* of the shutter sheet 505 is disposed so as to be in contact with the outer peripheral portion 501*b* of the replenishing base 501. The step portion 501*n* of the replenishing base 501 is disposed with a gap δ1 in the circumferential direction around the rotation axis z with respect to the end surface 507*f* of the shutter member 507. The step portion 501*m* of the replenishing base 501 is disposed with a gap 62 in the circumferential direction around the rotation axis z with respect to the end surface 507*g* of the shutter member 507.

These gaps δ1 and δ2 correspond to gaps (allowances) when the user mounts the toner pack 40 on the developing container 32. Due to the presence of the gaps δ1 and δ2, the toner pack 40 can be easily mounted on the developing container 32, and mountability of the toner pack 40 can be improved.

After the toner pack 40 is mounted on the toner receiving unit 600 of the developing container 32, the user rotates the replenishing base 501 in the direction of arrow z1. Then, as illustrated in FIG. 21C, the gap δ1 existing in FIG. 21B disappears, and the step portion 501*n* of the replenishing base 501 comes into contact with the end surface 507*f* of the shutter member 507. Then, the end surface 507*f* is pressed by the step portion 501*n*, and the replenishing base 501 and the shutter member 507 integrally rotate in the direction of arrow z1. At this time, the gap 62 has a space wider than the initial state. Further, the leading end portion 505*a* of the shutter sheet 505 is configured to abut on the outer peripheral portion 501*b* without being separated from the outer peripheral portion 501*b* of the replenishing base 501.

Further, when the user rotates the replenishing base 501 in the direction of arrow z, as illustrated in FIG. 22A, the toner discharge port 501*r* and the toner supply port 32*r* are opened without being covered by the shutter sheet 505 and the shutter member 507. As a result, the toner stored in the toner pack 40 is supplied into the developing container 32 through the toner discharge port 501*r* and the toner supply port 32*r*. At the time of supplying the toner, the base seal 506 suppresses entry of the toner into the interface with the replenishing base 501.

Figure 22B:
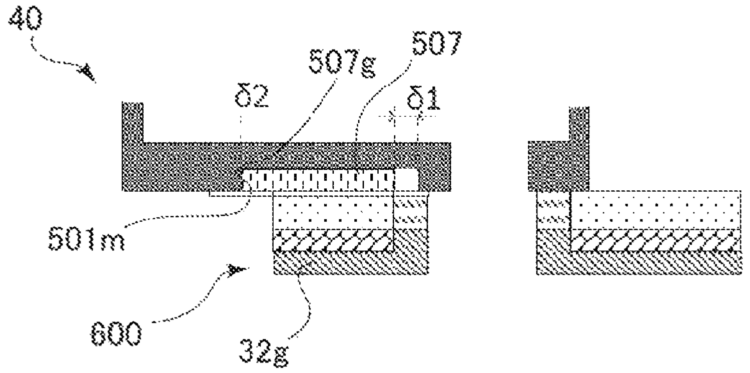
FIG. 22B is a cross-sectional view illustrating a state in which the replenishing base rotates by a predetermined angle from the state illustrated in FIG. 22A.

Next, when the toner discharge from the toner pack 40 is finished and the toner pack 40 is to be removed, as illustrated in FIG. 22B, the user rotates the replenishing base 501 by an angle Θ3 (0°<Θ3<90°) in the direction of arrow z2 (right direction in the drawing) from the state of FIG. 22A. As a result, the step portion 501*m* of the replenishing base 501 comes into contact with the end surface 507*g* of the shutter member 507, and the gap 62 existing in FIG. 22A is eliminated. The end surface 507*g* is pressed by the step portion 501*m*, and the replenishing base 501 and the shutter member 507 integrally rotate in the direction of arrow z2. At this time, the gap δ1 has a space wider than the initial state.

Figure 23A:
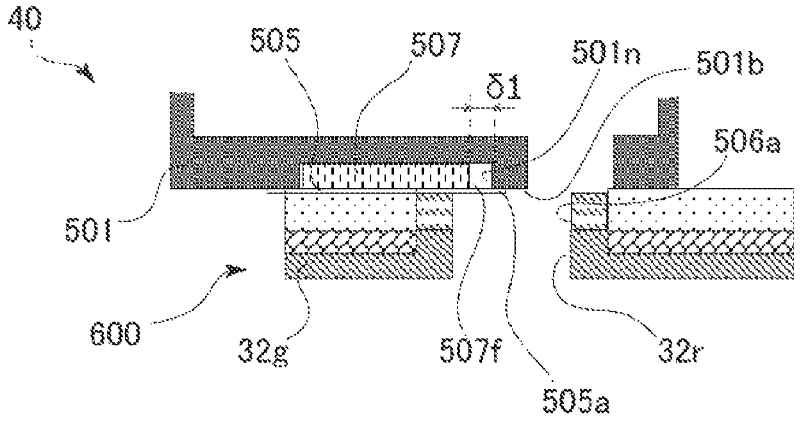
FIG. 23A is a cross-sectional view illustrating a state in which the replenishing base rotates by a predetermined angle from the state illustrated in FIG. 22B.

Further, when the user rotates the replenishing base 501 in the direction of arrow z2, as illustrated in FIG. 23A, the gap δ1 formed by the step portion 501*n* of the replenishing base 501 and the end surface 507*f* of the shutter member 507 is located above the toner supply port 32*r*. At this time, since the leading end portion 505*a* of the shutter sheet 505 is in contact with the outer peripheral portion 501*b* of the replenishing base 501, entry of toner into the gap δ1 can be suppressed.

Figure 23B:
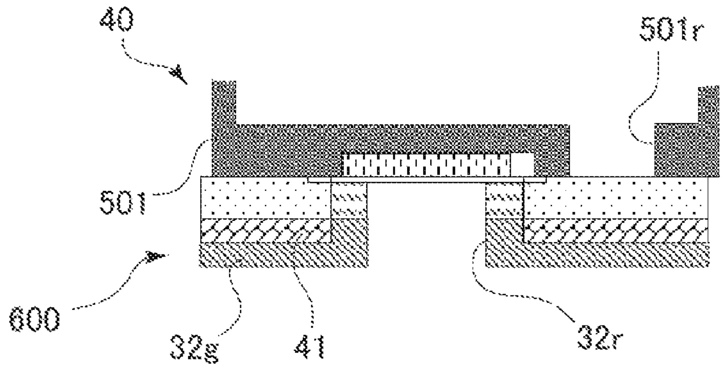
FIG. 23B is a cross-sectional view illustrating a state in which the toner supply port and the toner discharge port are shielded.

When the user further rotates the replenishing base 501 in the direction of arrow z2, as illustrated in FIG. 23B, the toner discharge port 501*r* is shielded by the seal member 504, and the toner supply port 32*r* is shielded by the shutter sheet 505 and the shutter member 507. In this state, the toner pack 40 can be detached from the cylindrical portion 32*g* of the developing container 32, and when the toner pack 40 is detached from the cylindrical portion 32*g*, the state returns to the state illustrated in FIG. 21A. As described above, an embodiment of a toner container and an image forming system can be provided.

In the present embodiment, when the toner pack 40 is switched from the shielded state to the open state, the toner discharge port 501*r* is reliably shielded by the seal member 504 and the leading end portion 505*a* of the shutter sheet 505. Therefore, the toner in the toner pack 40 is prevented from leaking out from the toner discharge port 501*r*, and usability can be improved.

When the toner pack 40 is switched from the open state to the shielded state, the space between the step portion 501*n* and the end surface 507*f* corresponding to the gap δ1 illustrated in FIG. 23A is reliably shielded by the leading end portion 505*a* of the shutter sheet 505. Therefore, a case in which toner enters the gap 61, and the toner inside the gap δ1 scatters when the toner pack 40 is removed is suppressed, and usability can be improved.

The toner discharge port 501*r* of the toner pack 40 is formed in an outer peripheral portion 501*b*, which extends in the axial direction D1, of the replenishing base 501. Therefore, for example, as compared with a case where the toner discharge port 501*r* is formed at the end portion in the axial direction D1 of the toner pack 40 (for example, the end surface perpendicular to the axial direction D1), the opening area of the toner discharge port 501*r* can be made large, and the toner replenishing efficiency can be improved. Further, the outer diameters of the replenishing base 501 and the cylindrical portion 32*g* can be reduced.

In the present embodiment, the replenishing base 501 is disposed on the inner peripheral surface side of the shutter member 41. For example, when the toner contained in the developing container 32 is full during toner replenishment and only a part of the toner in the toner pack 40 can be replenished, the toner (grinding toner) is accumulated in the toner discharge port 501*r* of the replenishing base 501. Before the toner pack 40 is dismounted from the developing container 32, the toner pack is rotated in a state of being mounted on the developing container 32 and is switched from an open state to a shielded state. At this time, the toner discharge port 501*r* is shielded by the shutter member 41 from the outer peripheral surface side of the toner discharge port 501*r*. Therefore, the toner pack 40 is dismounted from the developing container 32 in a state where the grinding toner accumulated in the toner discharge port 50 iris reliably sealed by the shutter member 41, and scattering of the grinding toner to the outside of the developing container 32 can be reduced.

In the present embodiment, the engaged portion 41*k* formed in the shutter member 41 of the toner pack 40 is engaged with the engaging portion 32*e* of the cylindrical portion 32*g*, but the present invention is not limited thereto. Each of the engaged portion 41*k* and the engaging portion 32*e* has a two-chamfered shape, but the present invention is not limited thereto. For example, the engaged portion 41*k* may be formed of a two-chamfered boss shape, and the engaging portion 32*e* may be formed of a two-chamfered hole shape. Further, regardless of the shapes of the engaged portion 41*k* and the engaging portion 32*e*, they may be press-fitted to each other or engaged by a snap-fit shape.

Second Embodiment

Next, a second embodiment of the present invention will be described. In the second embodiment, the shutter member 507 of the toner receiving unit 600 of the first embodiment is changed to a shutter member 507B. Therefore, configurations similar to those of the first embodiment will be described by omitting illustration or attaching the same reference numerals to the drawings.

Figure 15:
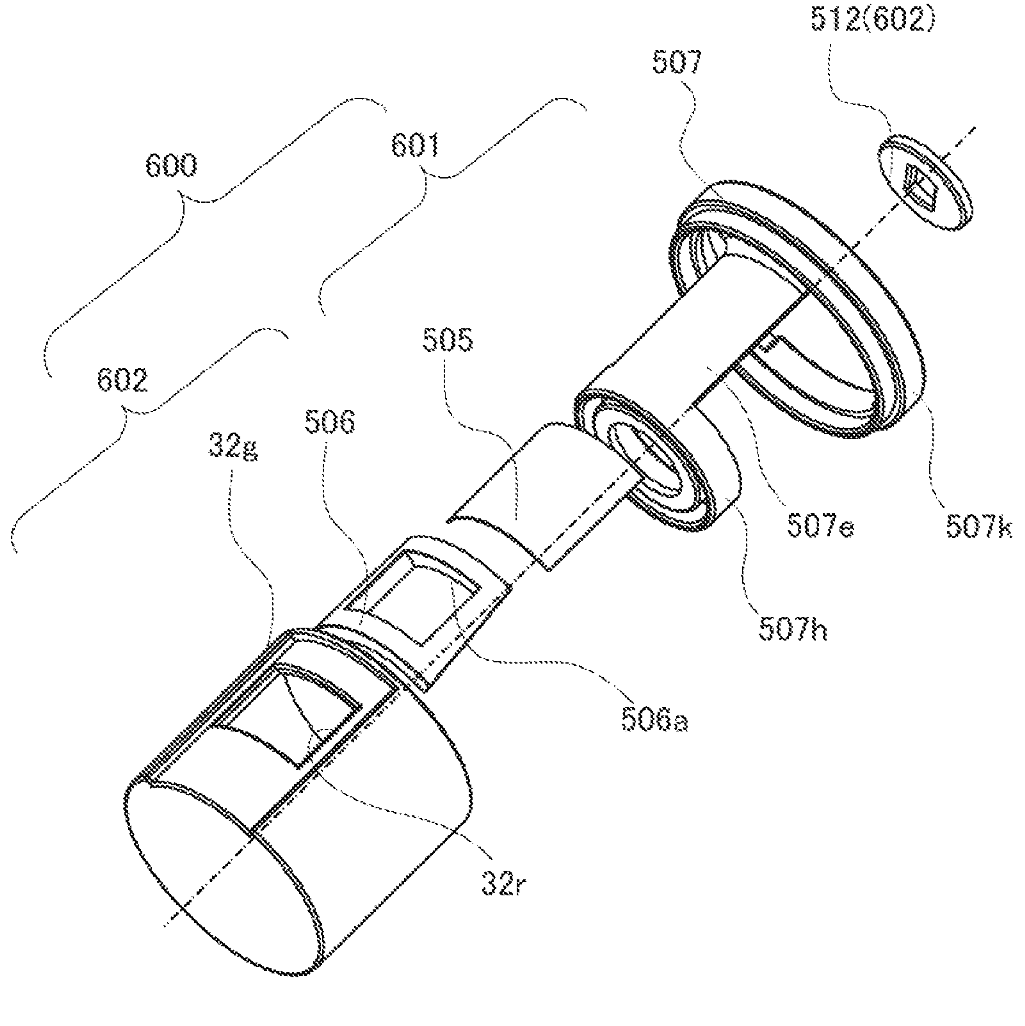
FIG. 15 is an exploded perspective view illustrating the toner receiving unit.

As in the first embodiment, the shutter member 507B according to the second embodiment includes an inner diameter portion 507*h*, an outer diameter portion 507*k*, and a protrusion 507*e* as illustrated in FIG. 15. That is, a shutter member 507B is different only in that a fitting portion 513 is provided in addition to the shutter member 507 of the first embodiment.

Figure 24A:
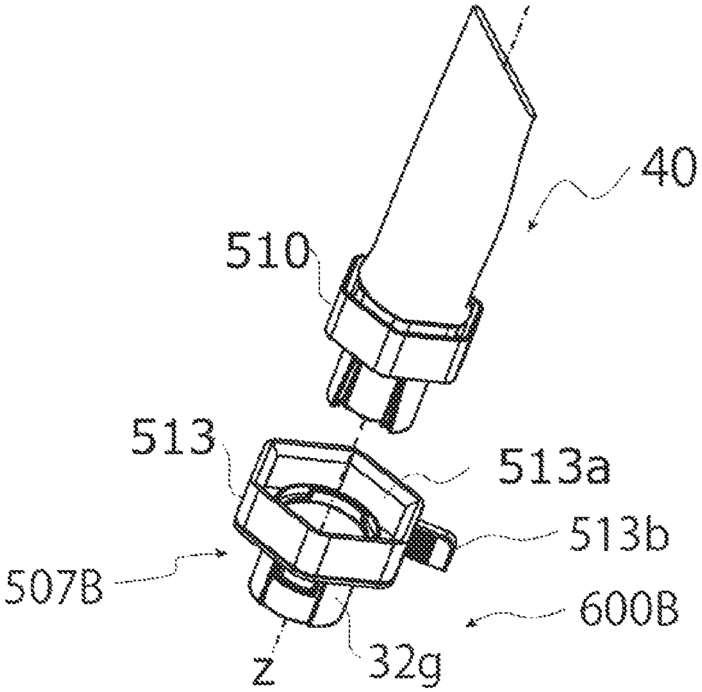
FIG. 24A is an exploded perspective view illustrating a shutter member and a toner pack according to a second embodiment.
Figure 24B:
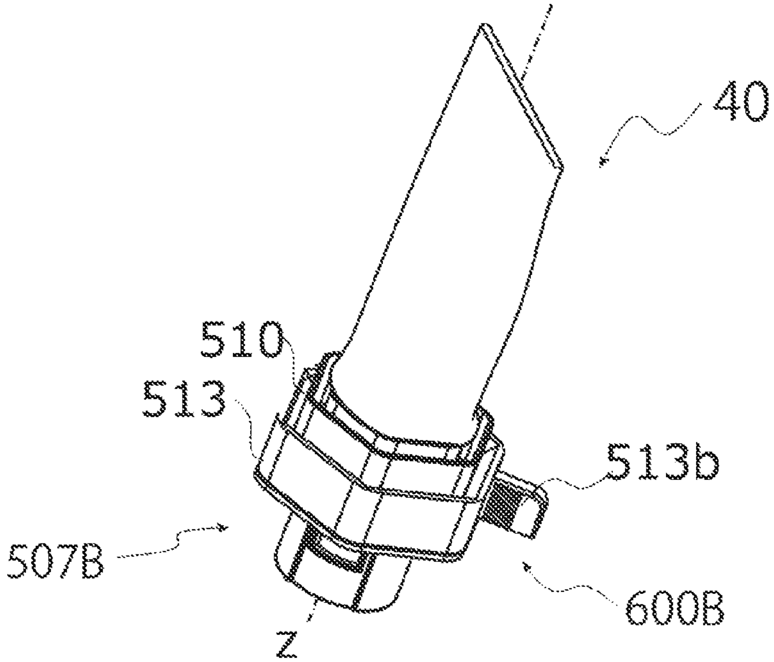
FIG. 24B is a perspective view illustrating the shutter member and the toner pack according to the second embodiment.
Figure 25:
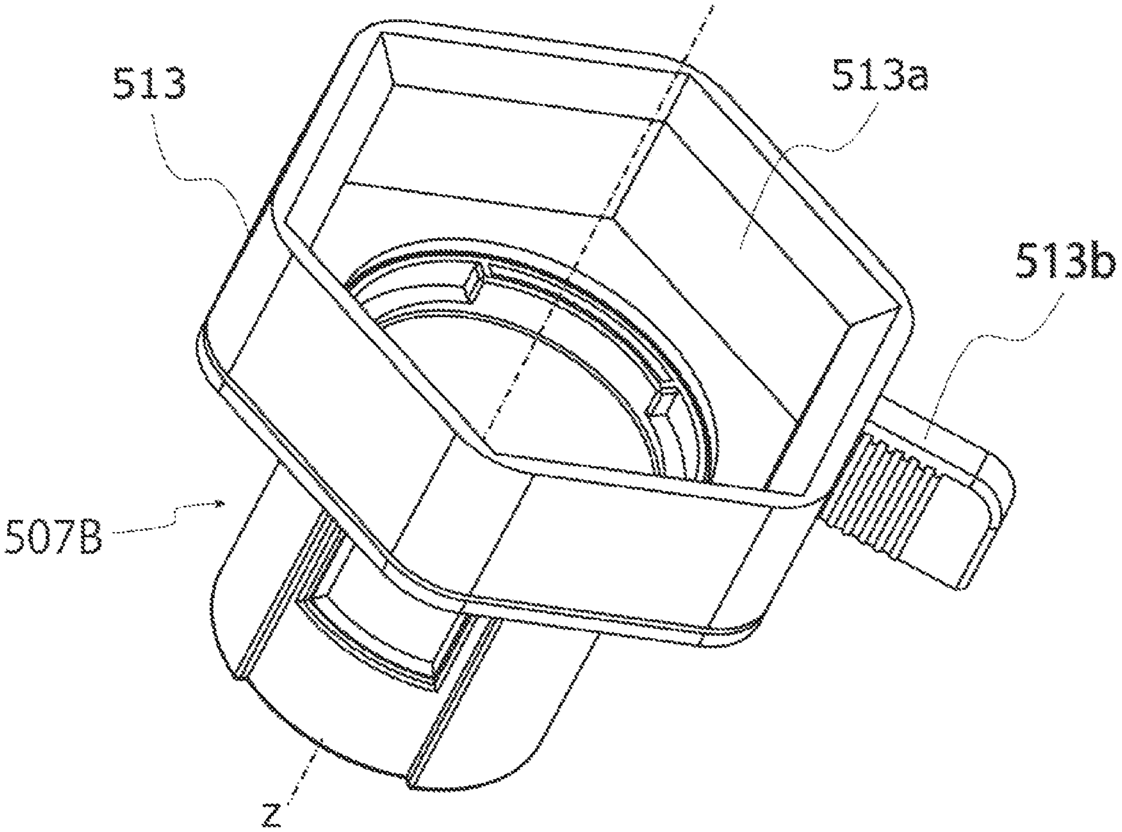
FIG. 25 is an enlarged perspective view illustrating the shutter member.

As illustrated in FIGS. 24A to 25, the fitting portion 513 of the shutter member 507B has a substantially hexagonal opening portion 513*a* with which the outer ring member 510 of the toner pack 40 is engaged, and a lever portion 513*b* that can be rotated by the user.

Figure 26:
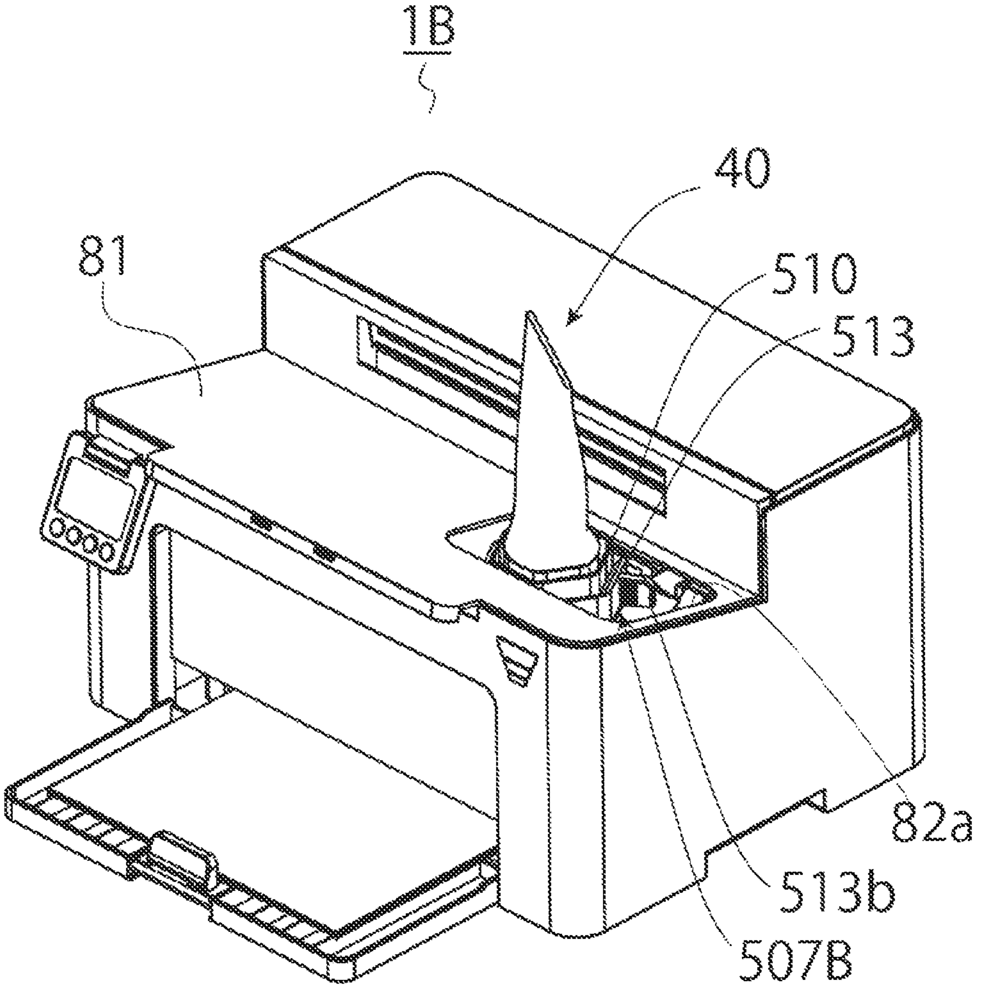
FIG. 26 is a perspective view illustrating an image forming apparatus according to the second embodiment.
Figure 27:
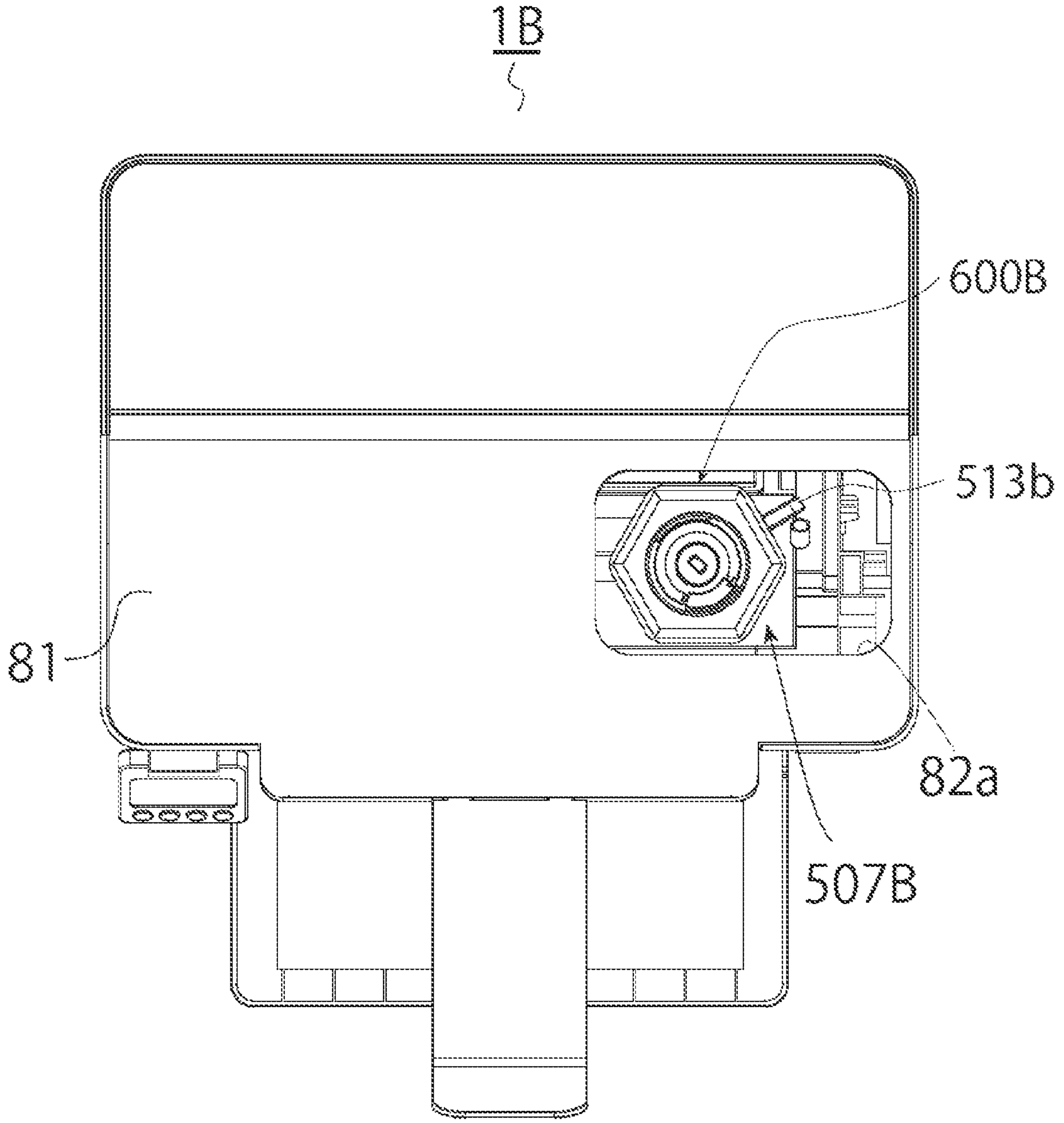
FIG. 27 is a plan view illustrating the image forming apparatus.

FIG. 26 is a perspective view illustrating an image forming apparatus 1B according to the second embodiment, and FIG. 27 is a plan view illustrating the image forming apparatus 1B according to the second embodiment. The image forming apparatus 1B has a configuration and a function basically similar to those of the image forming apparatus 1 of the first embodiment. As illustrated in FIGS. 26 and 27, an opening portion 82*a* is formed in a discharge tray 81 of the image forming apparatus 1B, and the opening portion 82*a* is disposed on the apparatus right side.

The fitting portion 513 of the shutter member 507B is exposed to the outside through the opening portion 82*a*, and the user fits the toner pack 40 to the fitting portion 513 when replenishing the toner to the developing container 32 (see FIG. 1A). More specifically, the outer ring member 510 of the toner pack 40 is fitted to the fitting portion 513.

Then, the user operates the lever portion 513*b* exposed from the opening portion 82*a* to rotate the lever portion 513*b* about the rotation axis z (see FIG. 24B). As a result, the shutter member 507B and the rotary container unit 401 (see FIG. 5) of the toner pack 40 rotate, and the toner pack 40 and a toner receiving unit 600B change from the shielded state to the open state. As a result, the toner in the toner pack 40 can be replenished to the developing container 32.

As described above, in the present embodiment, the toner pack 40 and the toner receiving unit 600B can be switched from the shielded state to the open state by operating the lever portion 513*b* of the shutter member 507B instead of operating the outer ring member 510 as in the first embodiment.

Since the space for gripping the lever portion 513*b* can be smaller than the space for gripping the outer ring member 510, for example, the operability of the lever portion 513*b* is good even when the opening portion 82*a* is small, so that the usability can be improved. Note that it is advantageous that the opening portion 82*a* is small in terms of strength of the casing of the image forming apparatus 1B and in order to prevent foreign matter from entering the inside of the image forming apparatus 1B.

In addition, since the lever portion 513*b* is disposed at a position more distant from the rotation axis z in the radial direction than the outer ring member 510 of the toner pack 40, it is possible to reduce the force required when the user operates the lever portion 513*b* so as to improve the usability.

In the present embodiment, the outer ring member 510 of the toner pack 40 is fitted to the fitting portion 513 of the shutter member 507B, but the present invention is not limited thereto. For example, instead of the outer ring member 510, at least one of the replenishing base 501, the inner ring member 511, and the pouch 503 may be fixed to the shutter member 507B.

Third Embodiment

Next, a third embodiment of the present invention will be described. In the third embodiment, the shutter member 507 of the first embodiment is changed to a shutter member 507C. Therefore, configurations similar to those of the first embodiment will be described by omitting illustration or attaching the same reference numerals to the drawings.

Figure 28A:
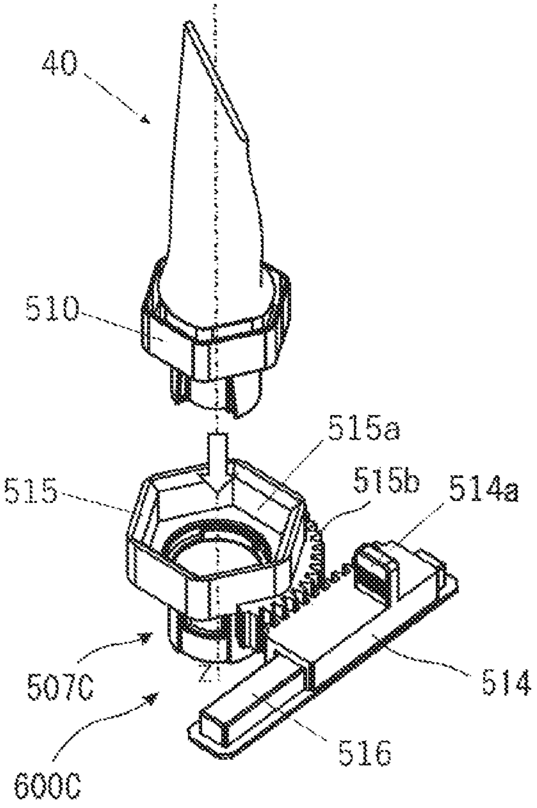
FIG. 28A is an exploded perspective view illustrating a shutter member and a toner pack according to a third embodiment.
Figure 28B:
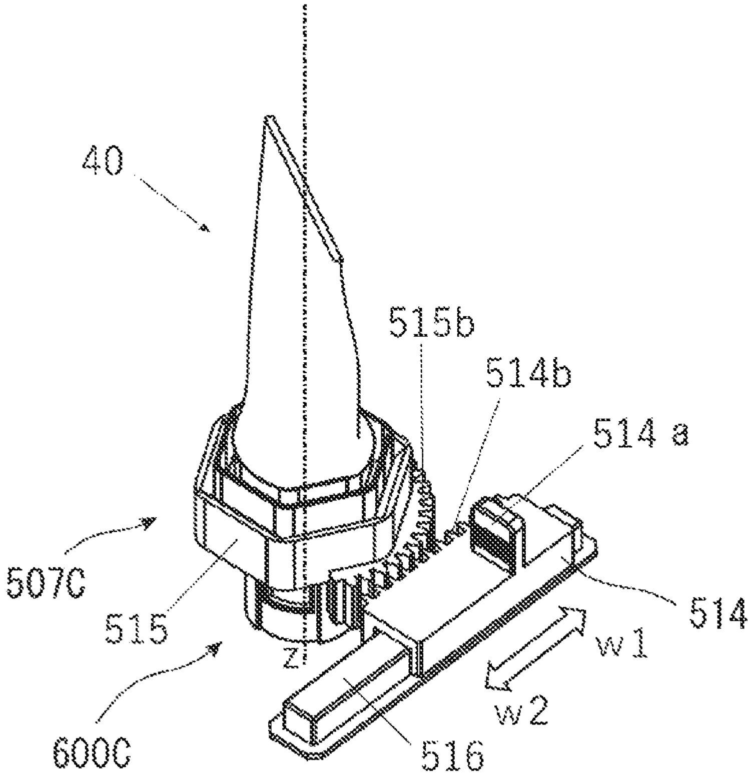
FIG. 28B is a perspective view illustrating the shutter member and the toner pack according to the third embodiment.
Figure 29:
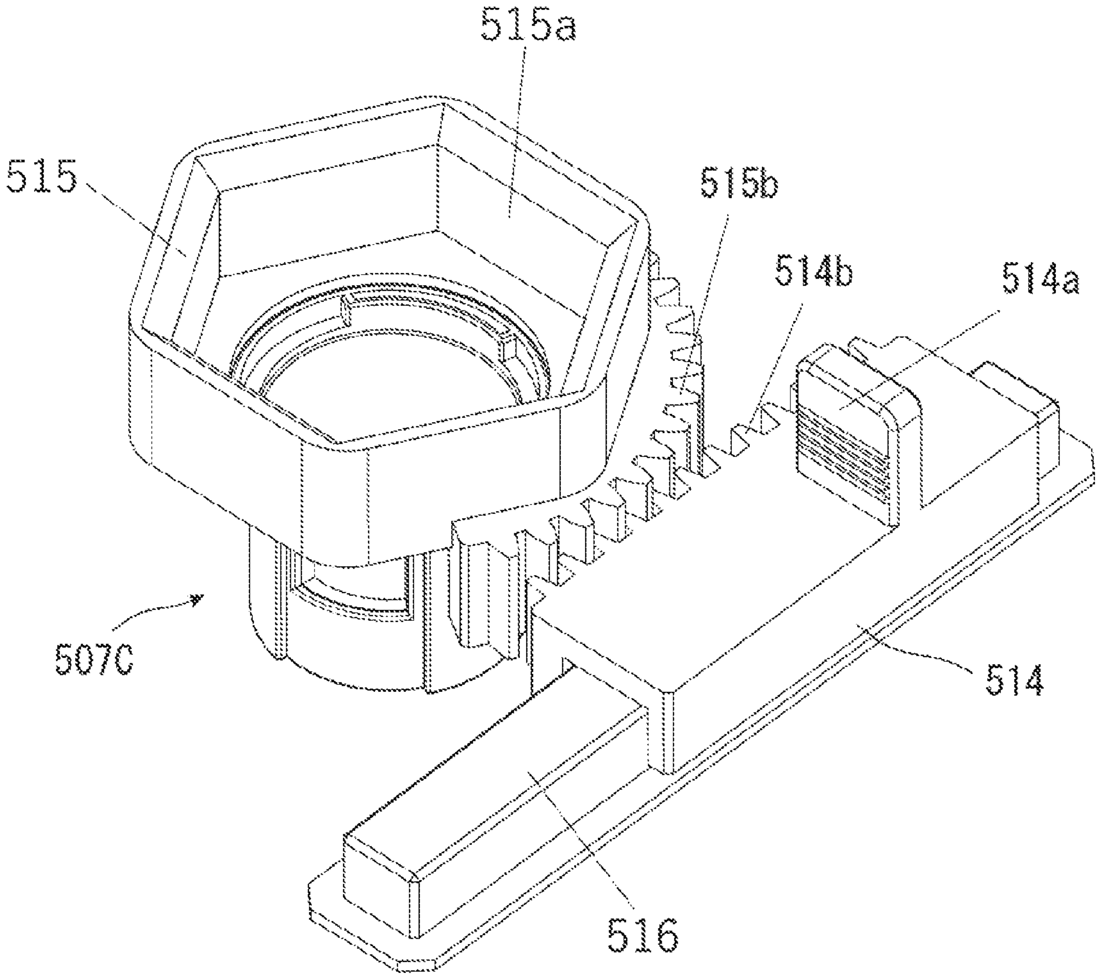
FIG. 29 is an enlarged perspective view illustrating a peripheral configuration of the shutter member.

The shutter member 507C has a fitting portion 515, and as illustrated in FIGS. 28A to 29, the fitting portion 515 has a substantially hexagonal opening portion 515*a* with which the outer ring member 510 of the toner pack 40 is engaged, and a gear portion 515*b*. The gear portion 515*b* is formed on an outer peripheral portion of the fitting portion 515, and a plurality of teeth are arranged in the circumferential direction around the rotation axis z.

A guide member 516 is fixed to a frame (not illustrated) or a developing container 32 (see FIG. 1A) inside an image forming apparatus 1C (see FIG. 30), and a lever member 514 is supported by the guide member 516 so as to be slidable in a w1 direction and a w2 direction. The lever member 514 includes a lever portion 514*a* that can be gripped by the user and a rack portion 514*b* that meshes with the gear portion 515*b*.

Figure 30:
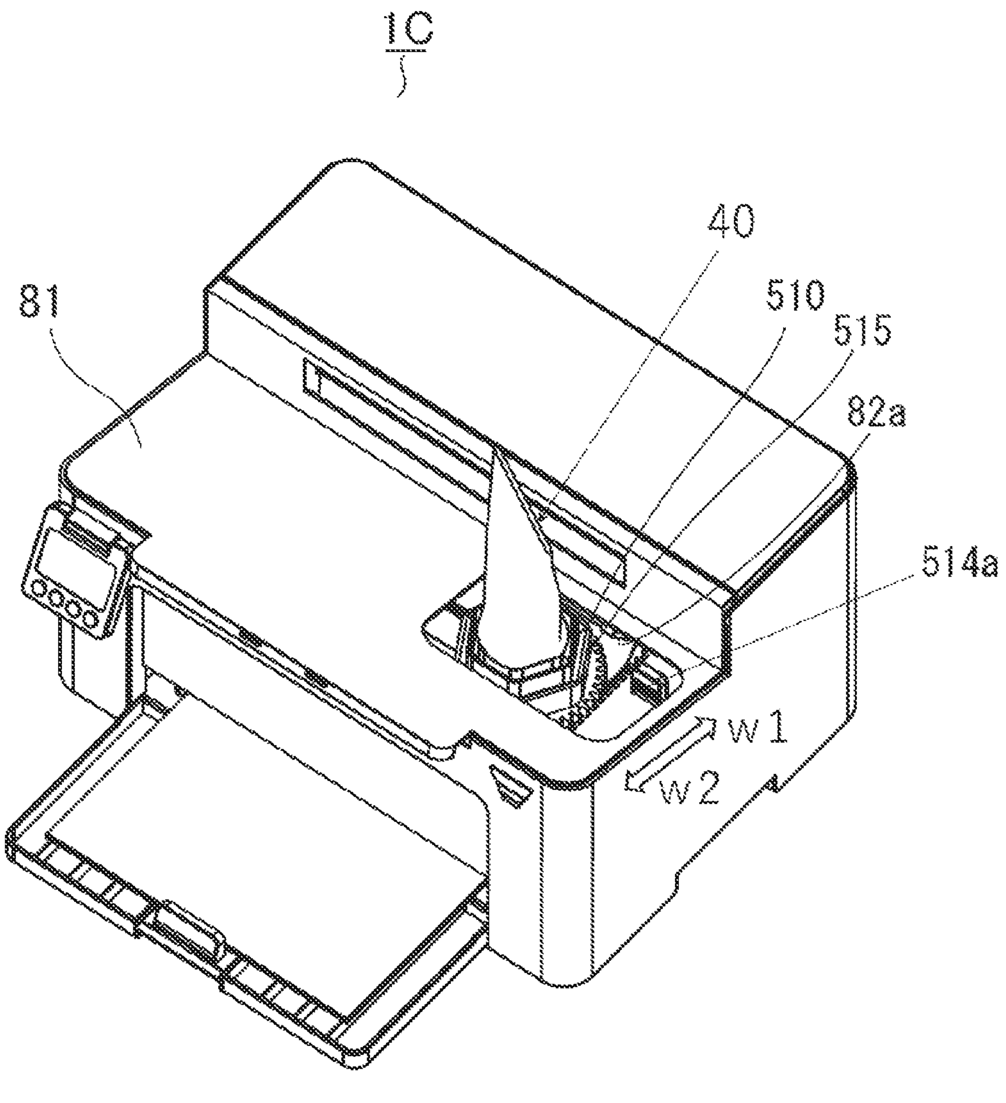
FIG. 30 is a perspective view illustrating an image forming apparatus according to the third embodiment.
Figure 31:
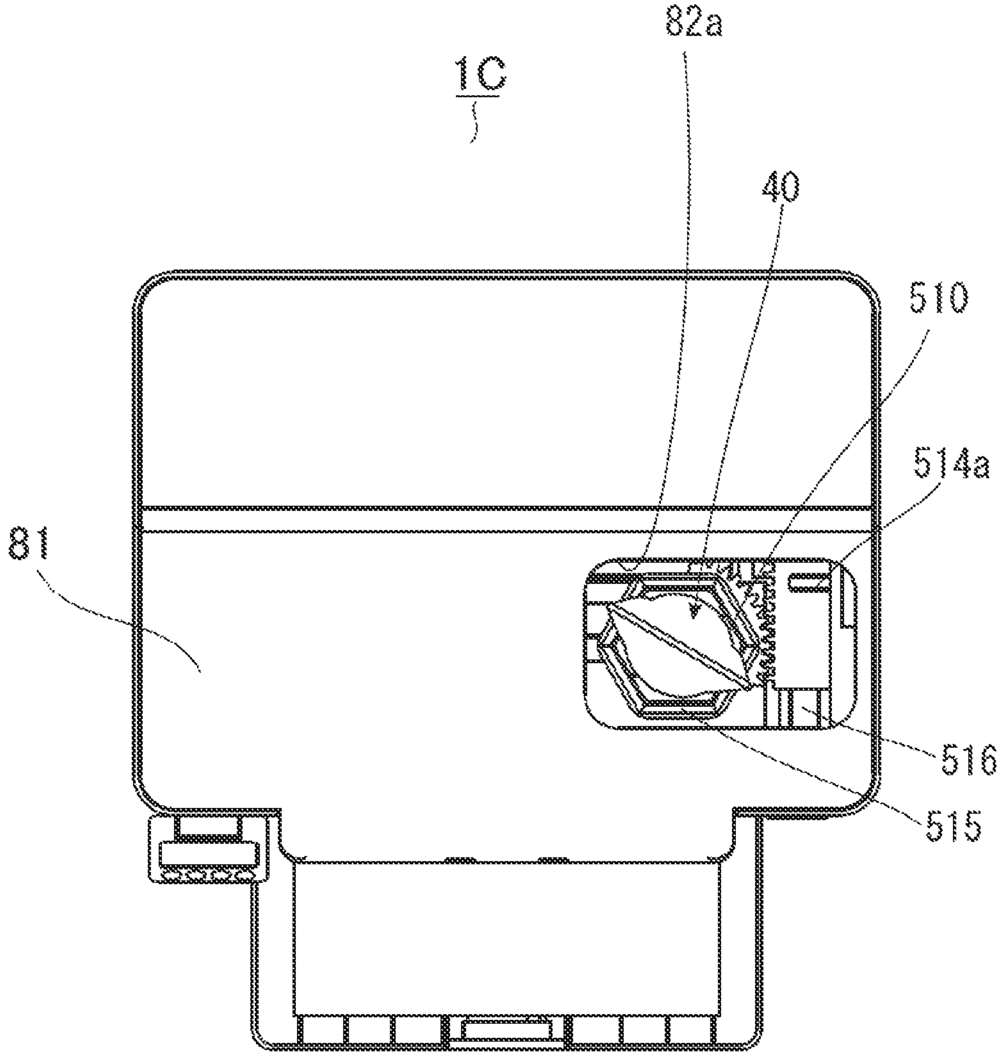
FIG. 31 is a plan view illustrating the image forming apparatus.
Figure 32:
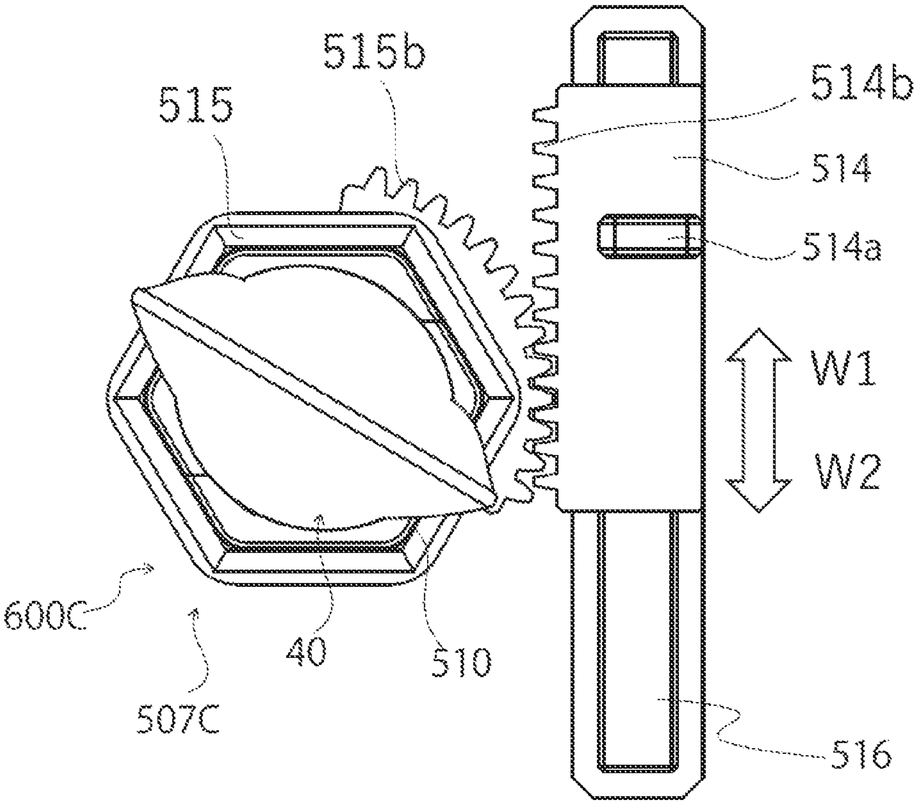
FIG. 32 is a plan view illustrating the peripheral configuration of the shutter member.

FIG. 30 is a perspective view illustrating the image forming apparatus 1C according to the third embodiment, and FIG. 31 is a plan view illustrating the image forming apparatus 1C according to the third embodiment. FIG. 32 is an enlarged plan view illustrating a peripheral configuration of the toner pack 40 and the shutter member 507C. The image forming apparatus 1C has a configuration and a function basically similar to those of the image forming apparatus 1 of the first embodiment. As illustrated in FIGS. 30 and 31, an opening portion 82*a* is formed in a discharge tray 81 of the image forming apparatus 1C, and the opening portion 82*a* is disposed on the apparatus right side.

The fitting portion 515 of the shutter member 507C is exposed to the outside through the opening portion 82*a*, and the user fits the toner pack 40 to the fitting portion 515 when replenishing the toner to the developing container 32 (see FIG. 1A). More specifically, the outer ring member 510 of the toner pack 40 is fitted to the fitting portion 515.

The user operates the lever portion 514*a* exposed from the opening portion 82*a* to slide the lever member 514 in the w2 direction, for example, as illustrated in FIGS. 30 to 32. As the lever member 514 slides in the w2 direction, the gear portion 515*b* meshing with the rack portion 514*b* of the lever member 514 is rotationally driven. As a result, the shutter member 507C and the rotary container unit 401 (see FIG. 5) of the toner pack 40 rotate, and the toner pack 40 and a toner receiving unit 600C are switched from the shielded state to the open state. As a result, the toner in the toner pack 40 can be replenished to the developing container 32.

As described above, in the present embodiment, the toner pack 40 and the toner receiving unit 600C can be switched from the shielded state to the open state by operating the lever portion 514*a* of the lever member 514 instead of operating the outer ring member 510 as in the first embodiment.

Since the space for gripping the lever portion 514*a* can be smaller than the space for gripping the outer ring member 510, for example, the operability of the lever portion 514*a* is good even when the opening portion 82*a* is small, so that the usability can be improved. Note that it is advantageous that the opening portion 82*a* is small in terms of strength of the casing of the image forming apparatus 1C and in order to prevent foreign matter from entering the inside of the image forming apparatus 1C.

In addition, since the lever portion 514*a* is disposed at a position more distant from the rotation axis z in the radial direction than the outer ring member 510 of the toner pack 40, it is possible to reduce the force required when the user operates the lever portion 514*a* so as to improve the usability.

In the present embodiment, the outer ring member 510 of the toner pack 40 is fitted to the fitting portion 515 of the shutter member 507C, but the present invention is not limited thereto. For example, instead of the outer ring member 510, at least one of the replenishing base 501, the inner ring member 511, and the pouch 503 may be fixed to the shutter member 507C.

Fourth Embodiment

Next, a fourth embodiment of the present invention will be described, and the fourth embodiment is obtained by changing the configuration of the toner pack 40 of the first embodiment. Therefore, configurations similar to those of the first embodiment will be described by omitting illustration or attaching the same reference numerals to the drawings.

Hereinafter, a configuration of the toner pack 40 as a toner container that can be mounted on and dismounted from the image forming apparatus 1 (see FIG. 1A) and store toner will be described. As illustrated in FIGS. 33A to 36B, a toner pack 40D as a toner container includes a shutter member 41D, a seal member 504D, a replenishing base 501D, an inner ring member 511, and a pouch 503, and these members are assembled.

Figure 34:
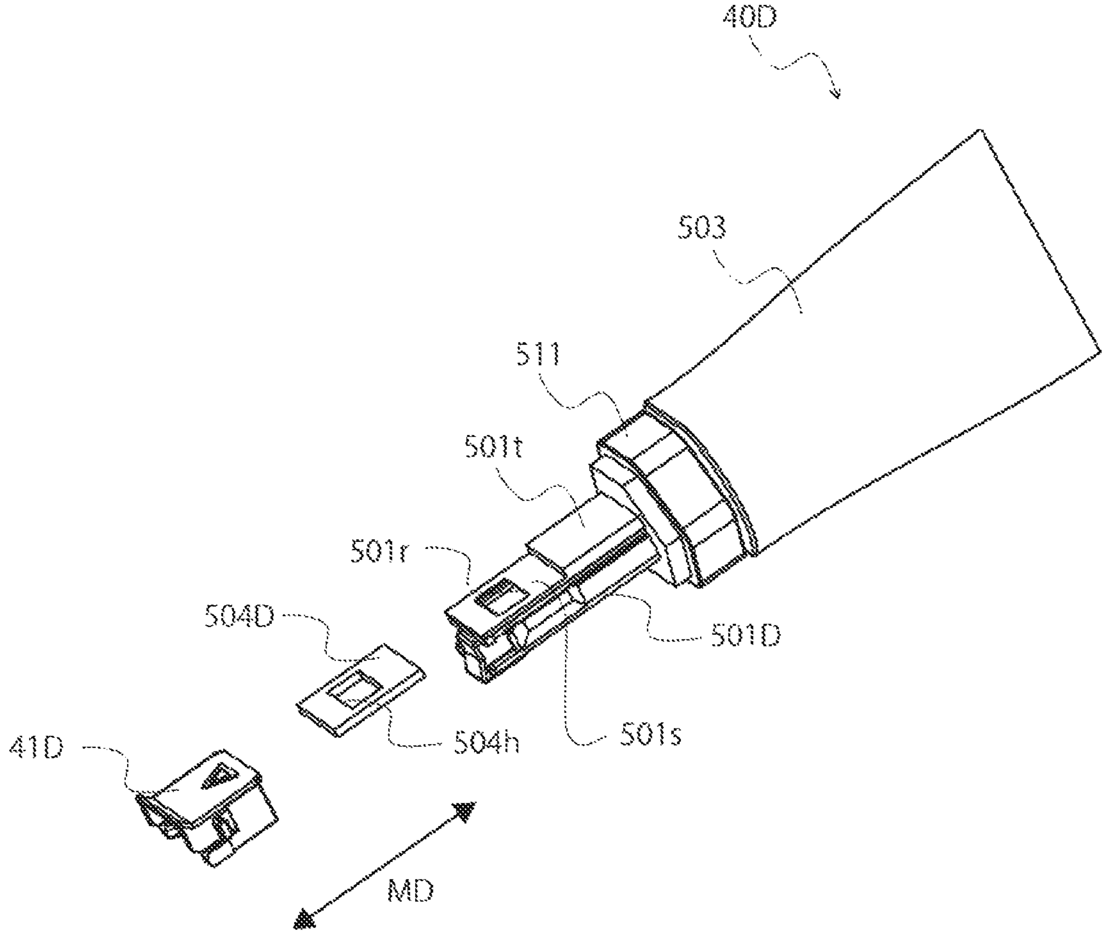
FIG. 34 is an exploded perspective view showing the toner pack.
Figure 35:
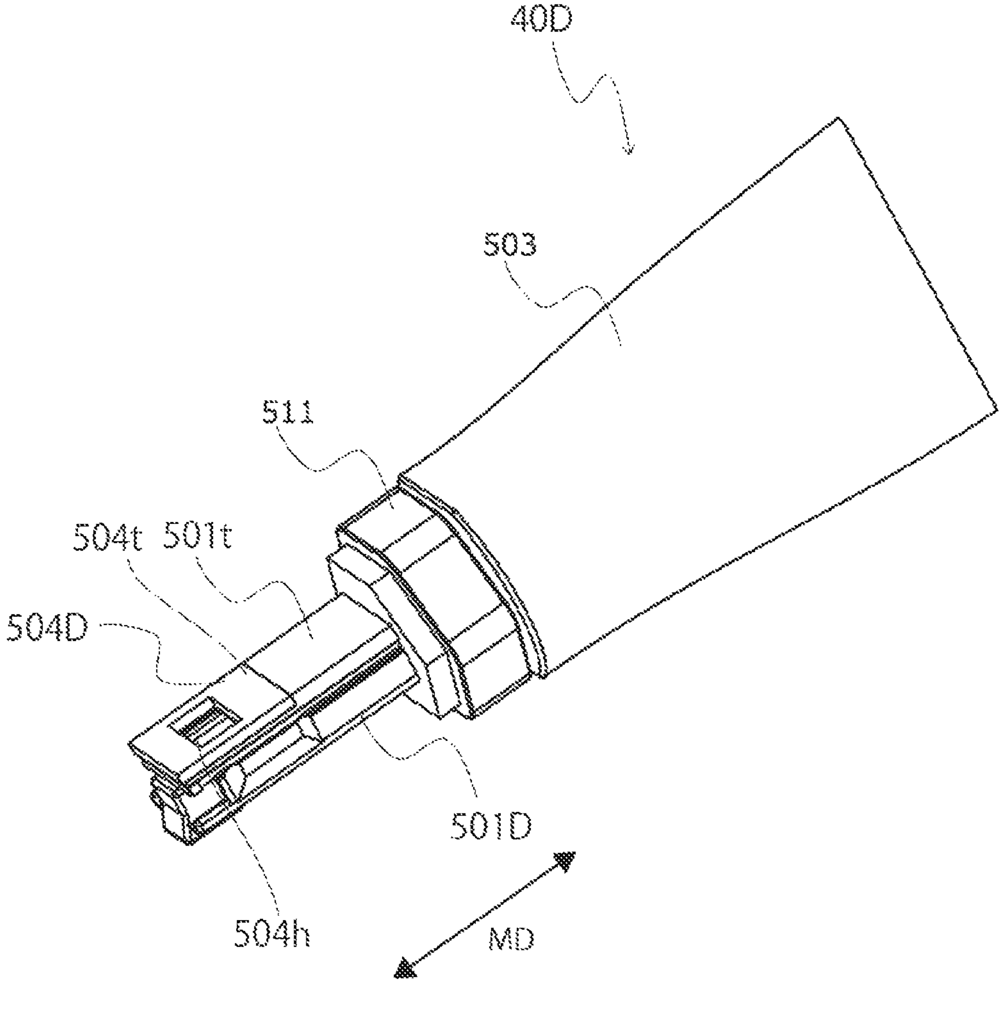
FIG. 35 is a perspective view illustrating a replenishing base and a seal member.

The inner ring member 511 is coupled to the replenishing base 501D, and the pouch 503 is coupled to the inner ring member 511. The toner is stored in the pouch 503. As illustrated in FIGS. 34 and 35, in the replenishing base 501D, a toner discharge port 501*r* is formed in a fixing surface 501*s*.

The seal member 504D is fixed to the fixing surface 501*s* with a double-sided tape or the like, and an opening portion 504*h* is formed at a position corresponding to the toner discharge port 501*r* in the seal member 504D. The seal member 504D is made of a material such as an elastically deformable foamed urethane or a nonwoven fabric.

The replenishing base 501D is formed with a sliding surface 501*t* formed so as to be flush with a sliding surface 504*t* of the seal member 504D fixed to the fixing surface 501*s*. That is, a step is provided between the sliding surface 501*t* and the fixing surface 501*s*.

Figure 36A:
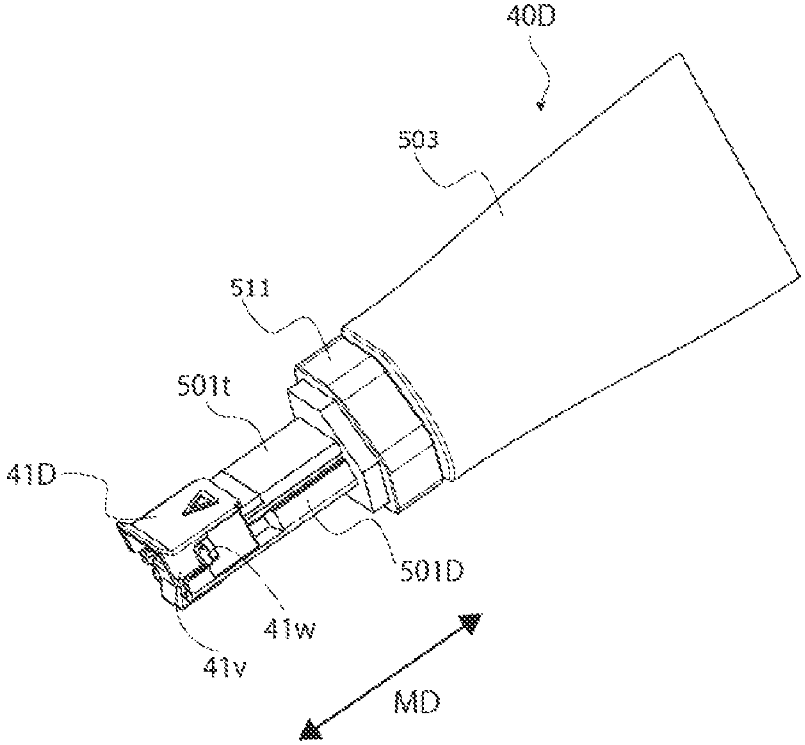
FIG. 36A is a perspective view illustrating the toner pack in the shielded state.
Figure 36B:
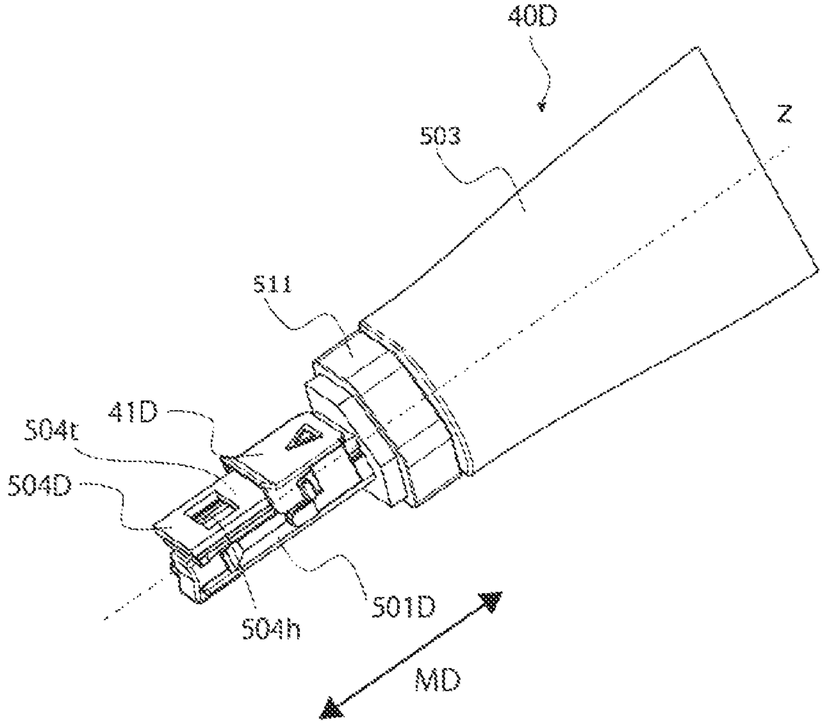
FIG. 36B is a perspective view illustrating the toner pack in the open state.

FIG. 36A illustrates a state in which the toner discharge port 501*r* and the opening portion 504*h* are shielded by the shutter member 41D, and FIG. 36B illustrates a state in which the toner discharge port 501*r* and the opening portion 504*h* are opened. The toner pack 40D is mounted on the developing container 32 in a direction along a moving direction MD described below. The toner discharge port 501*r* is formed in the fixing surface 501*s* extending along the moving direction MD. As illustrated in FIGS. 36A and 36B, the shutter member 41D is supported on the replenishing base 501D so as to be slidable in the moving direction MD. The shutter member 41D is configured to be slidable so as to slide on the sliding surfaces 501*t* and 504*t*, and is biased to a position illustrated in FIG. 36A by a spring (not illustrated). As a result, itis possible to reduce toner leakage from the toner discharge port 501*r*. Further, a protrusion 41*w* protrudes from a side surface 41*v* of the shutter member 41D.

Figure 33A:
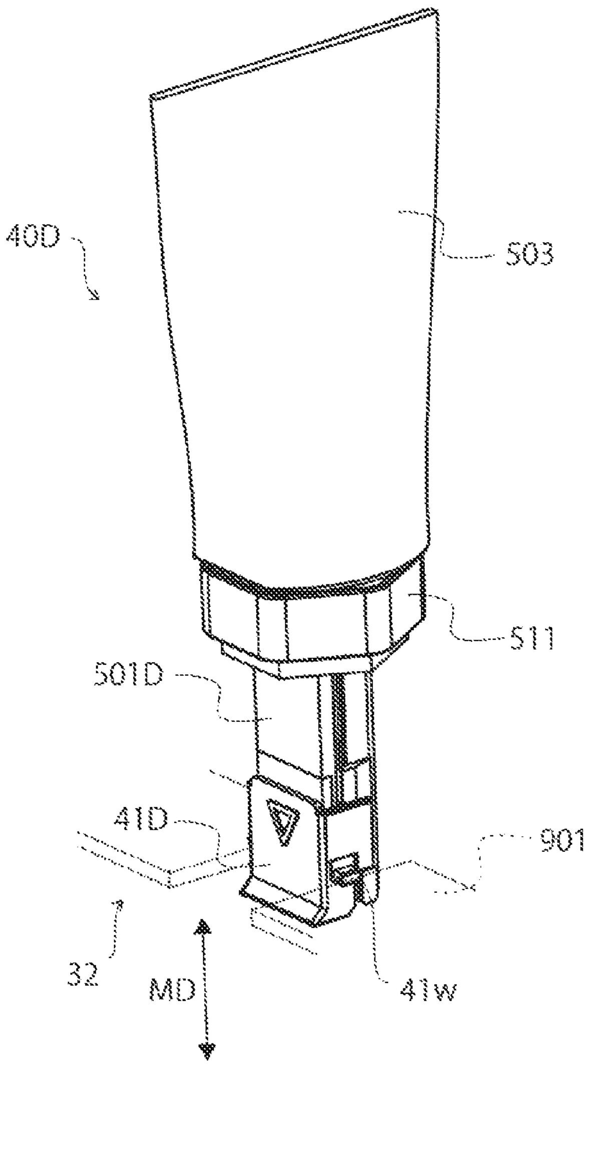
FIG. 33A is a perspective view illustrating a toner pack in a shielded state according to a fourth embodiment.
Figure 33B:
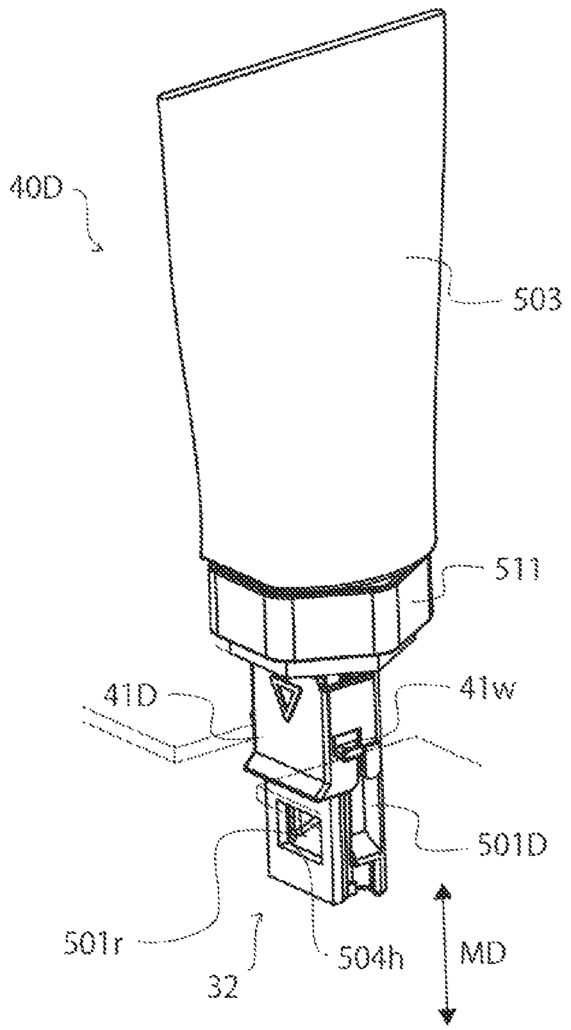
FIG. 33B is a perspective view illustrating the toner pack in an open state.

As illustrated in FIG. 33A, the user mounts the toner pack 40D on the developing container 32 when replenishing toner to the developing container 32. At this time, the protrusion 41*w* of the shutter member 41D is engaged with a regulating member 901 provided in the image forming apparatus 1 (see FIG. 1A), and the movement of the shutter member 41D is regulated in a mounting direction of the toner pack 40D, that is, the moving direction MD by the regulating member 901.

When the user further holds the inner ring member 511 and moves the toner pack 40D in the mounting direction parallel to the moving direction MD, the replenishing base 501D and the pouch 503 move downward together with the inner ring member 511 in a state where the shutter member 41D is restricted and stopped by the regulating member 901. As a result, the opening portion 504*h* and the toner discharge port 501*r* are exposed from the shutter member 41D, and the toner stored in the toner pack 40D is replenished to the developing container 32 through the opening portion 504*h* and the toner discharge port 501*r*.

As described above, in the present embodiment, the opening portion 504*h* and the toner discharge port 501*r* can be opened to replenish the toner only by moving the toner pack 40D in the mounting direction with respect to the developing container 32. Therefore, the replenishing operation can be easily performed, so that usability can be improved.

Fifth Embodiment

Next, a fifth embodiment of the present invention will be described, and the fifth embodiment is obtained by changing the configuration of the toner pack 40 of the first embodiment. Therefore, configurations similar to those of the first embodiment will be described by omitting illustration and explanation or attaching the same reference numerals to the drawings.

Configuration of Toner Pack

A configuration of a toner pack 400 as a toner container that can be mounted on and dismounted from the image forming apparatus 1 as an apparatus main body and store toner will be described. As illustrated in FIGS. 37A to 40B, the toner pack 400 includes a shutter member 410, a seal member 5040, a replenishing base 5010, an outer ring member 5020, and a pouch 5030. A to B in each of FIGS. 37A to 40B are different in view direction. The rotation axis z indicated by a one-dot broken line is a rotation center line of the toner pack 400.

Figure 37A:
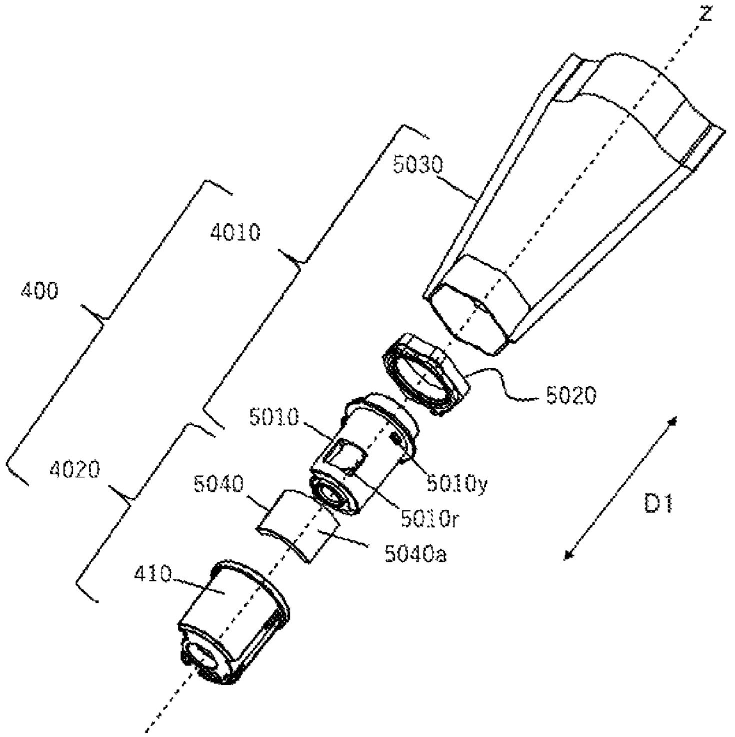
FIG. 37A is an exploded view of a toner pack according to a fifth embodiment.
Figure 37B:
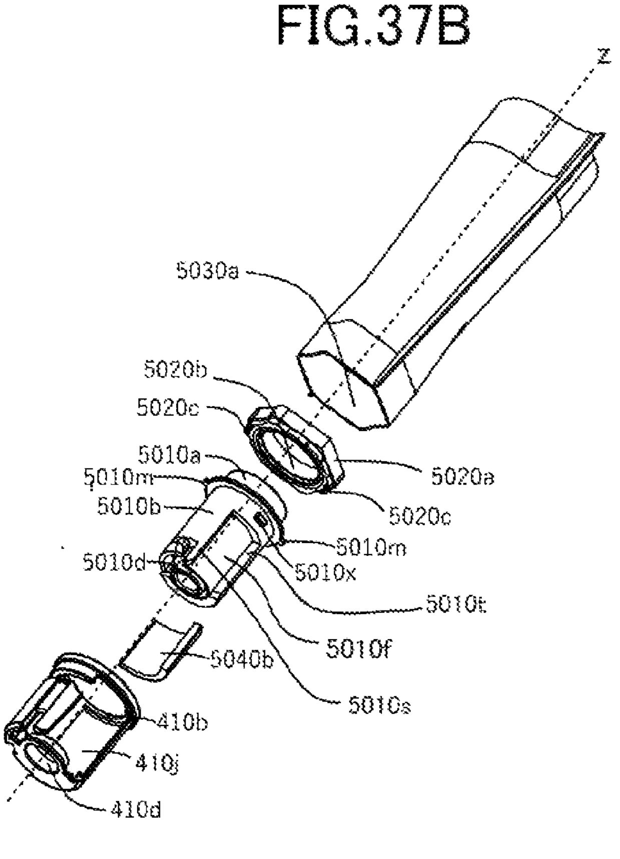
FIG. 37B is an exploded view of the toner pack according to the fifth embodiment as viewed from a point of sight different from that of FIG. 37A.

First, the shape of each member of the toner pack 400 and the relationship between components will be described with reference to FIGS. 37A and 37B. As illustrated in FIGS. 37A and 37B, the pouch 5030 as a toner storage unit and a first toner storage unit is a flexible container that stores toner similarly to the first embodiment. The pouch 5030 has an opening portion 5030*a*.

The outer ring member 5020 has an engaging surface 5020*a* to be engaged with the pouch 5030, a hole 5020*b*, and a pair of concave portions 5020*c*. The opening portion 5030*a* of the pouch 5030 and the engaging surface 5020*a* of the outer ring member 5020 are coupled, any coupling method may be used. Examples of the coupling method include a method using various adhesives such as hot melt, a method of thermally welding and coupling the pouch 5030 to the outer periphery of the outer ring member 5020, and the like.

The replenishing base 5010 as a container base portion includes an outer peripheral portion 5010*b* as a side surface and an outer surface extending along the axial direction D1 parallel to the rotation axis z, and a toner discharge port 5010*r* formed in the outer peripheral portion 5010*b*. The replenishing base 5010 includes a shaft portion 5010*a* and a pair of protrusions 5010*m* to be engaged with the hole 5020*b* of the outer ring member 5020, protrusions 5010*x* and 5010*y*, a shaft portion 5010*d*, and a concave portion 5010*f*. The concave portion 5010*f* is a portion recessed radially inward from the outer peripheral portion 5010*b*, and has side end surfaces 5010*s* and 5010*t* as third engaging portions. The concave portion 5010*f* is provided at a position different from the toner discharge port 5010*r* in the rotation direction of the shutter member 410.

By engaging the hole 5020*b* and the shaft portion 5010*a* with each other, the replenishing base 5010 is supported by the outer ring member 5020 so that the movement in the axial direction D1 and the radial direction orthogonal to the axial direction D1 with respect to the outer ring member 5020 is restricted. In addition, by engaging the pair of concave portions 5020*c* and the pair of protrusions 5010*m* with each other, the replenishing base 5010 is supported by the outer ring member 5020 so that the relative rotation about the rotation axis z with respect to the outer ring member 5020 is restricted. The toner discharge port 5010*r* as a discharge port is a through hole communicating with the inside of the pouch 5030. In addition, the protrusion 5010*x* and the protrusion 5010*y* are arranged with phases different from each other.

Figure 40A:
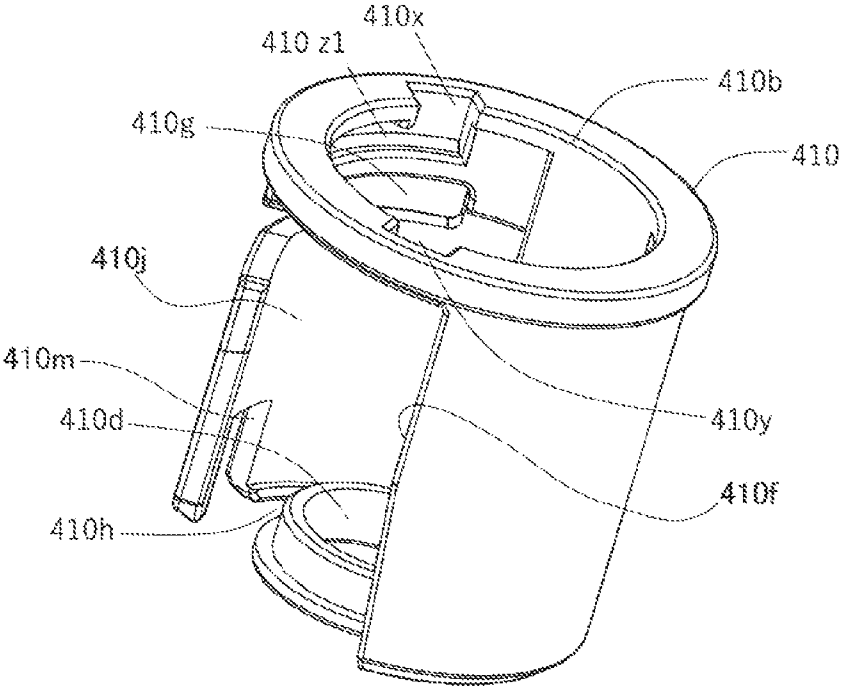
FIG. 40A is a perspective view illustrating a shutter member.
Figure 40B:
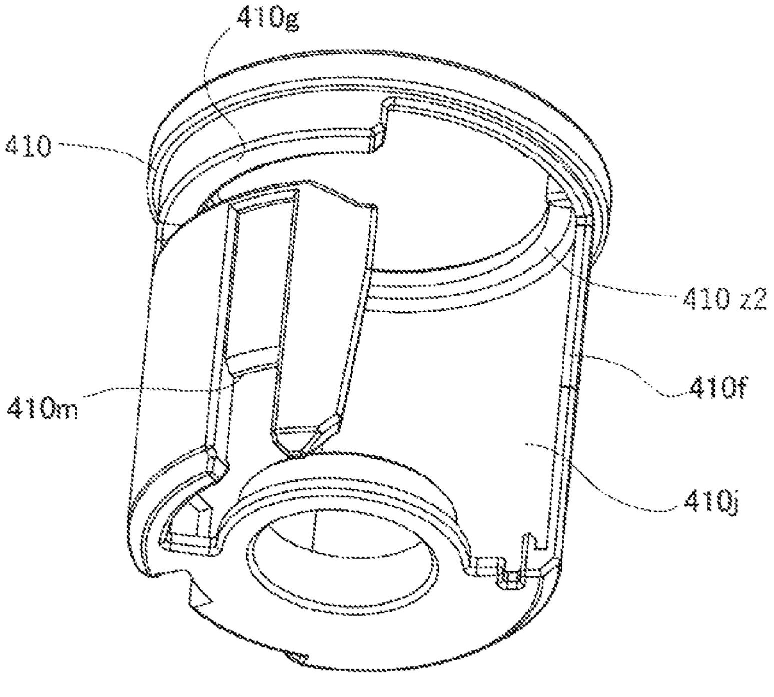
FIG. 40B is a perspective view illustrating the shutter member as viewed from a point of sight different from that of FIG. 40A.
Figure 41A:
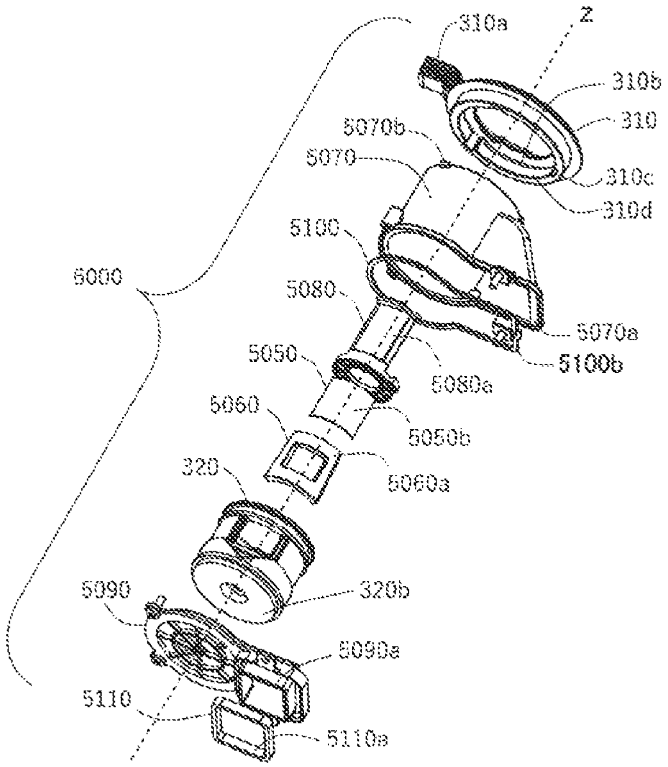
FIG. 41A is an exploded view of a toner receiving unit.
Figure 41B:
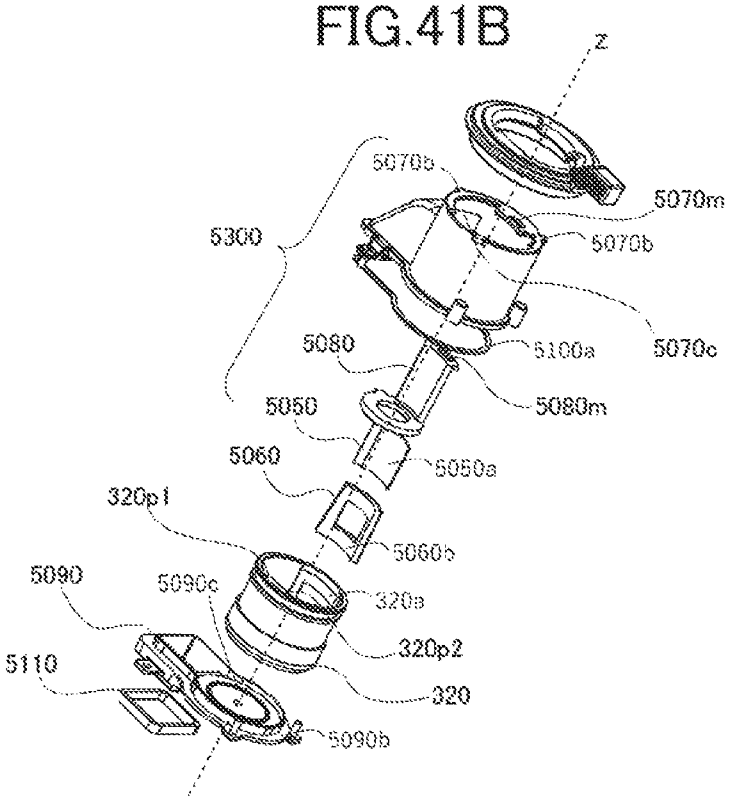
FIG. 41B is an exploded view of the toner receiving unit as viewed from a point of sight different from that of FIG. 41A.

As illustrated in FIGS. 37A to 37B and FIGS. 40A to 40B, the shutter member 410 as a first shutter is formed of a substantially cylindrical resin member. The shutter member 410 includes grooves 410*f* and 410*g*, holes 410*b* and 410*d* rotatably engaged with the shaft portion 5010*d* of the replenishing base 5010, concave portions 410*x* and 410*y*, a groove 410*z*1, and a surface 410*z*2. The concave portion 410*x* and the groove 410*z*1 form a continuous groove. The cutout portion 410*f* has a substantially rectangular shape, and the groove 410*g* is formed to extend circumferentially in a partial range (about 90°) of the shutter member 410 in the circumferential direction. Further, a cutout 410*h* extending circumferentially in a partial range of the shutter member 41 in the circumferential direction is formed on a bottom surface of the shutter member 410. As illustrated in FIGS. 38B and 40A to 40B, when the shutter member 410 is at the shielding position, at least a part of the concave portion 5010*f* of the replenishing base 5010 is exposed from the shutter member 410 via the cutout portion 410*f*.

The seal member 5040 has a fixed surface 5040*a* and a sliding surface 5040*b*, and is made of a material such as an elastically deformable foamed urethane or a nonwoven fabric. The fixed surface 5040*a* of the seal member 5040 is fixed to an inner peripheral surface 410*j* of the shutter member 410 with a double-sided tape or the like. As a result, toner leakage at the interface between the seal member 5040 and the shutter member 410 can be suppressed.

Hereinafter, the replenishing base 5010, the outer ring member 5020, and the pouch 5030 that are integrally coupled are defined as a container unit 4010, and the shutter member 410 and the seal member 5040 that are integrally coupled are defined as a shutter unit 4020. When the shutter unit 4020 is assembled to the container unit 4010, the outer peripheral portion 5010*b* of the replenishing base 5010 enters the hole 410*b* of the shutter member 410, and the protrusions 5010*x* and 5010*y* of the replenishing base 5010 enter the concave portions 410*x* and 410*y*.

As a result, the protrusions 5010*x* and 5010*y* of the replenishing base 5010 are rotatable along the groove 410*z*1 and the surface 410*z*2. That is, as illustrated in FIGS. 38A to 39B, the toner pack 400 has a configuration in which the container unit 4010 and the shutter unit 4020 are relatively rotatable. The shutter unit 4020 is provided so as to be rotatable about the rotation axis z with respect to the container unit 4010 in a direction of arrow z1 and a direction of arrow z2 opposite to the direction of arrow z1.

Figure 38A:
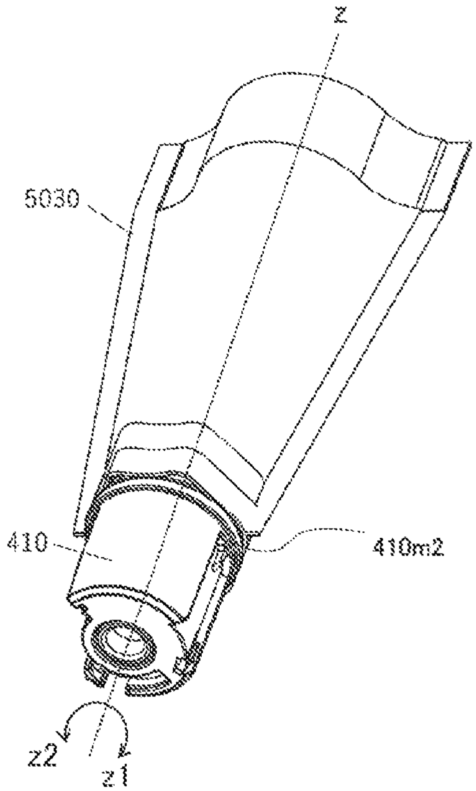
FIG. 38A is a perspective view illustrating the toner pack in a shielded state.
Figure 38B:
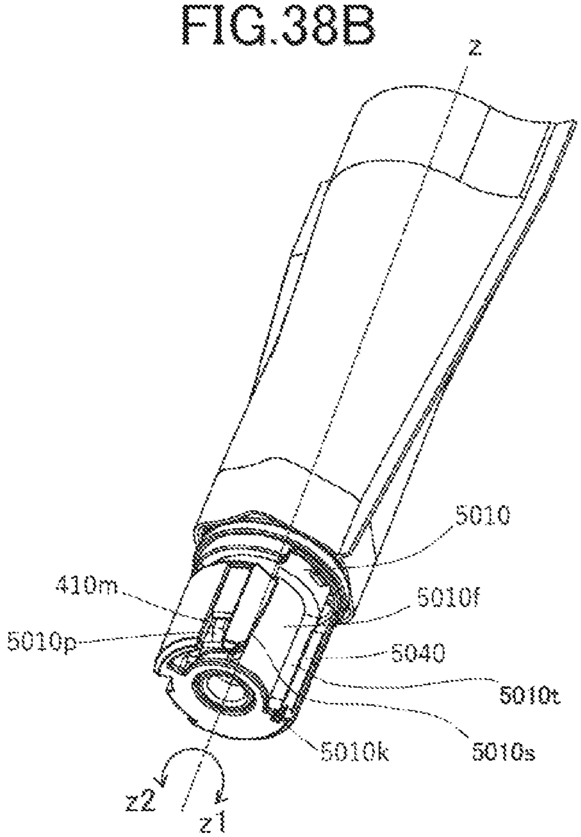
FIG. 38B is a perspective view illustrating the toner pack in the shielded state as viewed from a point of sight different from that of FIG. 38A.
Figure 39A:
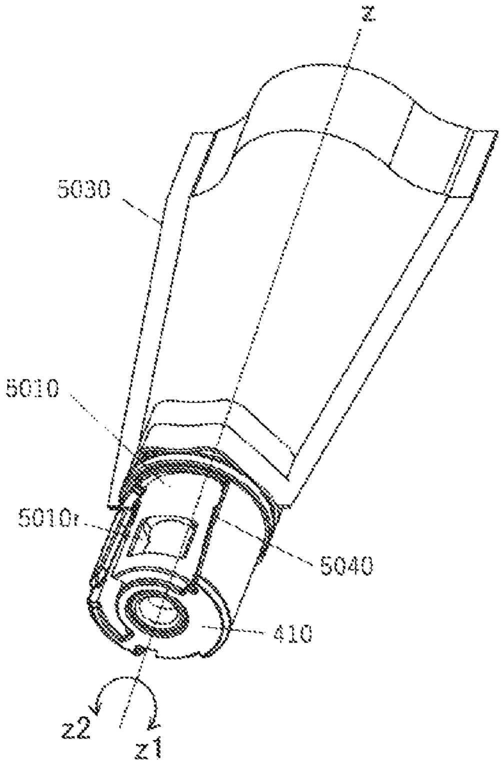
FIG. 39A is a perspective view illustrating the toner pack in an open state.
Figure 39B:
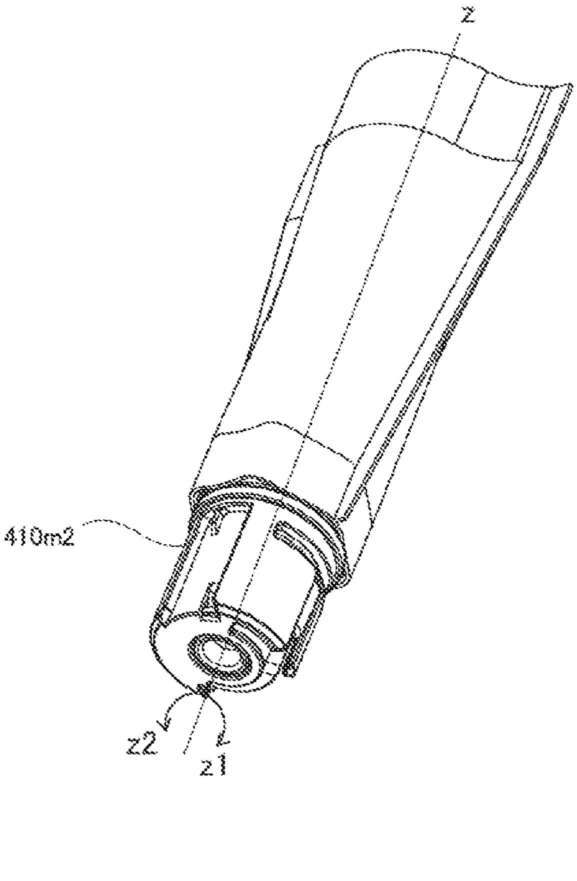
FIG. 39B is a perspective view of the toner pack in an open state as viewed from a point of sight different from that of FIG. 39A.

Hereinafter, the state of the toner pack 400 shown in FIGS. 38A to 38B is defined as a shielded state, and the state of the toner pack 400 shown in FIGS. 39A to 39B is defined as an open state. The position of the replenishing base 5010 when the toner pack 400 is in the shielded state is defined as a shielding position and a first shielding position, and the position of the replenishing base 5010 when the toner pack 400 is in the open state is defined as an open position and a first open position. In this case, the toner pack 400 becomes the open state by rotating the shutter unit 4020 by 900 in the direction of arrow z1 from the shielded state. In addition, the toner pack 400 becomes the shielded state by rotating the shutter unit 4020 by 90° in the direction of arrow z2 from the open state. Note that how much the shutter unit 4020 should be rotated to make the toner pack 400 transition between the open state and the shielded state may be freely set.

Figure 42A:
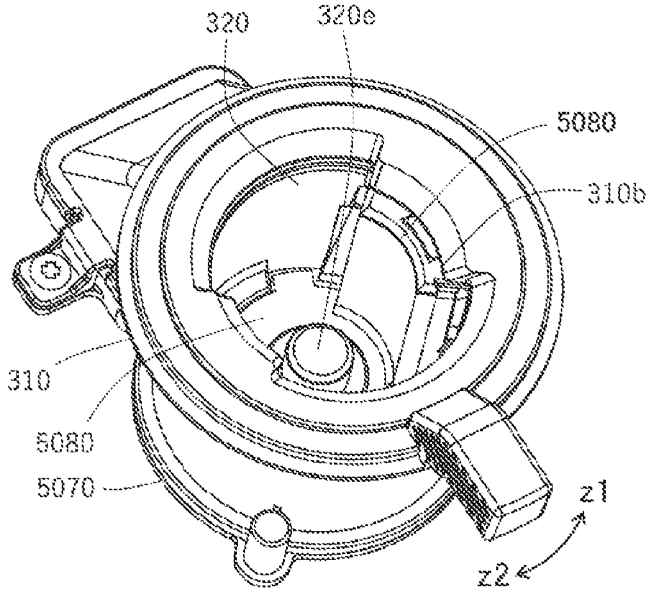
FIG. 42A is a perspective view illustrating the toner receiving unit in the shielded state.
Figure 42B:
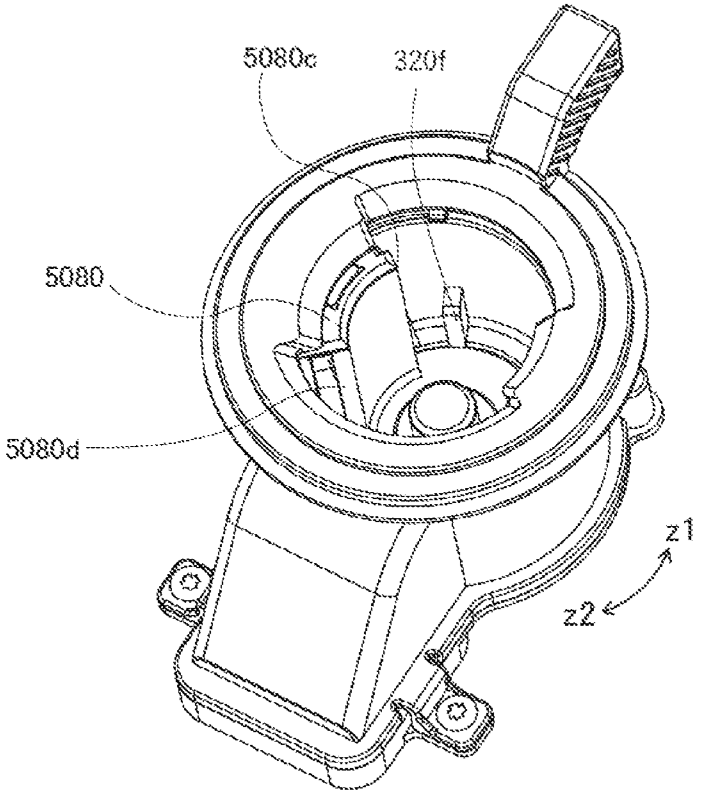
FIG. 42B is a perspective view illustrating the toner receiving unit in the shielded state as viewed from a point of sight different from that of FIG. 42A.
Figure 43A:
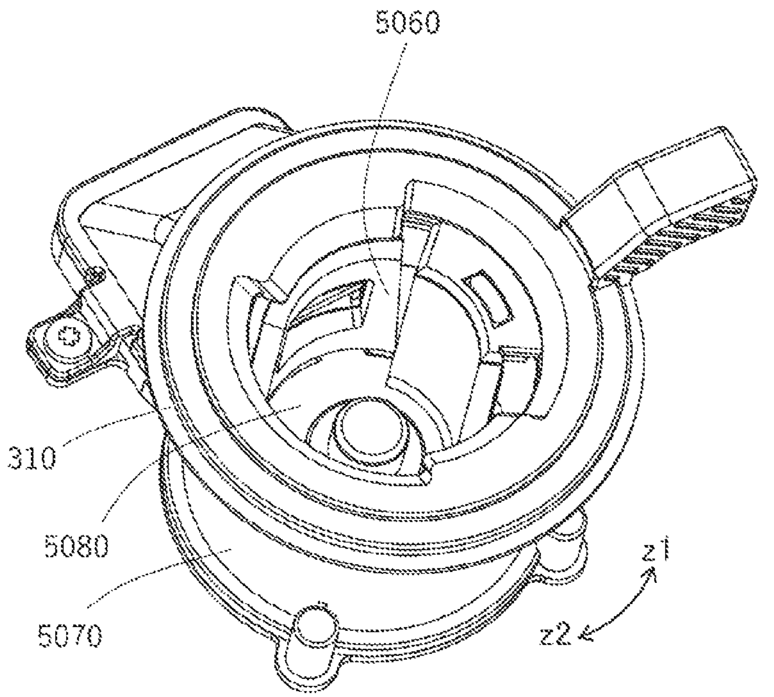
FIG. 43A is a perspective view illustrating the toner receiving unit in the open state.
Figure 43B:
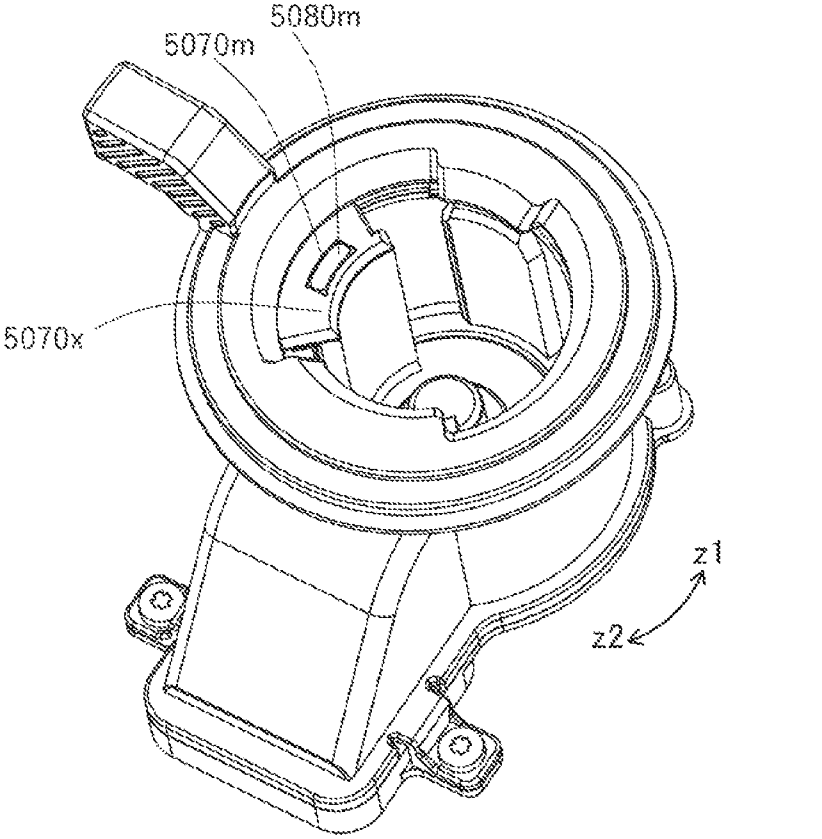
FIG. 43B is a perspective view illustrating the toner receiving unit in the open state as viewed from a point of sight different from that of FIG. 43A.

Here, in the present embodiment, as illustrated in FIGS. 38A and 38B, a hole 410*m* of the shutter member 410 and a claw portion 5010*p* having flexibility provided in the replenishing base 5010 can be engaged with each other. By engaging the hole 410*m* and the claw portion 5010*p* with each other, the rotation of the shutter member 410 about the rotation axis z with respect to the replenishing base 5010 is restricted. In other words, as a result, the user is restricted from bringing the toner pack 400 from the shielded state into the open state in the state of the toner pack alone before the toner pack 400 is inserted into the main body of the image forming apparatus. When the toner pack 400 is inserted into the main body of the image forming apparatus in order to actually replenish the toner, the claw portion 5010*p* comes into contact with a pressing portion 320*f* (see FIG. 42B) of a toner receiving unit 6000 to be described below. When the claw portion 5010*p* retracts radially inward, the shutter unit 4020 becomes rotatable, and the user can easily shift the toner pack 400 from the shielded state to the open state.

The seal member 5040 fixed to the shutter member 410 has the sliding surface 5040*b* that slides with respect to the outer peripheral portion 5010*b* of the replenishing base 5010. The seal member 5040 is pressed and deformed in a direction approaching the shutter member 410 by the outer peripheral portion 5010*b*, that is, outward in the radial direction orthogonal to the axial direction D1, so as to generate a surface pressure between the outer peripheral portion 5010*b* and the sliding surface 5040*b*. As a result, toner leakage at the interface between the seal member 5040 and the replenishing base 5010 can be suppressed.

When the toner pack 400 is in the shielded state, the toner stored in the pouch 5030 is movable as follows as illustrated in FIGS. 38A and 38B. That is, the toner can pass through the opening portion 5030*a* of the pouch 5030, an inner space of the inner ring member 511, the shaft portion 5010*a* of the replenishing base 5010, and an inner space of the replenishing base 5010, and move to the toner discharge port 5010*r*. However, since the toner discharge port 5010*r* is shielded by the shutter member 410 and the seal member 5040, in the state of the toner pack 400 alone, the toner stored in the pouch 5030 is sealed so as not to leak to the outside. The opening portion 5030*a* of the pouch 5030 is provided at one end in the axial direction D1 of the pouch 5030.

When the toner pack 400 is in the open state, as illustrated in FIGS. 39A and 39B, the toner discharge port 5010*r* formed in the replenishing base 5010 is opened without being shielded by the shutter member 410 and the seal member 5040. At this time, the toner discharge port 5010*r* faces the cutout portion 410*f* of the shutter member 410, and the toner stored in the pouch 5030 can be discharged to the outside of the toner pack 400 via the toner discharge port 5010*r* and the cutout portion 410*f*.

Toner Receiving Unit of Developing Container

Next, the toner receiving unit 6000 as a mounting portion provided in the developing container 32 will be described with reference to FIGS. 41A to 43B. As illustrated in FIGS. 41A to 43B, the toner receiving unit 6000 includes an operation lever 310, an inflow port 5070, an inflow prevention seal 5100, and an inlet member 5080. Further, the toner receiving unit 6000 includes a shutter sheet 5050, an inlet seal 5060, a container inlet 320, a container bottom 5090, and a bottom seal 5110. A to B in each of FIGS. 41A to 43B are different in view direction. The rotation axis z indicated by a one-dot broken line is a rotation axis of rotatable components to be described below. The rotation axis z coincides with the rotation axis of the toner pack 400.

The operation lever 310 as a lever includes a grip portion 310*a* operated by the user, a cylindrical portion 310*b* engaged with the inflow port 5070, a hole 310*c*, and a groove 310*d*. The inflow port 5070 has a protrusion 5070*b* and a receiving port 5070*c*, and the protrusion 5070*b* passes through the hole 310*c* of the operation lever 310 and is engaged with the groove 310*d*. As a result, the operation lever 310 and the inflow port 5070 are configured to be relatively rotatable. The receiving port 5070*c* receives toner flowing in from the toner pack 400. The toner received from the receiving port 5070*c* is stored in the developing container 32 as a second toner storage unit.

A surface 5070*a* of the inflow port 5070 is in contact with a surface 5100*a* of the inflow prevention seal 5100, and a surface 5100*b* of the inflow prevention seal 5100 is in contact with a surface 5090*b* of the container bottom 5090. When the inflow port 5070 and the container bottom 5090 are fastened with a screw, the inflow prevention seal 5100 is sandwiched between the inflow port 5070 and the container bottom 5090 to prevent toner from flowing out.

The inlet member 5080 has a protrusion 5080*m* at its upper end, and the protrusion 5080*m* is engaged with a hole 5070*m* formed at an upper end of the inflow port 5070. Accordingly, the inlet member 5080 is integrally assembled with the inflow port 5070. The inlet member 5080 is configured to engage with the concave portion 5010*f* (see FIG. 38B) of the replenishing base 5010. The inlet member 5080 has side end surfaces 5080*c* and 5080*d* as third engaged portions engageable with the side end surfaces 5010*s* and 5010*t* of the concave portion 5010*f*, respectively.

The shutter sheet 5050 is a film having a thickness of about 100 [μm], and a fixed surface 5050*a* of the shutter sheet 5050 is fixed to an outer peripheral surface 5080*a* of the inlet member 5080 with a double-sided tape or the like. Similarly, in the inlet seal 5060, a fixed surface 5060*b* of the inlet seal 5060 is fixed to an inner peripheral surface 320*a* of the container inlet 320 with a double-sided tape or the like. The bottom seal 5110 has a fixed surface 5110*a*, and the fixed surface 5110*a* is fixed to a surface 5090*a* of the container bottom 5090 with a double-sided tape or the like.

The container inlet 320 as a second shutter has a surface 320*b* in contact with a surface 5090*c* of the container bottom 5090. In addition, the container inlet 320 is sandwiched between the inflow port 5070 and the container bottom 5090 described above, and is configured to be only rotatable about the rotation axis z with respect to the inflow port 5070. The toner receiving unit 6000 is configured such that the operation lever 310 and the container inlet 320 to which the inlet seal 5060 is attached are rotatable about the rotation axis z with respect to the inflow port 5070. The inflow port 5070, the inflow prevention seal 5100, the inlet member 5080, and the inlet seal 5060 constitute a main body base portion 5300 on/from which the toner pack 400 can be mounted/dismounted. The operation lever 310 is configured to be independently rotatable with respect to the container inlet 320 by the operation lever 310 alone.

By rotating the container inlet 320 with respect to the inflow port 5070, the toner receiving unit 6000 transitions between a shielded state in which a toner receiving port 320*c* of the container inlet 320 is shielded by the shutter sheet 5050 and an open state in which the toner receiving port 320*c* is opened. The position of the container inlet 320 when the toner receiving unit 6000 is in the shielded state is defined as a second shielding position, and the position of the container inlet 320 when the toner receiving unit 6000 is in the open state is defined as a second open position.

Coupling of Toner Pack and Toner Receiving Unit

Next, an operation when the toner pack 400 and the toner receiving unit 6000 are connected and the user replenishes the toner in the toner pack 400 to the developing container 32 will be described with reference to FIGS. 44A to 49.

Figure 44A:
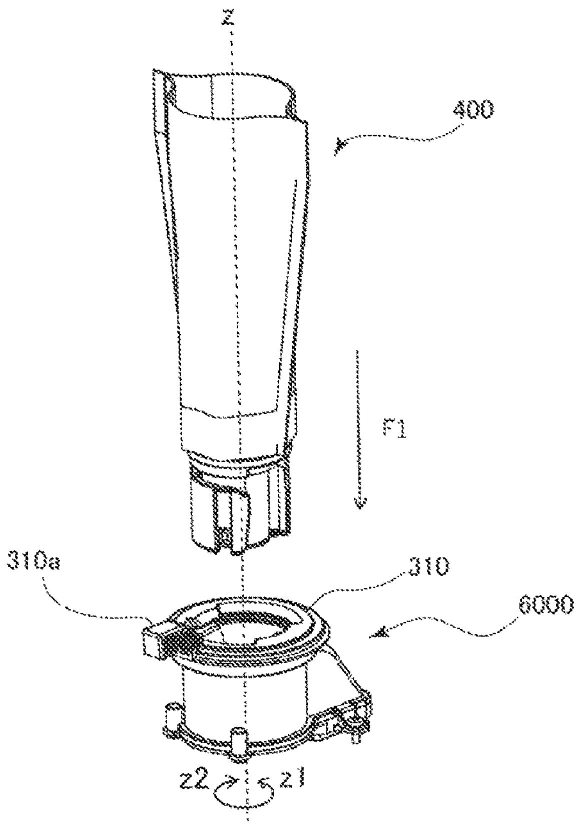
FIG. 44A is a perspective view illustrating a state immediately before the toner pack is mounted on the toner receiving unit.
Figure 44B:
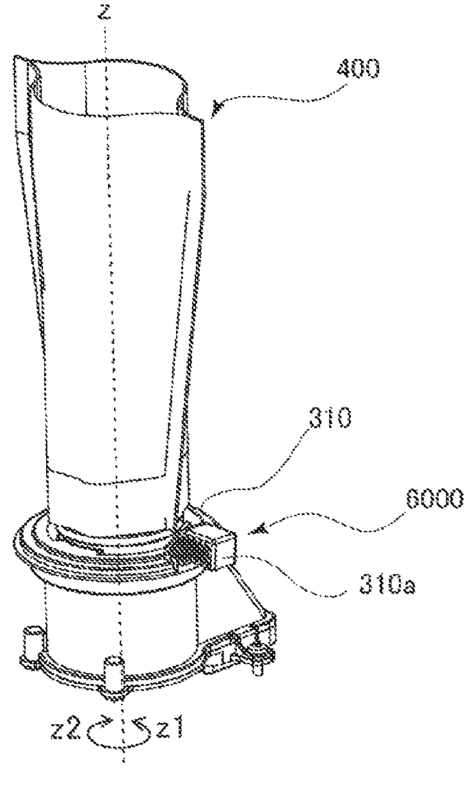
FIG. 44B is a perspective view illustrating a state in which the toner pack is mounted on the toner receiving unit.
Figure 45A:
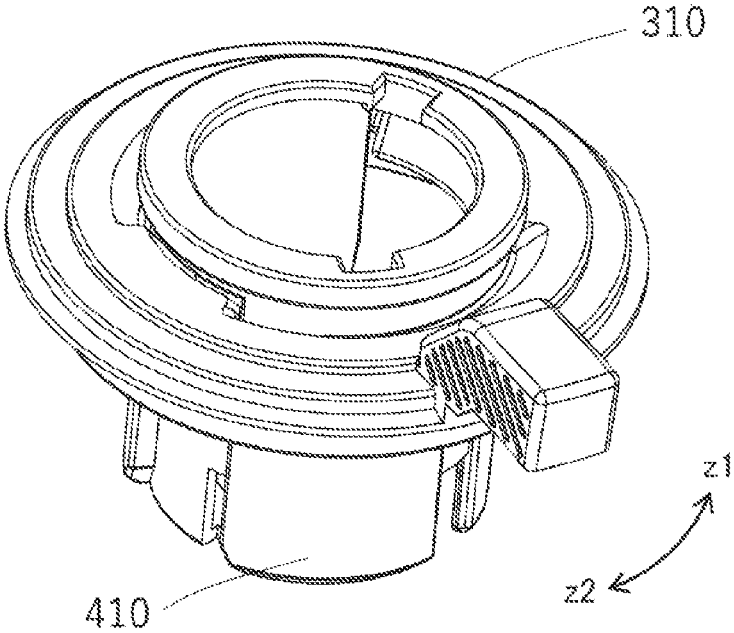
FIG. 45A is a perspective view illustrating an operation lever and the shutter member when the toner pack and the toner receiving unit are in the shielded state.
Figure 45B:
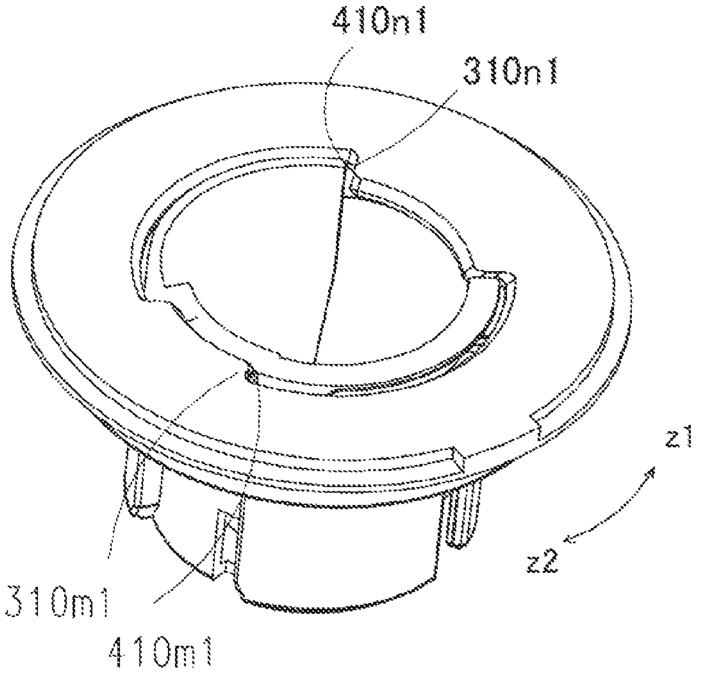
FIG. 45B is a perspective view illustrating a state in which a part of FIG. 45A is cut off.
Figure 46A:
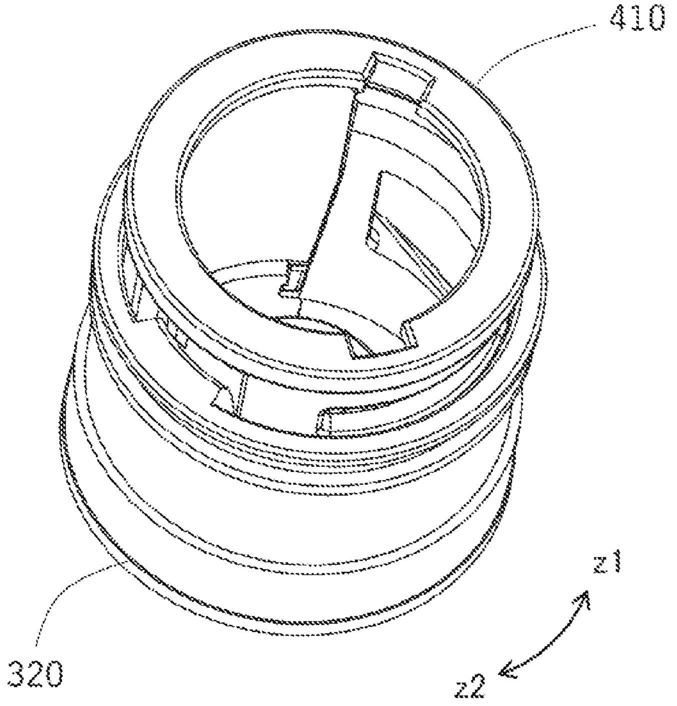
FIG. 46A is a perspective view illustrating the shutter member and a container inlet when the toner pack and the toner receiving unit are in the shielded state.
Figure 46B:
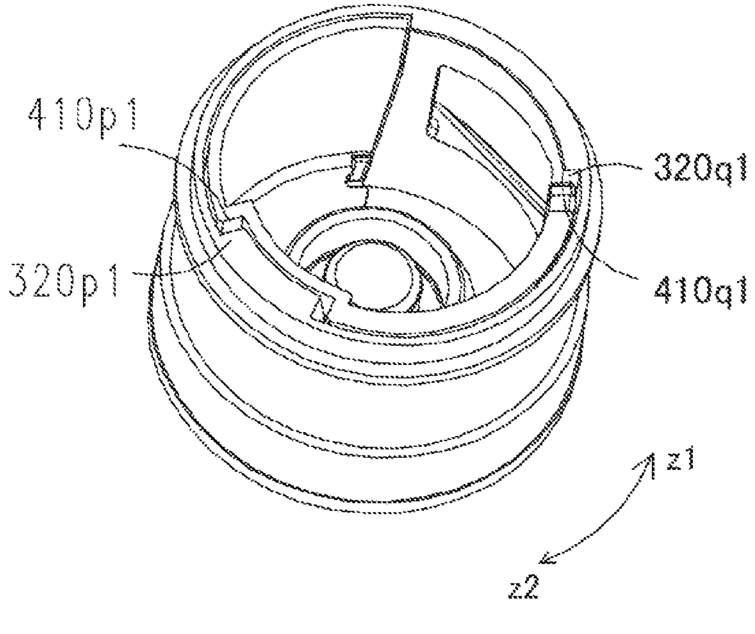
FIG. 46B is a perspective view illustrating a state in which a part of FIG. 46A is cut off.

FIGS. 44A and 44B are perspective views illustrating a state in which the toner pack 400 is mounted on the toner receiving unit 6000. FIG. 45A is a perspective view illustrating a relationship between the operation lever 310 and the shutter member 410 when the toner pack 400 transitions from the shielded state to the open state, and FIG. 45B is a perspective view of FIG. 45A taken along a predetermined cross section. FIG. 46A is a perspective view illustrating a relationship between the shutter member 410 and the container inlet 320 when the toner pack 400 transitions from the shielded state to the open state, and FIG. 46B is a perspective view of FIG. 46A taken along a predetermined cross section.

Figure 47A:
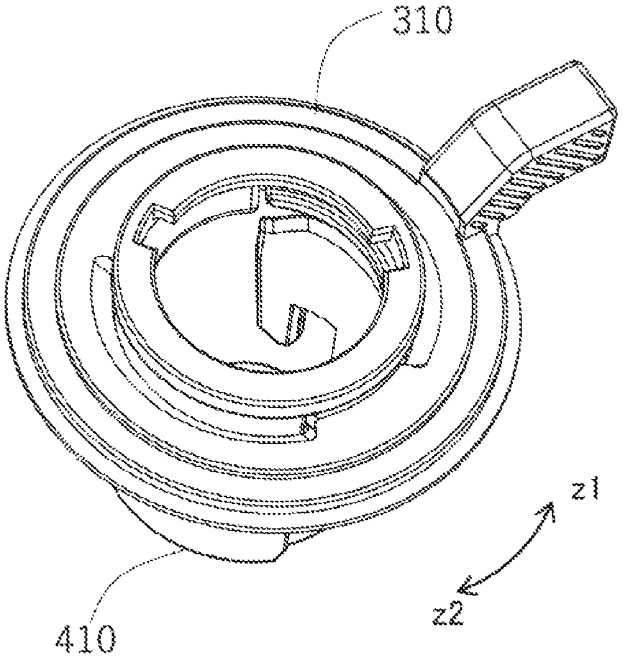
FIG. 47A is a perspective view illustrating the operation lever and the shutter member when the toner pack and the toner receiving unit are in the open state.
Figure 47B:
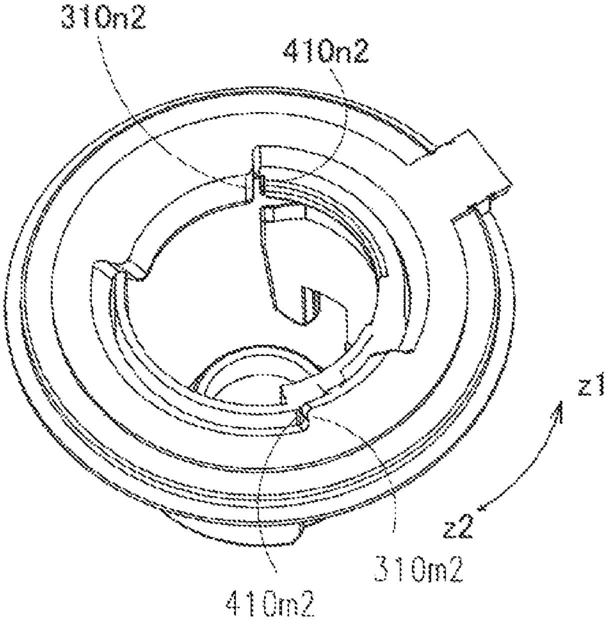
FIG. 47B is a perspective view illustrating a state in which a part of FIG. 47A is cut off.
Figure 48A:
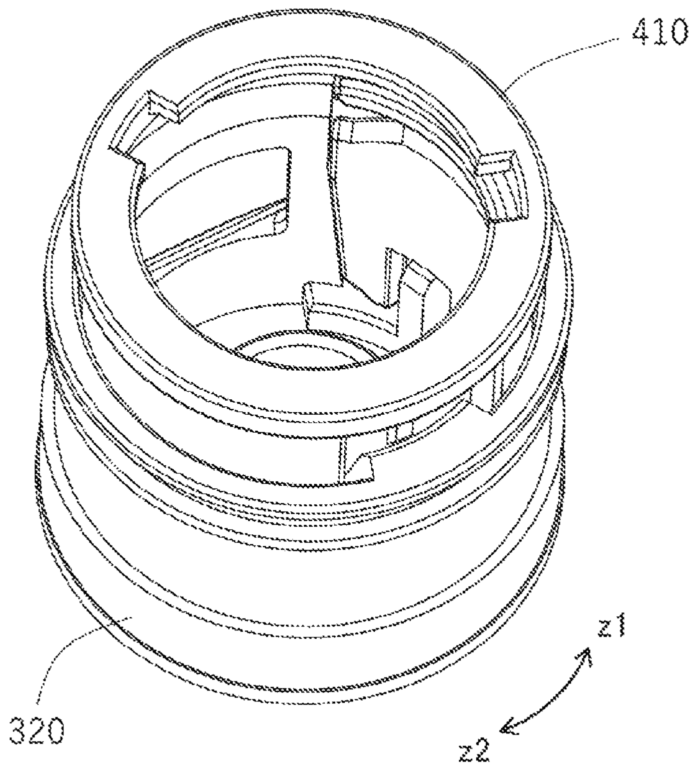
FIG. 48A is a perspective view illustrating the shutter member and the container inlet when the toner pack and the toner receiving unit are in the open state.
Figure 48B:
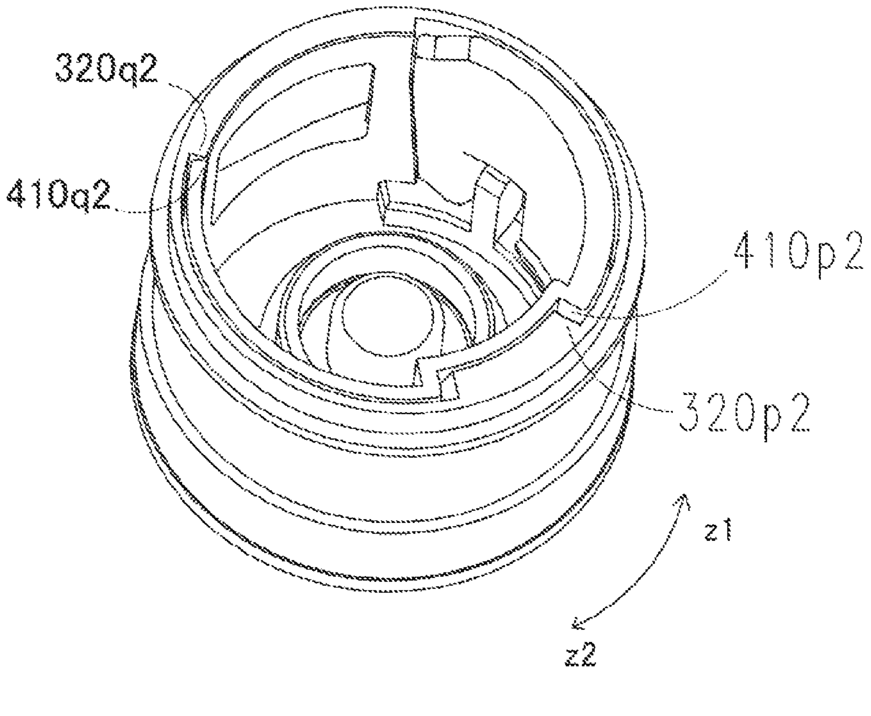
FIG. 48B is a perspective view illustrating a state in which a part of FIG. 48A is cut off.
Figure 49:
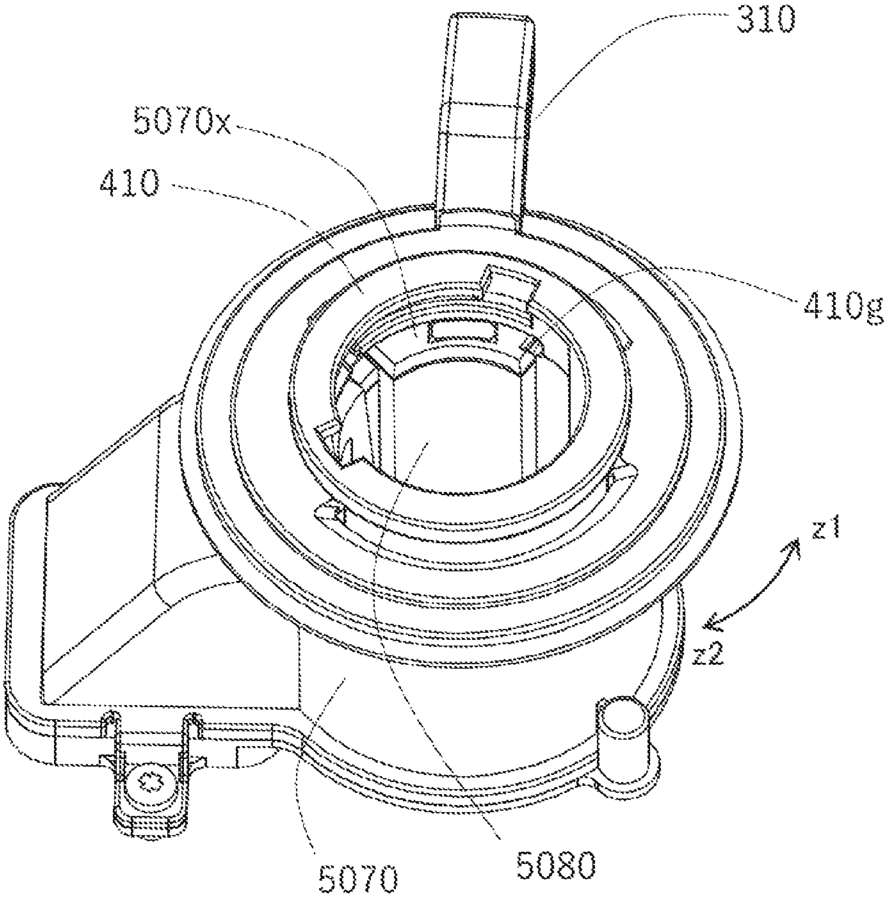
FIG. 49 is an explanatory view for explaining a configuration in which the toner pack does not come off from the toner receiving unit during toner replenishment.

FIG. 47A is a perspective view illustrating a relationship between the operation lever 310 and the shutter member 410 when the toner pack 400 transitions from the open state to the shielded state, and FIG. 47B is a perspective view of FIG. 47A taken along a predetermined cross section. FIG. 48A is a view illustrating a relationship between the shutter member 410 and the container inlet 320 when the toner pack 400 transitions from the open state to the shielded state, and FIG. 48B is a perspective view of FIG. 48A taken along a predetermined cross section. FIG. 49 is a perspective view illustrating a state of the shutter member 410 when the toner pack 400 is mounted on the toner receiving unit 6000 and is in an open state.

When replenishing the toner in the toner pack 400 to the developing container 32, the user first mounts the toner pack 400 on the toner receiving unit 6000 in a mounting direction F1 along the rotation axis z as illustrated in FIGS. 44A and 44B. When mounting the toner pack 400 on the toner receiving unit 6000, the user mounts the toner pack 400 in a state in which the concave portion 5010*f* of the replenishing base 5010 of the toner pack 400 is aligned so as to be engaged with the inlet member 5080 of the toner receiving unit 6000. As a result, the phases of the toner pack 400 and the toner receiving unit 6000 in the rotation direction become appropriate positions. In addition, since the side end surfaces 5010*s* and 5010*t* of the concave portion 5010*f* of the replenishing base 5010 are engaged with the side end surfaces 5080*c* and 5080*d* of the inlet member 5080, respectively, the replenishing base 5010 of the toner pack 400 does not rotate with respect to the main body base portion 5300. In other words, when the toner pack 400 is mounted on the image forming apparatus 1, the concave portion 5010*f* as an engaging portion is engaged with the inlet member 5080 as an engaged portion of the image forming apparatus 1 to thereby restrict the rotation of the replenishing base 5010 with respect to the image forming apparatus 1.

At this time, a hole 410*d* (see FIG. 37B) of the shutter member 410 is engaged with a cylindrical portion 320*e* (see FIG. 42A) of the container inlet 320. Thereafter, the user grips the grip portion 310*a* of the operation lever 310 and rotates the operation lever 310 in the direction of arrow z1 about the rotation axis z.

As a result, as illustrated in FIGS. 45A and 45B, a surface 310*m*1 as a second engaging portion of the operation lever 310 and a surface 410*m*1 as a first engaged portion of the shutter member 410 on the toner pack 400 side are engaged with each other. In addition, a surface 310*n*1 of the operation lever 310 and a surface 410*n*1 of the shutter member 410 on the toner pack 400 side are engaged with each other. With the engagement of these surfaces, the shutter member 410 also rotates in the direction of arrow z1 along with the rotation of the operation lever 310 in the direction of arrow z1.

At the same time, as illustrated in FIGS. 46A and 46B, a surface 410*p*1 as a first engaging portion of the shutter member 410 and a surface 320*p*1 as a second engaged portion of the container inlet 320 on the toner receiving unit 6000 side are engaged. Further, a surface 410*q*1 of the shutter member 410 and a surface 320*q*1 of the container inlet 320 on the toner receiving unit 6000 side are engaged with each other. With the engagement of these surfaces, the container inlet 320 also rotates in the direction of arrow z1 along with the rotation of the shutter member 410 in the direction of arrow z1. As a result, the toner receiving unit 6000 is also switched from the shielded state to the open state at the same time as the toner pack 400 is switched from the shielded state to the open state, so that the toner can be replenished to the developing container 32.

Conversely, when the user shifts the toner pack 400 from the shielded state to the open state, the operation lever 310 is rotated in the direction of arrow z2 about the rotation axis z. As a result, as illustrated in FIGS. 47A and 47B, a surface 310*m*2 as a second engaging portion of the operation lever 310 and a surface 410*m*2, serving as a first engaged portion, of the shutter member 410 on the toner pack 400 side are engaged with each other. In addition, a surface 310*n*2 of the operation lever 310 and a surface 410*n*2 of the shutter member 410 on the toner pack 400 side are engaged with each other. With the engagement of these surfaces, the shutter member 410 also rotates in the direction of arrow z2 along with the rotation of the operation lever 310 in the direction of arrow z2.

At the same time, as illustrated in FIGS. 48A and 48B, a surface 410*p*2 as a first engaging portion of the shutter member 410 and a surface 320*p*2, serving as a second engaged portion, of the container inlet 320 on the toner receiving unit 6000 side are engaged. Further, a surface 410*q*2 of the shutter member 410 and a surface 320*q*2 of the container inlet 320 on the toner receiving unit 6000 side are engaged with each other. With the engagement of these surfaces, the container inlet 320 also rotates in the direction of arrow z2 along with the rotation of the shutter member 410 in the direction of arrow z2. As a result, the toner pack 400 is switched from the open state to the shielded state, and at the same time, the toner receiving unit 6000 is also switched from the open state to the shielded state.

The toner pack 400 enters such that a groove 410*g* of the shutter member 410 sandwiches a surface 5070*x* of the inflow port 5070 as illustrated in FIG. 49 so that the toner pack 400 does not come out of the toner receiving unit 6000 due to an erroneous operation by the user when shifting from the shielded state to the open state. Therefore, when the toner pack 400 starts to shift to the open state, the toner pack 400 is prevented from moving from the toner receiving unit 6000 in a direction opposite to the mounting direction F1. That is, the toner pack 400 cannot be removed from the toner receiving unit 6000.

As described above, in the present embodiment, the toner pack 400 is mounted on the toner receiving unit 6000, and the operation lever 310 on the toner receiving unit 6000 side is rotated. Then, the shutter member 410 on the toner pack 400 side rotates (turns) with the rotation of the operation lever 310, and the container inlet 320 on the toner receiving unit 6000 side rotates with the rotation of the shutter member 410. As a result, the toner pack 400 and the toner receiving unit 6000 transition between the shielded state and the open state, and mounting and dismounting of the toner pack 400 and replenishment of the toner can be easily performed.

In addition, since the user operates the operation lever 310 on the toner receiving unit 6000 side, the container unit 4010 including the pouch 5030 of the toner pack 400 does not rotate. Therefore, the pouch 5030 does not need to have so much stiffness, the pouch 5030 can be formed of a highly flexible member, and the toner in the pouch 5030 can be easily discharged to the end. In particular, since the pouch 5030 is not operated in the direction of twisting around the rotation axis z, a large shearing force is not applied to the pouch 5030.

In addition, in the configuration of the present embodiment, since the user operates the operation lever 310 which is a part of the developing container 32 attached to the image forming apparatus 1 to replenish toner, the lever ratio of the grip portion 310*a* of the operation lever can be increased. Therefore, by reducing the operation load of the user, a replenishment configuration with good usability can be achieved.

Incidentally, the usability may be improved by imparting a click feeling when the toner pack 400 is inserted into the toner receiving unit 6000 or imparting a click feeling when the toner pack 400 transitions between the shielded state and the open state.

Further, the colors of the outer ring member 5020, the replenishing base 5010, and the shutter member 410 of the toner pack 400 may be matched with the colors of the operation lever 310 and the inflow port 5070. As a result, since the user can easily recognize the replenishment place, usability is improved.

In addition, since the configuration for suppressing toner leakage between the toner pack 400 and the toner receiving unit 6000 is similar to that of the first embodiment, the description thereof is omitted here.

Further, in the present embodiment, the operation lever 310, the shutter member 410, and the container inlet 320 are configured to be engaged and interlocked with two surfaces, respectively, but the present invention is not limited thereto. For example, the operation lever 310, the shutter member 410, and the container inlet 320 may be configured to be engaged and interlocked with one surface or three or more surfaces.

Sixth Embodiment

Next, a sixth embodiment of the present invention will be described, and the sixth embodiment is obtained by changing the configuration of the toner pack 400 of the fifth embodiment. Therefore, configurations similar to those of the fifth embodiment will be described by omitting illustration and explanation or attaching the same reference numerals to the drawings.

Configuration of Toner Pack

Figure 50A:
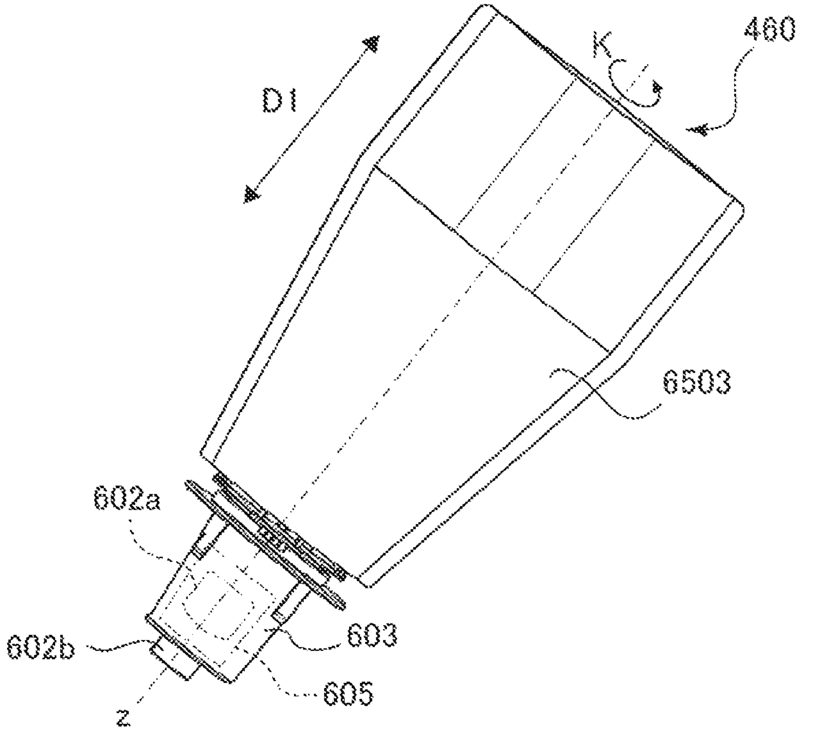
FIG. 50A is a front view illustrating the toner pack when a pack-side shutter is at a shielding position.
Figure 50B:
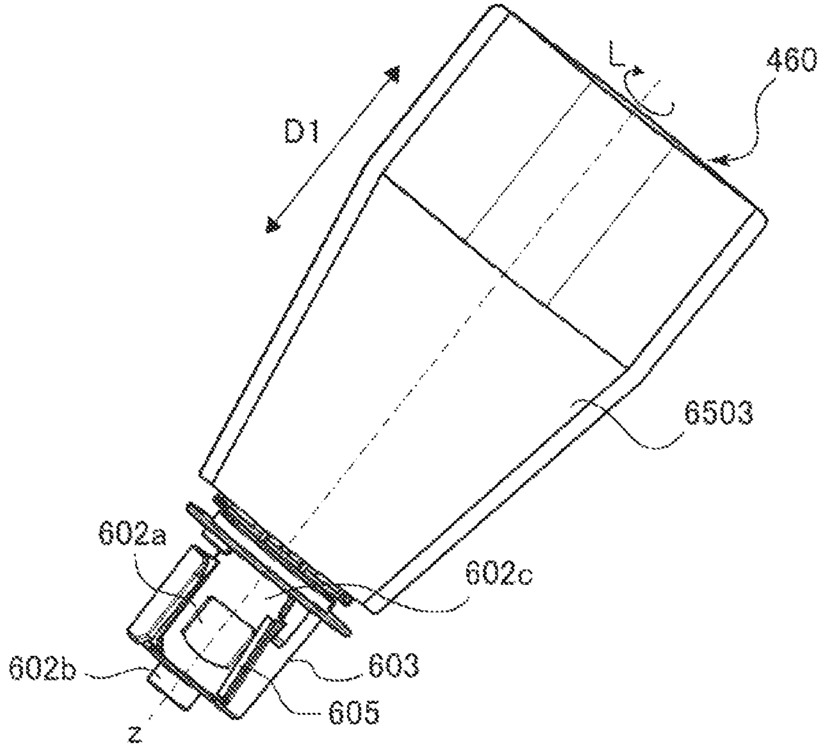
FIG. 50B is a front view illustrating the toner pack when the pack-side shutter is at an open position.
Figure 51:
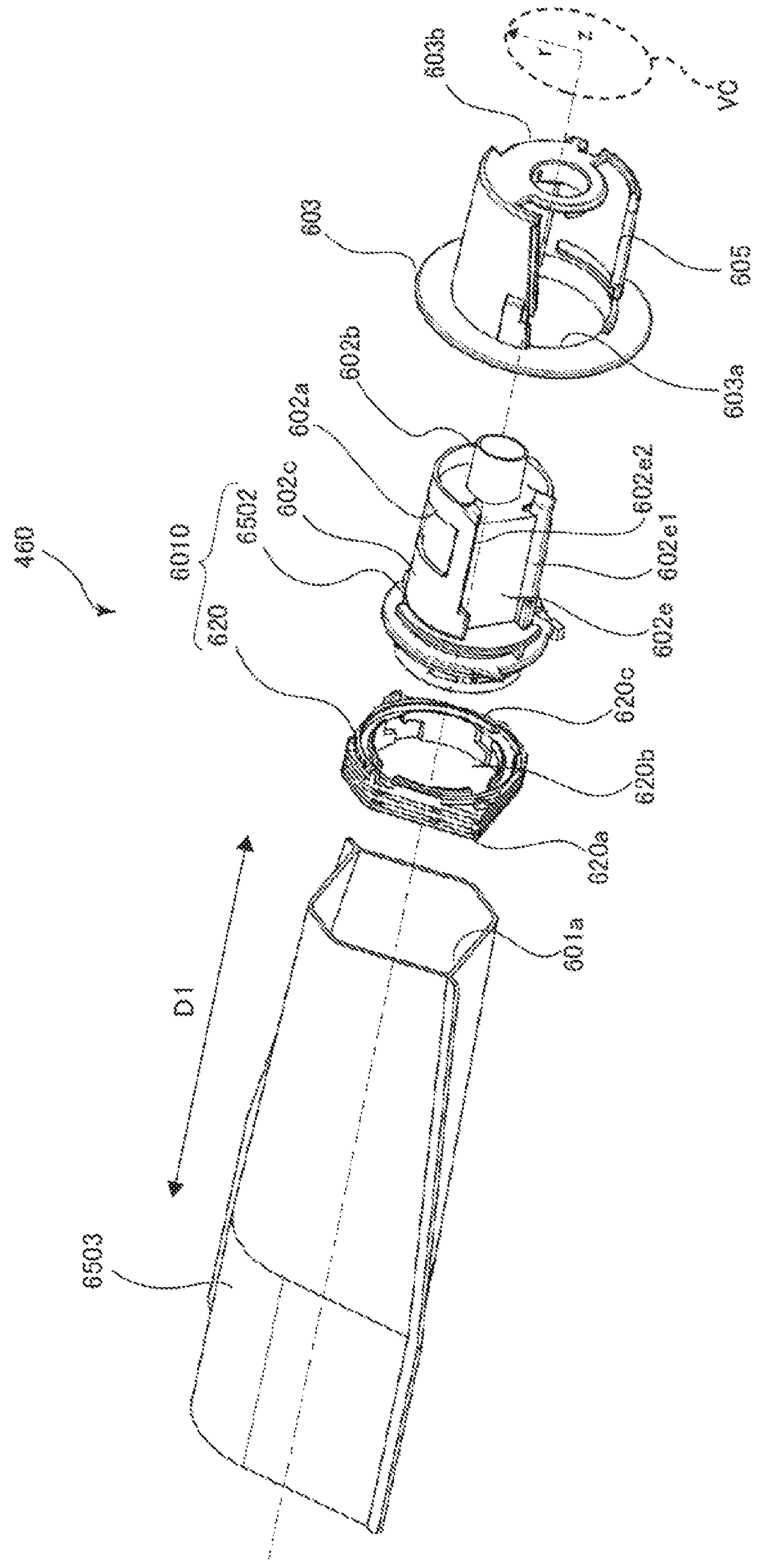
FIG. 51 is an exploded perspective view showing the toner pack.
Figure 52A:
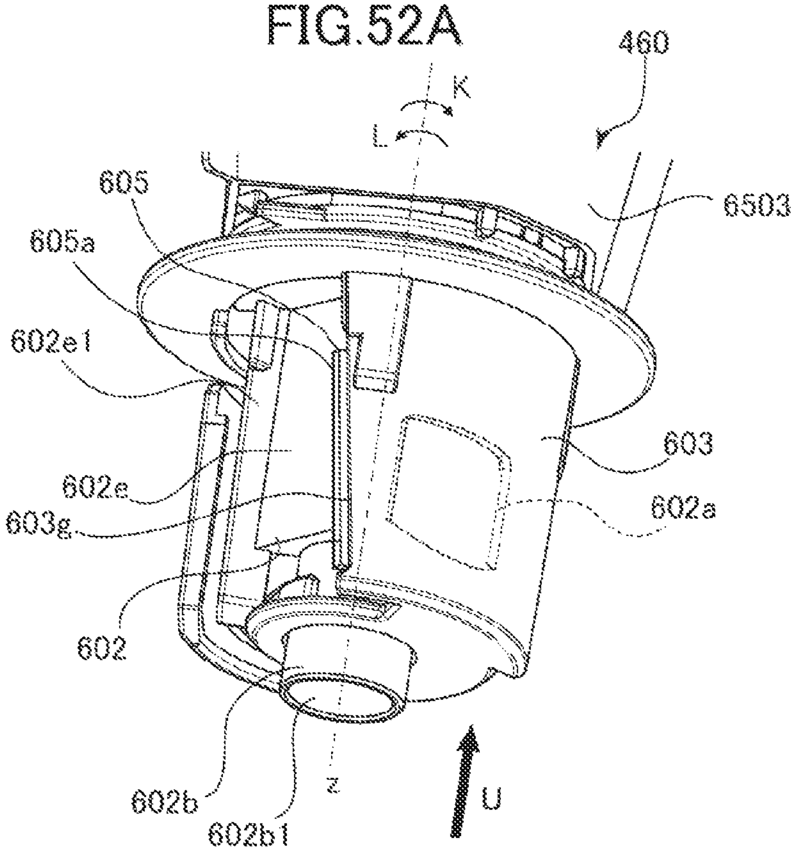
FIG. 52A is an enlarged view illustrating the vicinity of a nozzle when the pack-side shutter is at the shielding position.
Figure 52B:
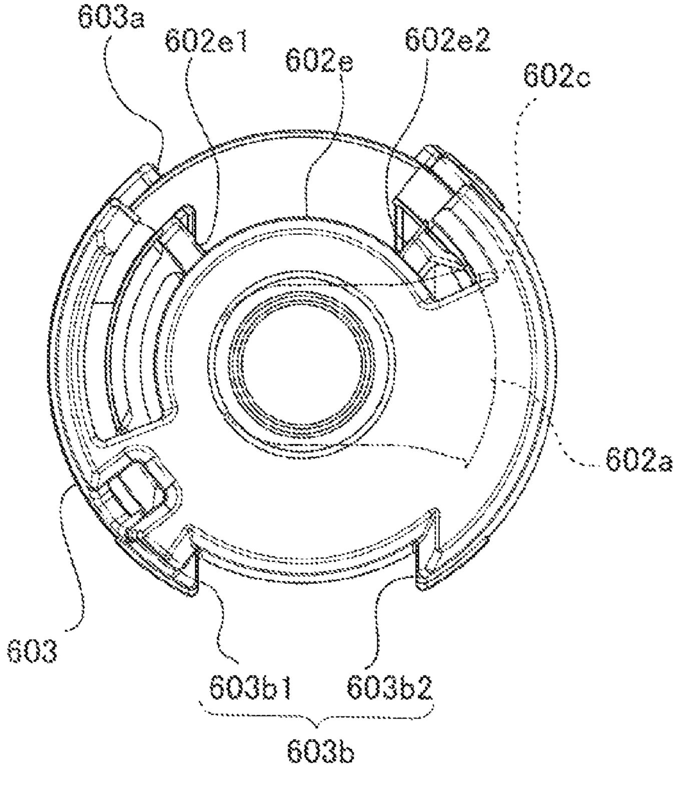
FIG. 52B is a view of the toner pack as viewed in a direction of arrow U in FIG. 52A.
Figure 53A:
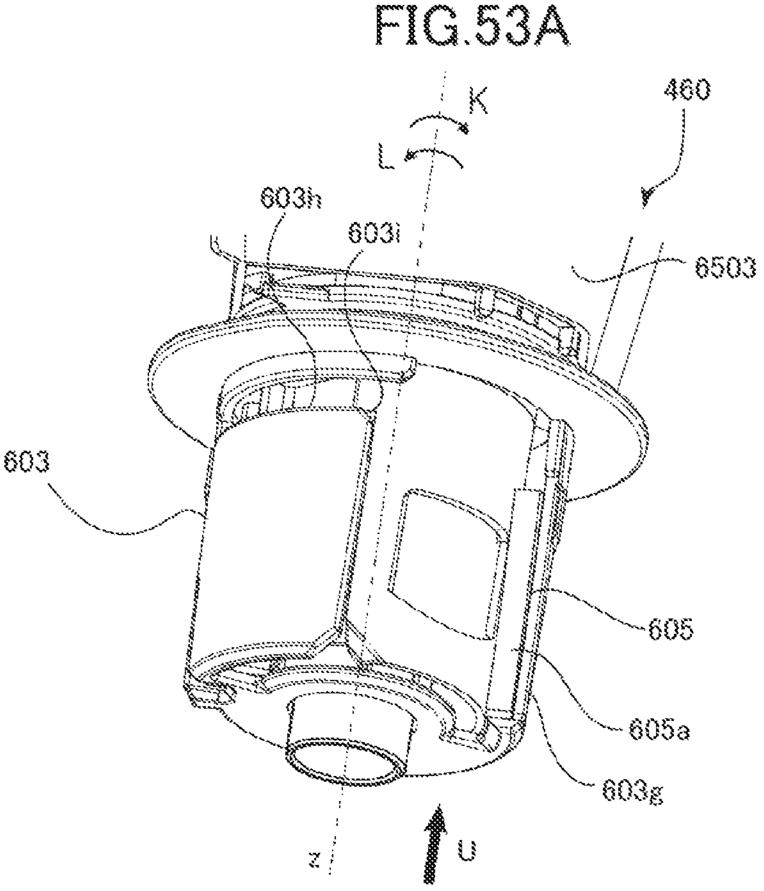
FIG. 53A is an enlarged view illustrating the vicinity of the nozzle when the pack-side shutter is at the open position.
Figure 53B:
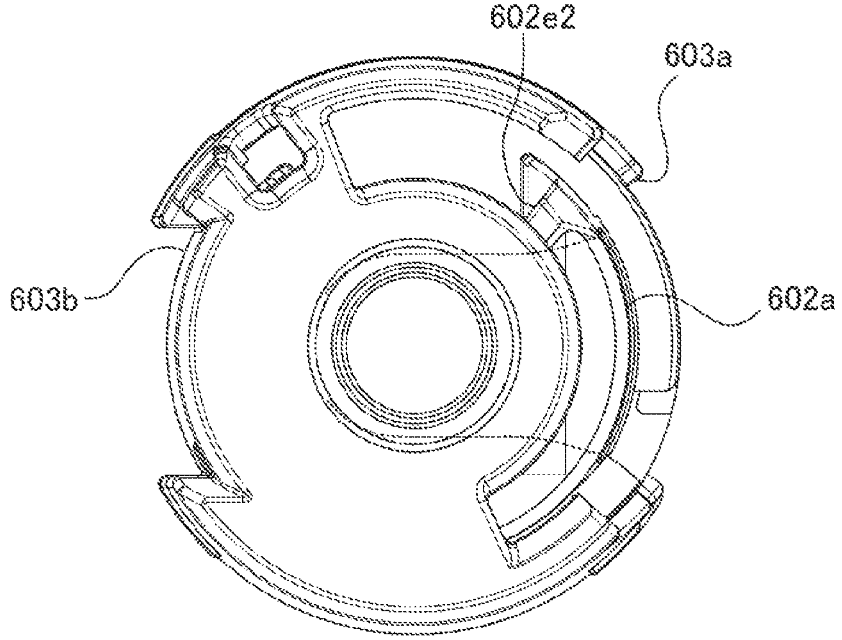
FIG. 53B is a view of the toner pack as viewed in a direction of arrow U in FIG. 53A.

First, a basic configuration of a toner pack 460 that is mountable on and dismountable from the image forming apparatus 1 as an apparatus main body and stores toner will be described with reference to FIGS. 50A to 53B. More specifically, the toner pack 460 as a toner container is mounted on amounting portion 606 described below. FIG. 50A is a front view of the toner pack 460 when a pack-side shutter 603 is at the shielding position. FIG. 50B is a front view of the toner pack 460 when the pack-side shutter 603 is at the open position. FIG. 51 is an exploded perspective view of the toner pack 460. FIG. 52A is an enlarged view of the vicinity of a nozzle 6502 when the pack-side shutter 603 is at the shielding position. FIG. 52B is a view of the toner pack 460 as viewed in a direction of arrow U in FIG. 52A. FIG. 53A is an enlarged view of the vicinity of the nozzle 6502 when the pack-side shutter 603 is at the open position. FIG. 53B is a view of the toner pack 460 as viewed in a direction of arrow U in FIG. 53A.

The toner pack 460 includes a pouch 6503 as a first toner storage unit that stores toner, an outer ring member 620 coupled to the pouch 6503, the nozzle 6502, and the pack-side shutter 603. The outer ring member 620 and the nozzle 6502 constitute a container base portion 6010 connected to the pouch 6503. As illustrated in FIGS. 50A and 50B, the pouch 6503 is provided on one end side of the toner pack 460 in an axial direction D1 as a first direction and the direction of a rotation axis. The outer ring member 620, the nozzle 6502, and the pack-side shutter 603 are provided on the other end side of the toner pack 460 in the axial direction D1. The pouch 6503 is formed of, for example, a flexible polypropylene sheet and has a bag shape with one end opened. The pouch 6503 is not limited to a pouch, and may be a bottle made of resin or a container made of paper or vinyl.

As illustrated in FIG. 51, the outer ring member 620 includes a coupling surface 620*a* coupled (fixed) to one end of the pouch 6503, and a connecting portion 620*c* connected to the nozzle 6502. An opening portion 601*a* of the pouch 6503 and the coupling surface 620*a* of the outer ring member 620 are coupled, any coupling method may be used. Examples of the coupling method include a method using various adhesives such as hot melt, a method of thermally welding and coupling the pouch 6503 to the outer periphery of the outer ring member 620, and the like.

The nozzle 6502 as abase member is detachably connected to the connecting portion 620*c* of the outer ring member 620 as a cylindrical member. That is, the outer ring member 620 and the nozzle 6502 are configured to be separable from each other. The connecting portion 620*c* has a hole 620*b*, and the toner can pass through the hole 620*b*. As a result, the toner can be easily filled in the pouch 6503 via the hole 620*b* and the coupling surface 620*a* of the outer ring member 620. For example, the pouch 6503 is filled with toner in a state where the pouch 6503 is coupled below the outer ring member 620, and then the nozzle 6502 is coupled to the outer ring member 620. With such a configuration, it is possible to fill a large amount of toner in a shorter time without using a complicated device. This is because the hole 620*b* of the outer ring member 620 has a larger area than a discharge port 602*a* of the nozzle 6502, the toner can be easily filled, and the toner flow path is simple.

A side surface 602*c* as an outer surface of the nozzle 6502 extending in the axial direction D1 is provided with the discharge port 602*a* configured to communicate with the inside of the pouch 6503, and a concave portion 602*e*. The concave portion 602*e* is provided at a position different from the discharge port 602*a* in the rotation direction of the pack-side shutter 603. The toner stored in the pouch 6503 is discharged to the outside of the toner pack 460 through the discharge port 602*a*. The nozzle 6502 may be integrally formed with the outer ring member 620 and the pouch 6503.

The pack-side shutter 603 as a container shutter and a first shutter is arranged outside the side surface 602*c* of the nozzle 6502. The pack-side shutter 603 is rotatably provided around a rotation axis z extending in a direction along the axial direction D1, and is provided outside the side surface 602*c* in the radial direction r of a virtual circle VC centered on the rotation axis z. The side surface 602*c* of the nozzle 6502 is a curved surface protruding outward in the radial direction r of the virtual circle VC centered on the rotation axis z. An inner surface of the pack-side shutter 603, that is, a surface facing the side surface 602*c* is a curved surface along the side surface 602*c* of the nozzle 6502, and a pack-side seal 605 as a substantially rectangular first seal member is attached to the inner surface of the pack-side shutter 603. As illustrated in FIGS. 52A and 52B, an end surface 603*g* forming an opening 603*a* of the pack-side shutter 603 and an end surface 605*a* of the pack-side seal 605 are inclined surfaces inclined with respect to the rotation axis z. The end surface 605*a* of the pack-side seal 605 is attached to a position protruding toward the opening 603*a* from the end surface 603*g* of the pack-side shutter 603.

The pack-side shutter 603 is configured to be rotatable about the rotation axis z between a shielding position as a first shielding position at which the pack-side seal 605 shields the discharge port 602*a* of the nozzle 6502 and an open position as a first open position at which the discharge port 602*a* is opened. When the pack-side shutter 603 is at the open position, the discharge port 602*a* of the nozzle 6502 is exposed from the opening 603*a*. As illustrated in FIG. 52A, when the pack-side shutter 603 is at the shielding position, at least a part of the concave portion 602*e* of the nozzle 6502 is exposed from the pack-side shutter 603 through the opening 603*a*.

FIGS. 50A and 52A illustrate a state in which the pack-side shutter 603 is at the shielding position. FIGS. 50B and 53A illustrate a state in which the pack-side shutter 603 is at the open position. As illustrated in FIGS. 50A and 52A, when the pack-side shutter 603 at the shielding position is rotated in a direction of arrow K about the rotation axis z, the pack-side shutter 603 reaches the open position illustrated in FIGS. 50B and 53A. Conversely, when the pack-side shutter 603 at the open position is rotated in a direction of arrow L, the pack-side shutter 603 reaches the shielding position. In the rotation operation of the pack-side shutter 603, the pack-side shutter 603 slides against the side surface 602*c* of the nozzle 6502 via the pack-side seal 605.

Mounting Portion

Figure 54A:
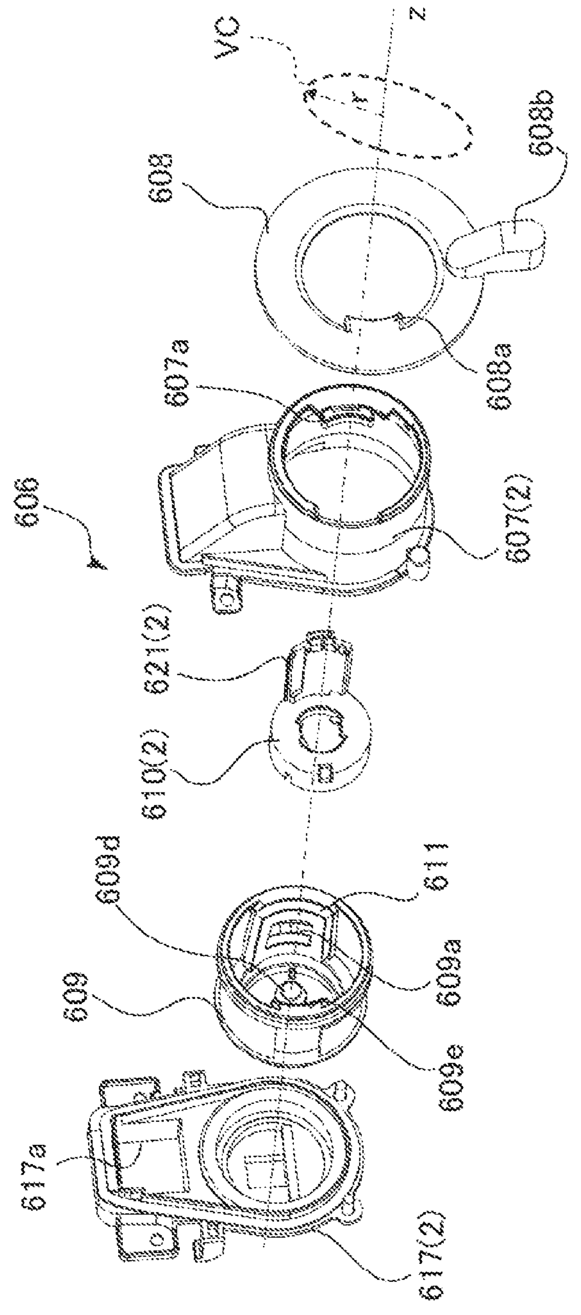
FIG. 54A is an exploded perspective view illustrating a mounting portion.
Figure 54B:
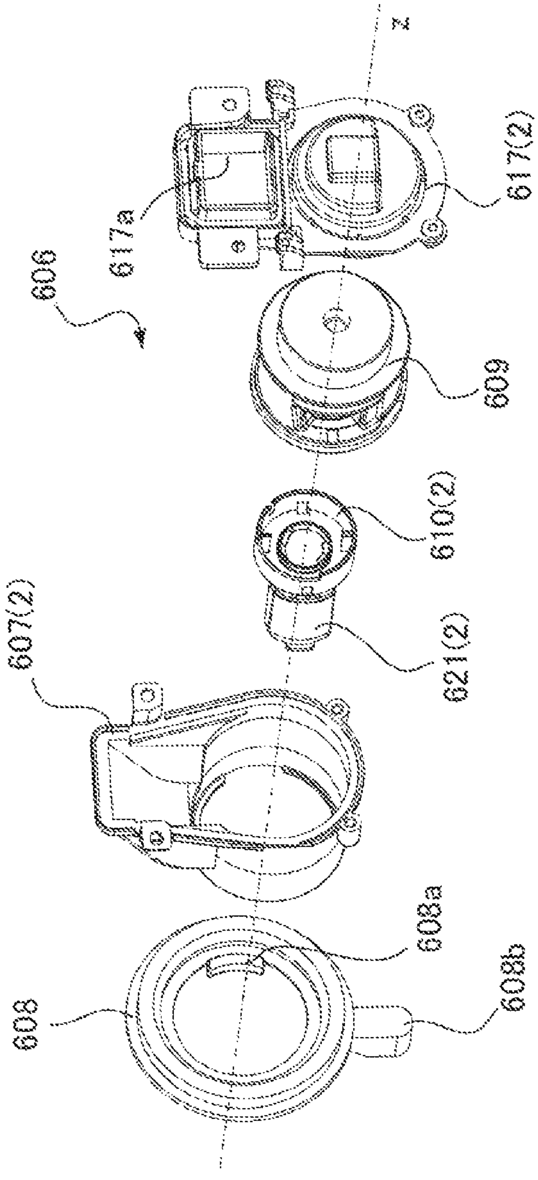
FIG. 54B is an exploded perspective view of the mounting portion as viewed from a direction different from that in FIG. 54A.
Figure 55A:
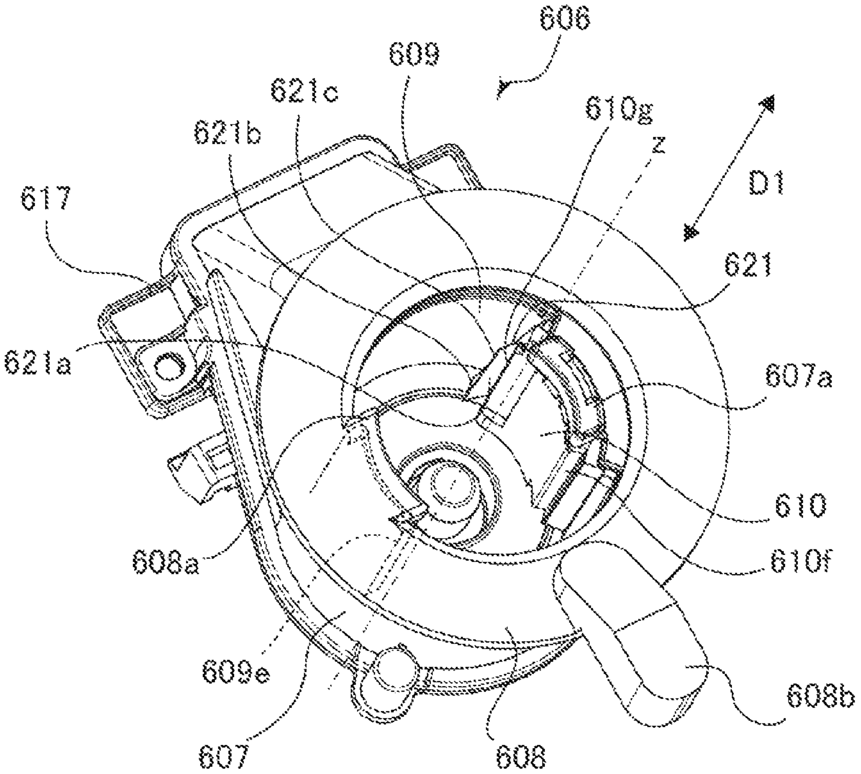
FIG. 55A is a perspective view showing an appearance of the mounting portion when the lever is in a closed position.
Figure 55B:
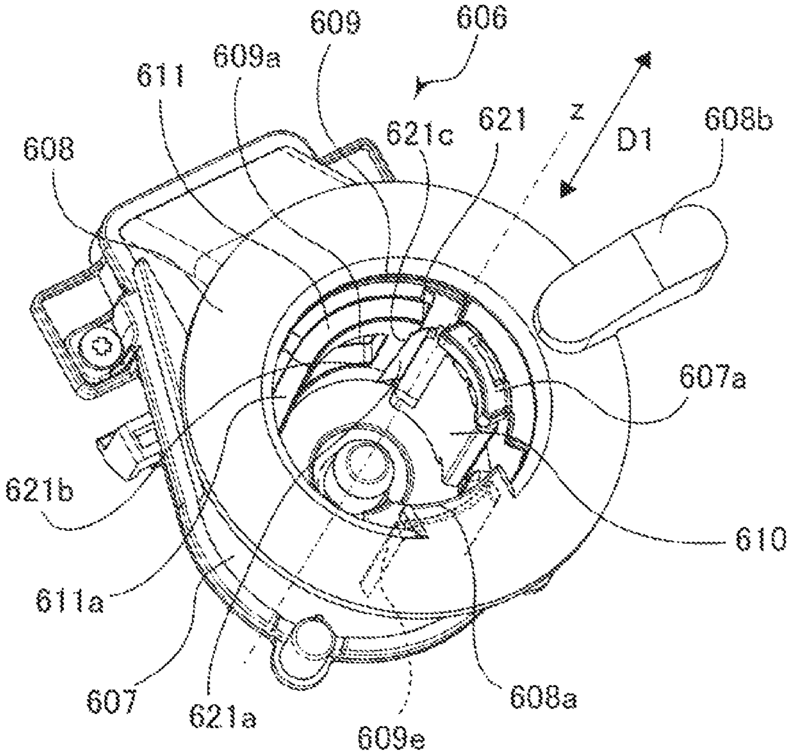
FIG. 55B is a perspective view showing an appearance of the mounting portion when the lever is in an open position.
Figure 56A:
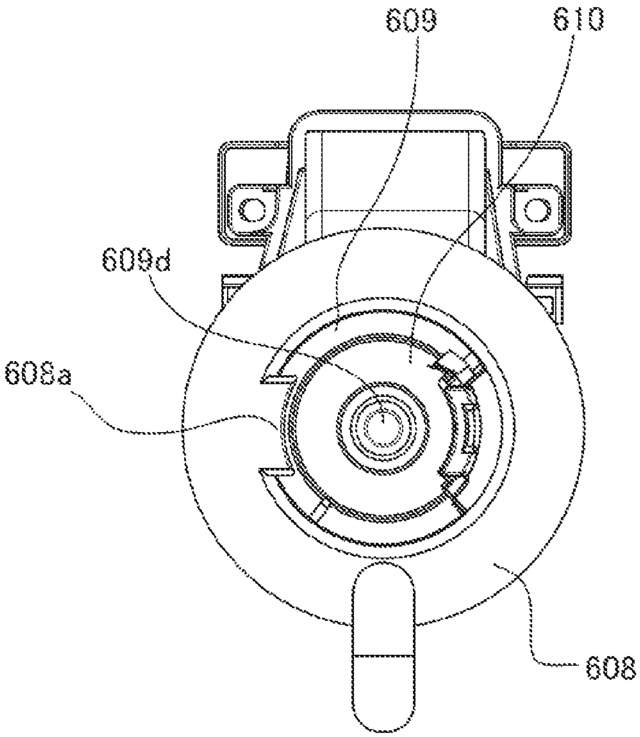
FIG. 56A is a view of the mounting portion when the lever is at the closed position as viewed from amounting direction.
Figure 56B:
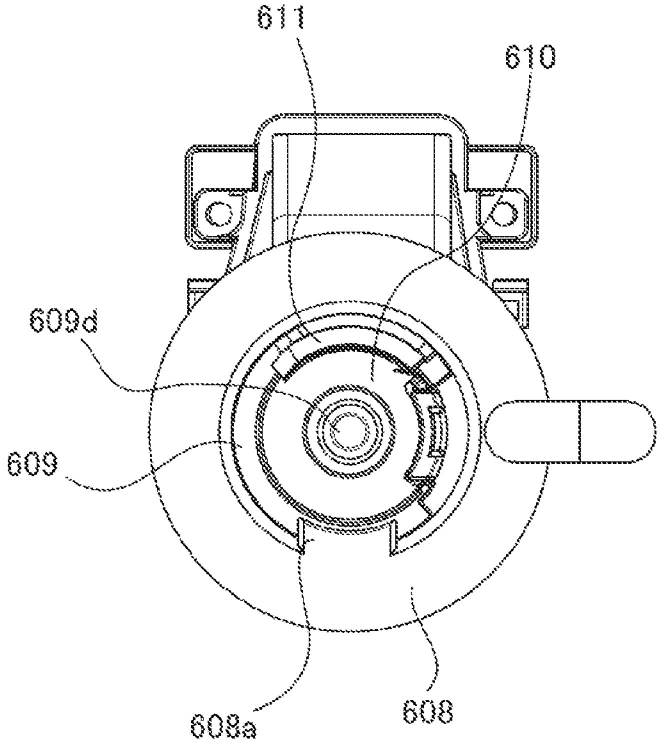
FIG. 56B is a view of the mounting portion when the lever is at the open position as viewed from the mounting direction.

Next, a configuration of the mounting portion 606 to which the toner pack 460 is mounted will be described with reference to FIGS. 54A to 58B. In the present embodiment, the mounting portion 606 is a unit for mounting the toner pack 460, and is provided in the image forming apparatus 1 (see FIG. 2). FIG. 54A is an exploded perspective view of the mounting portion 606. FIG. 54B is an exploded perspective view of the mounting portion 606 as viewed from a direction different from that in FIG. 54A. FIGS. 55A and 56A are a perspective view illustrating the appearance of the mounting portion 606 when a lever 608 is at the closed position and a view of the mounting portion 606 viewed from a mounting direction M, respectively. FIGS. 55B and 56B area perspective view illustrating the appearance of the mounting portion 606 when the lever 608 is in the open position and a view of the mounting portion 606 viewed from the mounting direction M, respectively.

Figure 57A:
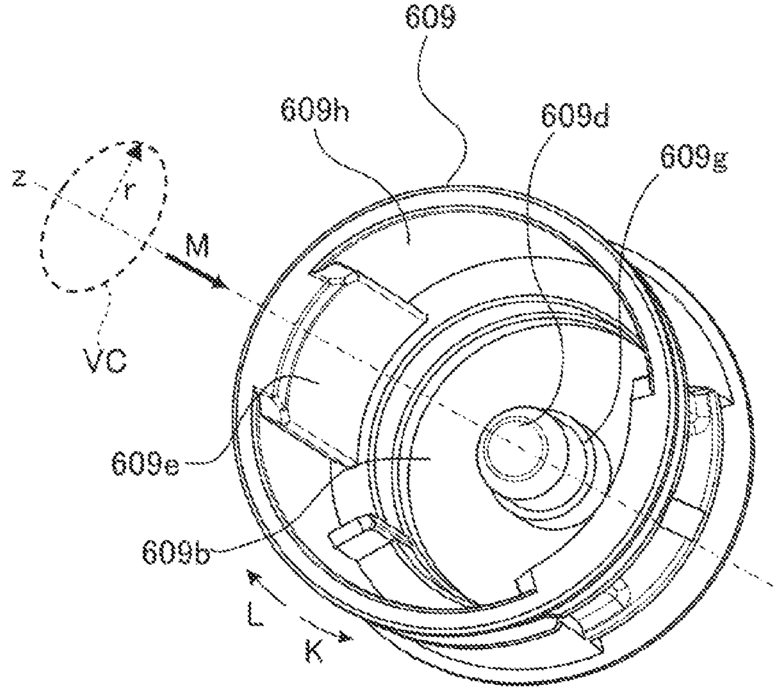
FIG. 57A is a perspective view illustrating an apparatus-side shutter.
Figure 57B:
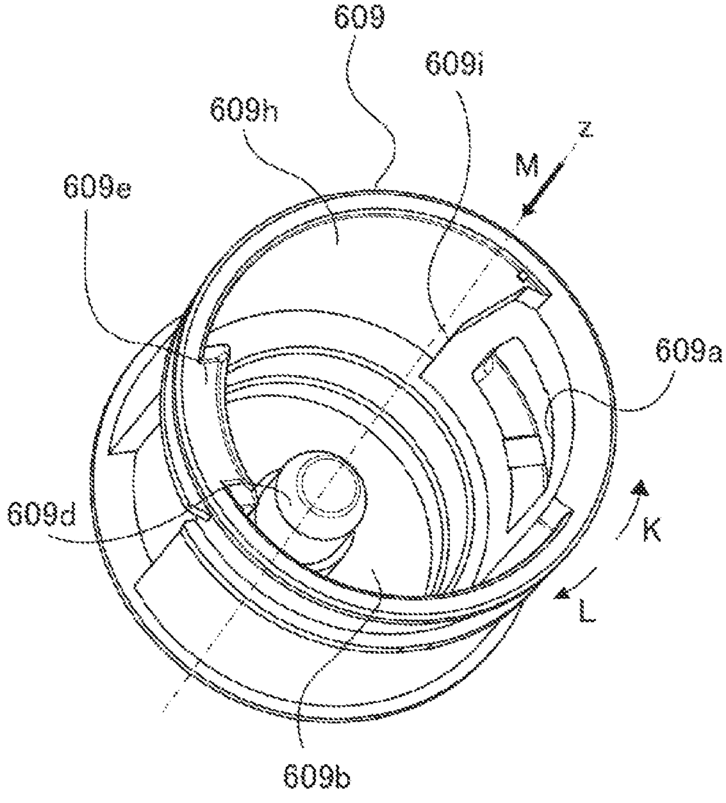
FIG. 57B is a perspective view illustrating the apparatus-side shutter as viewed from a direction different from that in FIG. 57A.
Figure 58A:
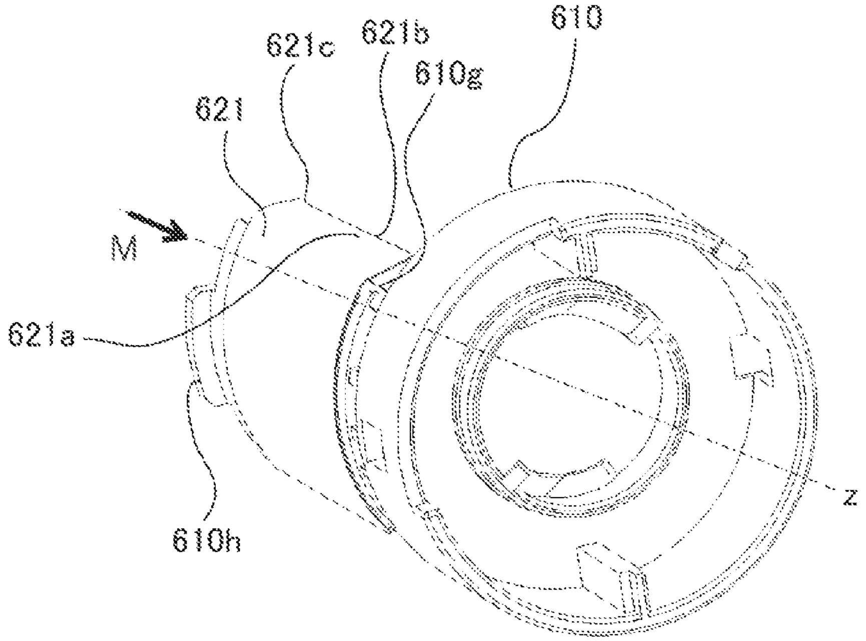
FIG. 58A is a perspective view illustrating a cover and a shutter sheet.
Figure 58B:
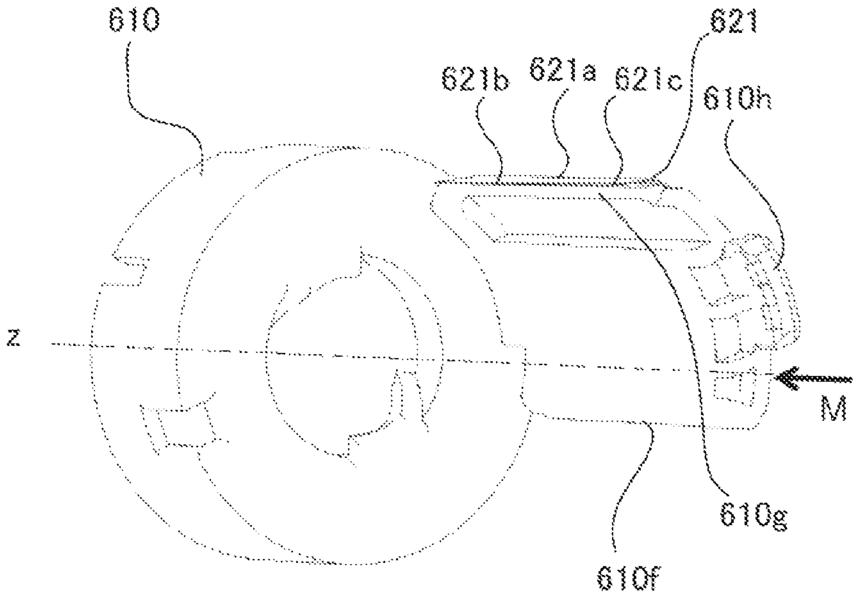
FIG. 58B is a perspective view illustrating the cover and the shutter sheet as viewed from a direction different from that in FIG. 58A.

FIG. 57A is a perspective view of an apparatus-side shutter 609 as viewed from the upstream side in the mounting direction M. FIG. 57B is a perspective view of the apparatus-side shutter 609 from a point of sight different from that in FIG. 57A. FIG. 58A is a perspective view of a cover 610 and a shutter sheet 621 as viewed from the downstream side in the mounting direction M. FIG. 58B is a perspective view of the cover 610 as viewed from the upstream side in the mounting direction M.

As illustrated in FIGS. 54A to 55B, the mounting portion 606 has a main body base portion 2, and the main body base portion 2 includes a first frame body 607, a second fame body 617, the cover 610, and the shutter sheet 621. The cover 610 and the second frame body 617 are fixed to the first frame body 607. As illustrated in FIGS. 58A and 58B, the cover 610 includes an engaged portion 610*h* that engages with a positioning portion 607*a* (see FIG. 54A) of the first frame body 607 so as not to rotate about the rotation axis z with respect to the first frame body 607. The first frame body 607, the cover 610, and the second frame body 617 may not be separate members but may be integrally formed. As illustrated in FIGS. 54A and 54B, the second frame body 617 is provided with an apparatus-side opening portion 617*a* as a receiving port, and the apparatus-side opening portion 617*a* communicates with the storage unit 36 (see FIG. 1A) of the developing container 32.

The lever 608 and the apparatus-side shutter 609 are each attached to the main body base portion 2 so as to be rotatable about the rotation axis z. The first frame body 607 is provided with the positioning portion 607*a*. The positioning portion 607*a* protrudes inward from the inner peripheral surface of the first frame body 607 about the rotation axis z in the radial direction r of the virtual circle VC about the rotation axis z.

The lever 608 is provided with a drive transmission portion 608*a* and an operation portion 608*b*. The user can rotate the lever 608 about the rotation axis z with respect to the main body base portion 2 by operating the operation portion 608*b*. As illustrated in FIG. 54A, the drive transmission portion 608*a* of the lever 608 is a protrusion protruding inward from the inner peripheral surface of the lever 608 about the rotation axis z in the radial direction r of the virtual circle VC about the rotation axis z.

As illustrated in FIGS. 57A and 57B, the apparatus-side shutter 609 as a main body shutter and a second shutter includes an inner peripheral surface 609*h*, a communication port 609*a* formed in the inner peripheral surface 609*h* to receive toner from the toner pack 460, and a bottom surface 609*b*. The apparatus-side shutter 609 further includes a center boss 609*d*, a driven transmission portion 609*e*, and a pack abutment surface 609*g*. As illustrated in FIG. 57A, the driven transmission portion 609*e* is a protrusion protruding inward in the radial direction r of the virtual circle VC about the rotation axis z. An apparatus-side seal 611 as a second seal member is attached to the inner peripheral surface 609*h* so as to surround the periphery of the communication port 609*a* (see FIG. 55B).

The apparatus-side shutter 609 is configured to take a shielding position as a second shielding position and an open position as a second open position with respect to the main body base portion 2. More specifically, as illustrated in FIGS. 57A and 57B, the apparatus-side shutter 609 rotates in the direction of arrow K from the shielding position toward the open position, and rotates in a direction of arrow L from the open position toward the shielding position. Note that the direction of arrow K and the direction of arrow L are similar to the direction of arrow K and the direction of arrow L as the rotation direction of the pack-side shutter 603 illustrated in FIG. 52A. In the apparatus-side shutter 609, the communication port 609*a* is not covered by the apparatus-side seal 611 and the cover 610 at the shielding position, and the communication port 609*a* is opened without being covered by the cover 610 at the open position. That is, the communication port 609*a* does not communicate with the apparatus-side opening portion 617*a* of the second frame body 617 when the apparatus-side shutter 609 is located at the shielding position, and communicates with the apparatus-side opening portion 617*a* of the second frame body 617 when the apparatus-side shutter 609 is located at the shielding position.

As illustrated in FIG. 55B, an end surface 611*a* of the apparatus-side seal 611 is disposed so as to protrude in the circumferential direction from an end surface 609*i* (see FIG. 57B) around the communication port 609*a* as an attachment seat surface. The end surface 611*a* is an inclined surface.

The apparatus-side shutter 609 is located at the shielding position in FIGS. 55A and 56A, and at this time, the communication port 609*a* of the apparatus-side shutter 609 does not communicate with the apparatus-side opening portion 617*a* of the second frame body 617. Further, the apparatus-side shutter 609 is located at the open position in FIGS. 55B and 56B, and at this time, the communication port 609*a* of the apparatus-side shutter 609 communicates with the apparatus-side opening portion 617*a* of the second frame body 617. When the apparatus-side shutter 609 moves to the open position, toner can be replenished (supplied) from the toner pack 460 to the storage unit 36 of the developing container 32 via the communication port 609*a*.

Since the driving of the lever 608 and the apparatus-side shutter 609 is not connected, the apparatus-side shutter 609 does not rotate even when the lever 608 is operated in a state where the toner pack 460 is not attached.

Shutter Sheet

Figure 62:
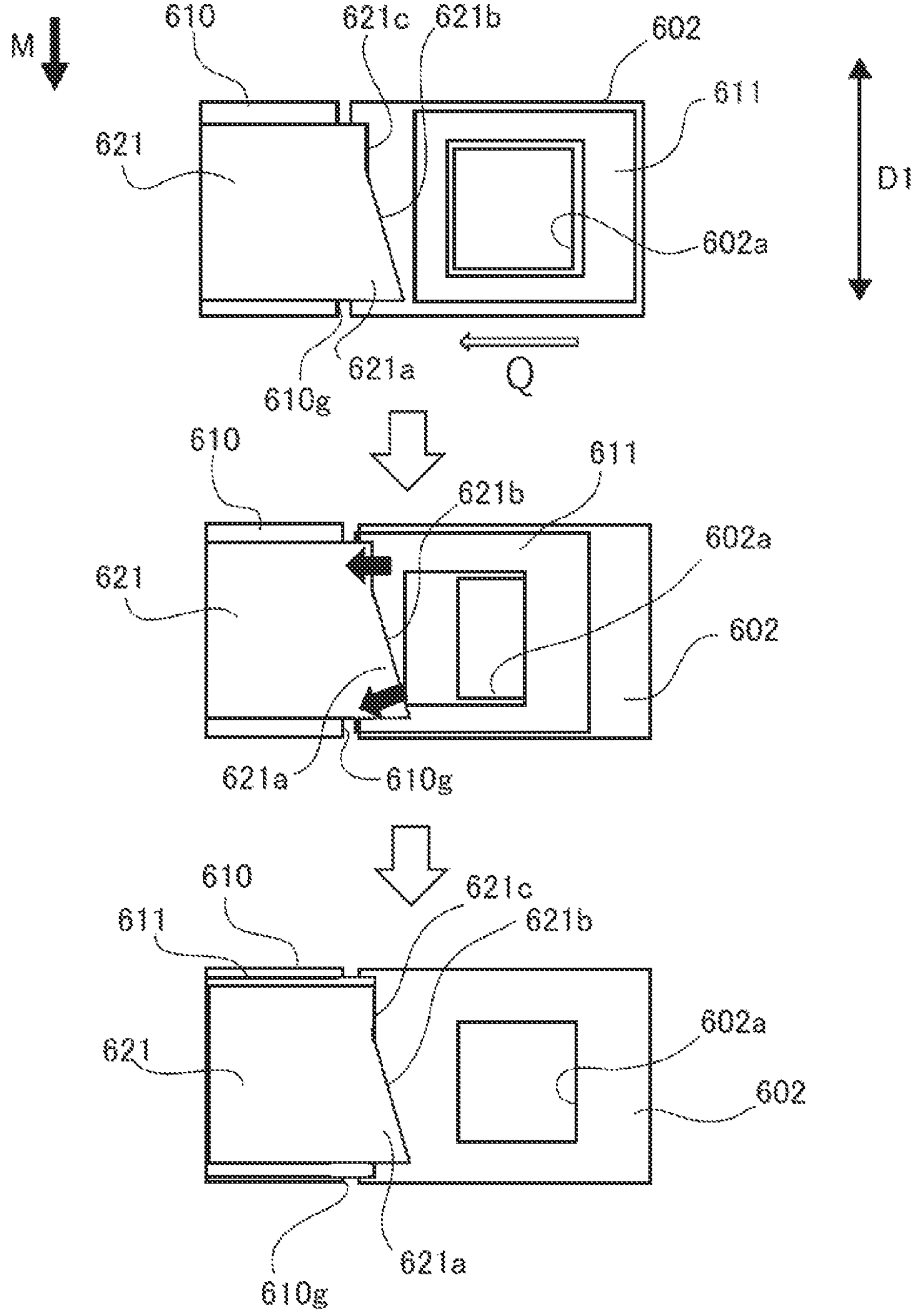
FIG. 62 are views illustrating peripheral portions of the shutter sheet in time series when the apparatus-side shutter is rotated from the open position to the shielding position.

Next, the shutter sheet 621 will be described with reference to FIGS. 55A to 55B, 58A to 58B, and 62. FIG. 62 are views illustrating peripheral portions of the shutter sheet 621 in time series when the apparatus-side shutter 609 (not illustrated in FIG. 62) is rotated from the open position to the shielding position. The shutter sheet 621 as a sheet member is a film having a thickness of about 100 [μm], and is fixed to the cover 610 with a double-sided tape or the like. When the apparatus-side shutter 609 rotates between the shielding position and the open position, the shutter sheet 621 slides against the apparatus-side seal 611 attached to the apparatus-side shutter 609.

Further, in the shutter sheet 621, a leading end portion 621*a* which is an end portion in the circumferential direction around the rotation axis z, that is, in the rotation direction of the apparatus-side shutter 609 (for example, the direction of arrow K in FIGS. 57A to 57B) protrudes in the circumferential direction over the end surface 610*g* of the cover 610. The leading end portion 621*a* of the shutter sheet 621 has an inclined surface 621*b* and a vertical surface 621*c*. The inclined surface 621*b* is inclined with respect to the circumferential direction (directions of arrows K and L) and the axial direction D1 parallel to the rotation axis z. In other words, the inclined surface 621*b* extends in the rotation direction (the directions of arrows K and L) of the apparatus-side shutter 609 as the inclined surface 621*b* extends in the direction of the rotation axis z (axial direction D1). In addition, the vertical surface 621*c* as a surface extends along the mounting direction M and the axial direction D1, preferably parallel to the mounting direction M and the axial direction D1.

As illustrated in FIG. 62, when the apparatus-side shutter 609 (see FIG. 55BA) is rotated from the open position to the shielding position, the apparatus-side seal 611 moves in a direction of arrow Q. Next, the leading end portion 621*a* of the shutter sheet 621 comes into contact with an edge of the apparatus-side seal 611, for example, the edge of the opening portion of the apparatus-side seal 611. At this time, if the leading end portion 621*a* of the shutter sheet 621 is caught by the edge of the apparatus-side seal 611, there is a possibility that the shutter sheet 621 or the apparatus-side seal 611 is bent and deformed, and the sealability may be impaired.

Therefore, by forming the inclined surface 621*b* on the leading end portion 621*a*, it is possible to suppress catching of the shutter sheet 621 on the apparatus-side seal 611. Furthermore, even if a force of catching the shutter sheet 621 from the apparatus-side seal 611 acts on the shutter sheet, a force in a direction of pushing and spreading the shutter sheet 621 outward (a direction of arrow T) is generated. Therefore, deformation of the shutter sheet 621 can be suppressed, so that the sealing property can be maintained.

In addition, the vertical surface 621*c* is also formed in the leading end portion 621*a* continuously with the inclined surface 621*b*. Therefore, even if toner is held in the inclined surface 621*b* when the apparatus-side shutter 609 rotates from the open position to the shielding position, the toner moves along the inclined surface 621*b* and is shaved off on the vertical surface 621*c*. Therefore, it is possible to suppress adhesion of the toner to the leading end portion 621*a* of the shutter sheet 621 and to suppress falling of the toner when the toner pack 460 is removed. In addition, since the inclined surface 621*b* receives a force obliquely with respect to the rotation direction (the direction of arrow Q) of the apparatus-side seal 611, resistance at the time of operating the lever 608 described below can be suppressed, so that operability can be improved.

Mounting of Toner Pack on Mounting Portion

Figure 59A:
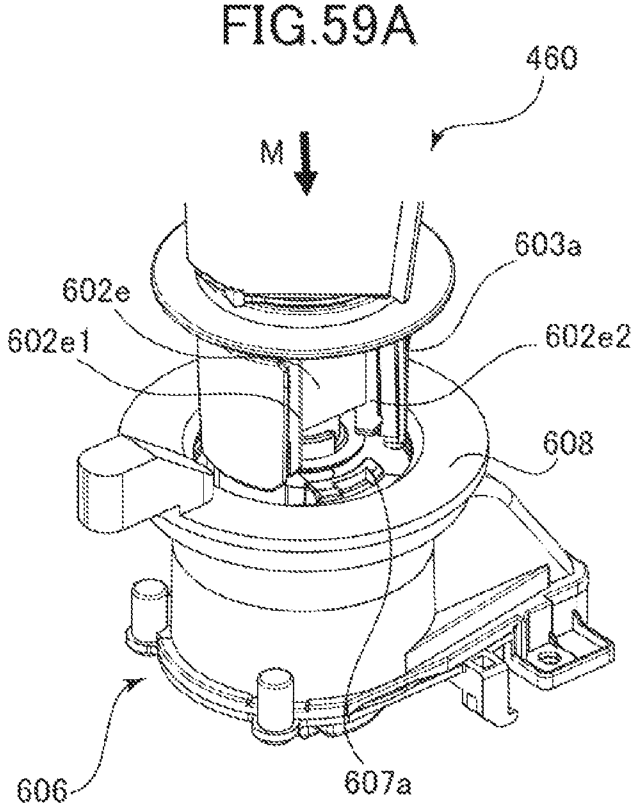
FIG. 59A is a perspective view illustrating a state in which the toner pack is being mounted on the mounting portion.
Figure 59B:
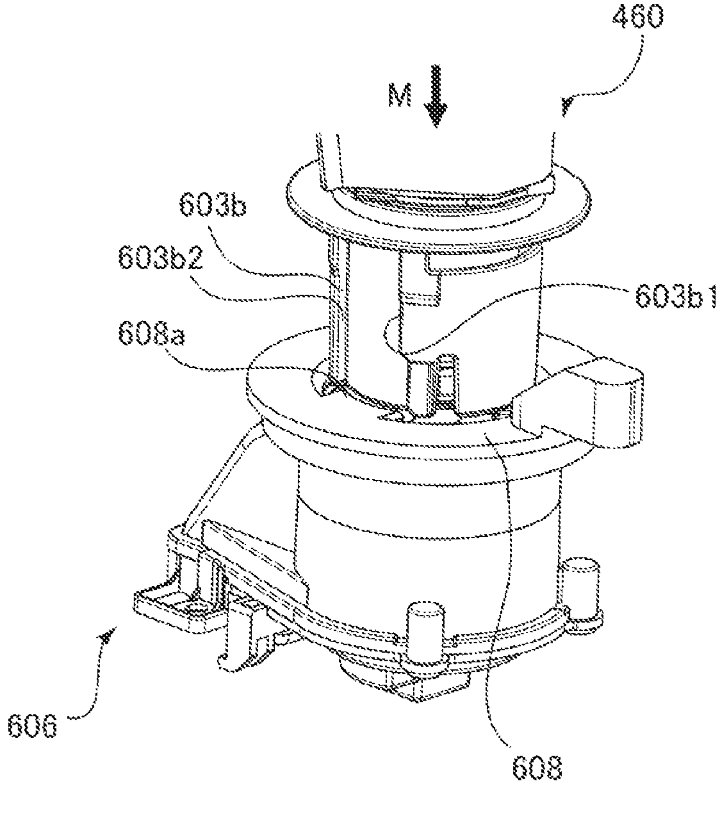
FIG. 59B is a perspective view illustrating a state in which the toner pack is being mounted on the mounting portion as viewed from a direction different from that of FIG. 59A.
Figure 60:
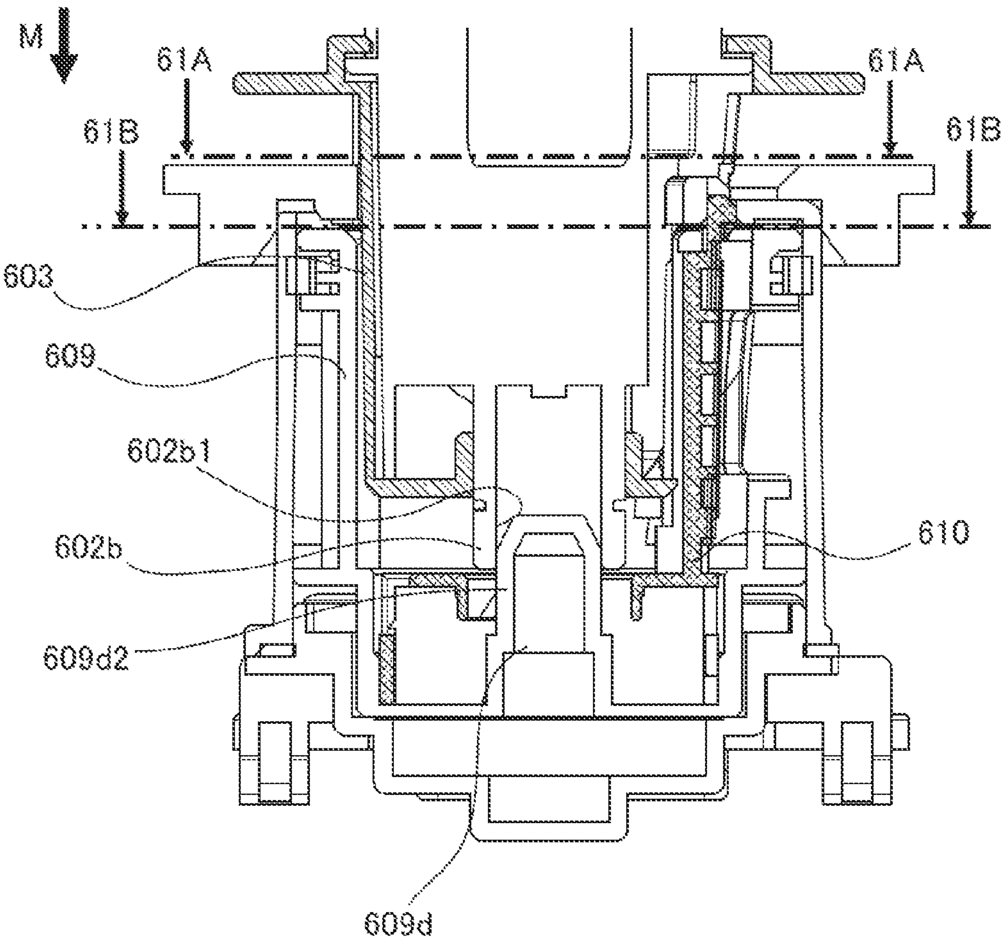
FIG. 60 is a cross-sectional view illustrating a state in which the toner pack is mounted on the mounting portion.
Figure 61A:
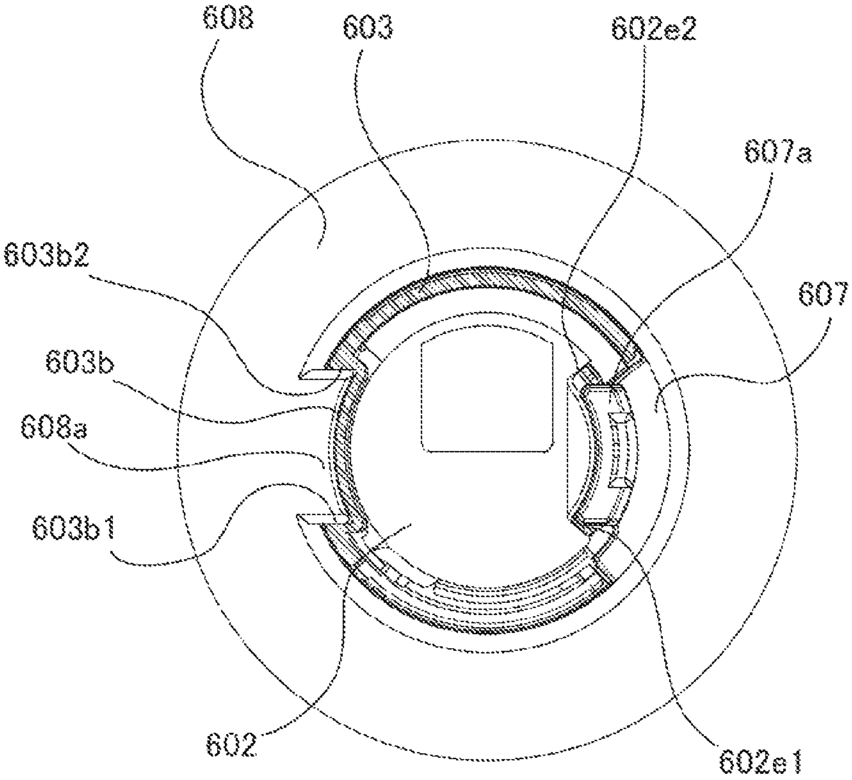
FIG. 61A is a cross-sectional view taken along line 61A-61A in FIG. 60.
Figure 61B:
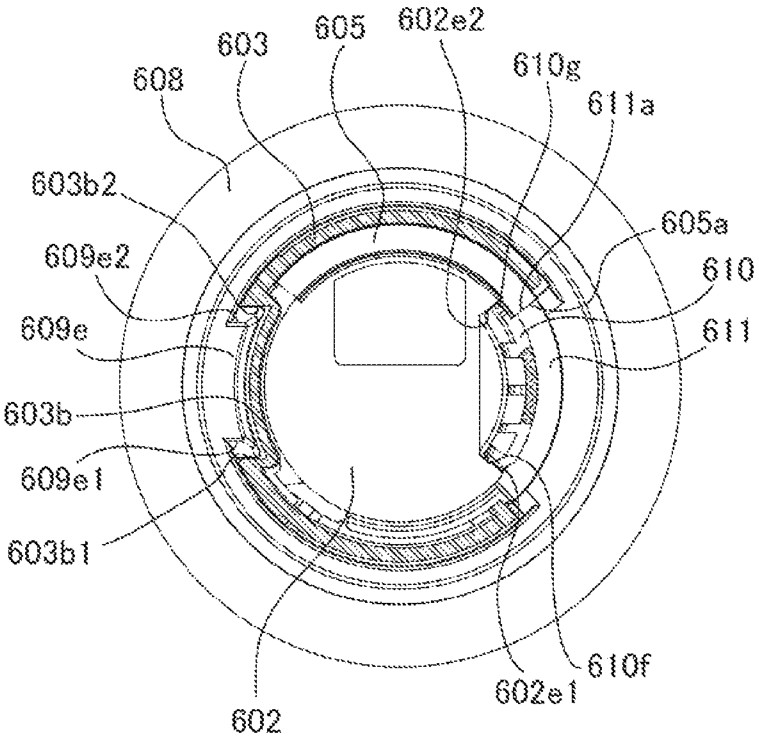
FIG. 61B is a cross-sectional view taken along line 61B-61B in FIG. 60.

Next, a state when the toner pack 460 is mounted on the mounting portion 606 will be described with reference to FIGS. 59A to 61B. FIGS. 59A and 59B are perspective views of a state in which the toner pack 460 is being mounted on the mounting portion 606 as viewed from different angles. FIG. 60 is a cross-sectional view parallel to the rotation axis z in a state where the toner pack 460 is further moved in the mounting direction from the states of FIGS. 59A and 59B. FIG. 61A is a cross-sectional view taken along line 61A-61A in FIG. 60. FIG. 61B is a cross-sectional view taken along line 61B-61B in FIG. 60. Note that, in FIGS. 60 to 61B, the cross sections of the pack-side shutter 603 and the cover 610 are shaded for ease of viewing.

In the following description, as illustrated in FIGS. 59A and 59B, the user moves the toner pack in the state in which the pack-side shutter 603 is at the shielding position in the mounting direction M with respect to the mounting portion 606 in the state in which the apparatus-side shutter 609 is at the shielding position, so as to mount the toner pack 460. At this time, the end surface 611*a* of the apparatus-side seal 611 and the end surface 605*a* of the pack-side seal 605 come into contact with each other in an overlapping state in the circumferential direction, and slide while being deformed in the mounting direction M. That is, the end surface 605*a* of the pack-side seal 605 comes into contact with the end surface 611*a* of the apparatus-side seal 611 in a state where the toner pack 460 is mounted on the main body base portion 2.

Since the end surface 605*a* of the pack-side seal 605 protrudes across the opening 603*a* of the pack-side shutter 603, when the toner pack 460 is mounted on the main body base portion 2, the end surfaces 605*a* and 611*a* come into pressure contact with each other. Therefore, the pack-side seal 605 and the apparatus-side seal 611 are in close contact with each other, and the sealability is improved, so that toner leakage can be reduced. In addition, since the end surfaces 605*a* and 611*a* extend in the rotation direction (the directions of arrows K and L) of the pack-side shutter 603 as the end surfaces 605*a* and 611*a* extend in the direction of the rotation axis z (axial direction D1), resistance during mounting the toner pack 460 on the mounting portion 606 can be reduced. Therefore, the toner pack 460 can be smoothly mounted on the mounting portion 606, so that operability can be improved.

The user aligns the concave portion 602*e* of the nozzle 6502 and the opening 603*a* of the pack-side shutter 603 with the positioning portion 607*a* of the first frame body 607. At the same time, the user also aligns a driven transmission portion 603*b* of the pack-side shutter 603 with the drive transmission portion 608*a* of the lever 608.

After such alignments of the toner pack 460 and the mounting portion 606, the user moves the toner pack 460 in the mounting direction M so as to mount the toner pack 460 on the mounting portion 606. Consequently, as shown in FIG. 60, a small diameter portion 609*d*2 of the center boss 609*d* of the apparatus-side shutter 609 is fitted to an inner peripheral surface 602*b*1 of a protruding portion 602*b* of nozzle 6502. As a result, the position of the nozzle 6502 in the radial direction with respect to the apparatus-side shutter 609 is determined. In addition, the leading end portion of the protruding portion 602*b* of the nozzle 6502 abuts against the pack abutment surface 609*g* of the apparatus-side shutter 609, so that the position of the toner pack 460 in the mounting direction M is determined.

At this time, as illustrated in FIG. 61B, end surfaces 610*f* and 610*g* of the cover 610 approach or engage with surfaces 602*e*1 and 602*e*2 forming the concave portion 602*e* of the nozzle 6502. As illustrated in FIGS. 61A and 61B, the driven transmission portion 603*b* of the pack-side shutter 603 engages with the driven transmission portion 609*e* of the apparatus-side shutter 609 and the drive transmission portion 608*a* of the lever 608. As a result, the rotation axis z of the pack-side shutter 603 and the rotation axis z of the apparatus-side shutter 609 are substantially coaxial. Further, since the surfaces 602*e*1 and 602*e*2 of the concave portion 602*e* of the nozzle 6502 are engaged with the end surfaces 610*f* and 610*g* of the cover 610 respectively, the nozzle 6502 of the toner pack 460 does not rotate with respect to the main body base portion 2 including the cover 610. In other words, when the toner pack 460 is mounted on the image forming apparatus 1, the concave portion 602*e* as an engaging portion is engaged with the cover 610 as the engaged portion of the image forming apparatus 1 to thereby restrict the rotation of the nozzle 6502 with respect to the image forming apparatus 1.

The lever 608, the pack-side shutter 603, and the apparatus-side shutter 609 are substantially integrally rotatable about the rotation axis z with respect to the main body base portion 2 and the nozzle 6502.

For example, when the lever 608 is rotated from the closed position to the open position, the drive transmission portion 608*a* as a second engaging portion of the lever 608 presses a surface 603*b*1 as a first engaged portion of the pack-side shutter 603. As a result, the pack-side shutter 603 is rotated together with the lever 608 from the shielding position to the open position. Further, a surface 603*b*2 as a first engaging portion of the pack-side shutter 603 rotated from the shielding position to the open position presses a surface 609*e*2 as a second engaged portion of the apparatus-side shutter 609. As a result, the apparatus-side shutter 609 is rotated together with the pack-side shutter 603 from the shielding position to the open position.

Conversely, when the lever 608 is rotated from the open position to the closed position, the drive transmission portion 608*a* of the lever 608 presses the surface 603*b*2 of the pack-side shutter 603. As a result, the pack-side shutter 603 is rotated together with the lever 608 from the open position to the shielding position. In addition, the surface 603*b*1 of the pack-side shutter 603 rotated from the open position to the shielding position presses a surface 609*e*1 of the driven transmission portion 609*e* of the apparatus-side shutter 609. As a result, the apparatus-side shutter 609 is rotated together with the pack-side shutter 603 from the open position to the shielding position.

In this manner, by operating the lever 608, the pack-side shutter 603 and the apparatus-side shutter 609 can be rotated between the shielding position and the open position, and toner can be replenished from the toner pack 460 to the developing container 32. When the toner replenishing from the toner pack 460 to the developing container 32 is completed, the user rotates the lever 608 from the open position to the closed position, and pulls out the toner pack 460 from the mounting portion 606.

When the pack-side shutter 603 and the apparatus-side shutter 609 rotate, the end surface 611*a* of the apparatus-side seal 611 and the end surface 605*a* of the pack-side seal 605 are in close contact with each other, and no gap is formed, so that entry of toner can be suppressed.

Groove of Pack-Side Shutter

As illustrated in FIG. 53A, the pack-side shutter 603 is formed with a groove 603*h* extending in the circumferential direction, that is, in the rotation direction of the pack-side shutter 603 (the directions of arrows K and L (see FIG. 52 A)). As described above, when the toner pack 460 is mounted on the mounting portion 606 and the lever 608 is rotated from the closed position illustrated in FIG. 55A to the open position illustrated in FIG. 55B, the drive transmission portion 608*a* of the lever 608 enters the groove 603*h* of the pack-side shutter 603. In a state where the drive transmission portion 608*a* enters the groove 603*h*, the drive transmission portion 608*a* is prevented from being caught by the toner pack 460, and the toner pack 460 is prevented from being pulled out from the mounting portion 606.

Therefore, when toner starts to be replenished from the toner pack 460 to the developing container 32, the toner pack 460 is prevented from moving from the mounting portion 606 in a direction opposite to the mounting direction M, so that the toner can be prevented from leaking to the outside of the image forming apparatus 1.

As illustrated in FIG. 53A, a tapered portion 603*i* having a tapered shape inclined with respect to the circumferential direction and the axial direction D1 is formed at an inlet portion of the groove 603*h*. In other words, the tapered portion 603*i* extends in the rotation direction (the directions of arrows K and L) of the pack-side shutter 603 as the tapered portion 603*i* extends in the direction of the rotation axis z (the axial direction D1). When the toner pack 460 is mounted on the mounting portion 606, the tapered portion 603*i* allows the drive transmission portion 608*a* to be easily inserted into the groove 603*h* even if the toner pack 460 is slightly displaced in the mounting direction M. In addition, in a case where the rotational movement of the lever 608 to the closed position is insufficient when the toner pack 460 is pulled out from the mounting portion 606, the drive transmission portion 608*a* of the lever 608 abuts on the tapered portion 603*i*. When the toner pack 460 is pulled out from the mounting portion 606 in this state, the drive transmission portion 608*a* is pressed by the tapered portion 603*i*, whereby the lever 608 rotates to the closed position, and the lever 608 can be returned to the correct position.

As described above, by providing the groove 603*h* and the tapered portion 603*i* in the pack-side shutter 603, it is possible to prevent the toner pack 460 from coming off, to facilitate the rotation operation of the lever 608, and further to return the lever 608 to the correct shielding position. In addition, even when the toner pack 460 is mounted on the mounting portion 606 again, it is possible to improve the operability such that interference of components or the like does not occur.

Note that the first to sixth embodiments described above may be arbitrarily combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A toner container mountable to and dismountable from an image forming apparatus, the image forming apparatus including an engaged portion, the toner container comprising:

a toner storage unit configured to store toner;

a container base portion provided with a discharge port through which the toner is discharged to outside of the toner container, the discharge port being provided on an outer surface of the container base portion extending in a first direction in which the toner storage unit and the container base portion are aligned, the discharge port communicating with an inside of the toner storage unit; and a container shutter configured to be rotatable with respect to the container base portion, about a rotation axis extending in the first direction, between a shielding position where the container shutter shields the discharge port and an open position where the container shutter opens the discharge port, the container shutter having a cylindrical shape and a circumferential surface that extends in a direction of the rotation axis and which is provided with a shutter opening from which the discharge port is exposed to outside of the toner container when the container shutter is in the open position, wherein the container base portion includes an engaging portion configured to be engaged with the engaged portion of the image forming apparatus in a case where the toner container is mounted to the image forming apparatus so that rotation of the container base portion with respect to the image forming apparatus about the rotation axis is restricted, and wherein at least a part of the engaging portion of the container base portion is exposed from the shutter opening of the container shutter when the container shutter is in the shielding position.

2. The toner container according to claim 1, wherein the container shutter is provided outside the container base portion in a radial direction of a virtual circle centered on the rotation axis, and wherein the engaging portion of the container base portion is provided at a position different from the discharge port in a rotation direction of the container shutter and closer to the rotation axis than the outer surface of the container base portion is to the rotation axis in the radial direction.

3. The toner container according to claim 1, wherein the toner container is configured to be mountable to the image forming apparatus such that a direction of the rotation axis is a direction along a gravity direction.

4. An image forming system comprising:

an apparatus main body; and a toner container mountable on the apparatus main body, wherein the toner container includes:

a first toner storage unit configured to store a toner;

a container base portion provided with a discharge port through which the toner stored in the first toner storage unit is discharged to outside of the toner container; and a first shutter configured to rotate about a rotation axis with respect to the container base portion between a first open position where the first shutter opens the discharge port and a first shielding position where the first shutter shields the discharge port, the first shutter including a first engaging portion and a first engaged portion, wherein the apparatus main body includes:

a main body base portion to which the toner container is detachably mounted, the main body base portion being provided with a receiving port through which the toner is received from the toner container;

a second toner storage unit configured to store the toner received from the receiving port;

a second shutter configured to rotate about the rotation axis with respect to the main body base portion between a second open position where the second shutter opens the receiving port and a second shielding position where the second shutter shields the receiving port, the second shutter including a second engaged portion; and an operation lever configured to be operated to rotate about the rotation axis with respect to the main body base portion, the operation lever including a second engaging portion, and wherein, in a state where the toner container is mounted to the main body base portion, (i) the second engaging portion of the operation lever engages with the first engaged portion of the first shutter such that the first shutter is rotated together with the operation lever, and (ii) the first engaging portion of the first shutter engages with a second engaged portion of the second shutter such that the second shutter is rotated together with the first shutter.

5. The image forming system according to claim 4, wherein the container base portion of the toner container includes a third engaging portion, and wherein the main body base portion includes a third engaged portion configured to engage with the third engaging portion such that rotation of the container base portion with respect to the main body base portion is restricted in a state where the toner container is mounted to the main body base portion.

6. The image forming system according to claim 4, wherein the toner container includes a first seal member that is provided on the first shutter and seals between the first shutter positioned in the first shielding position and the container base portion, wherein the second shutter includes a communication port that does not communicate with the receiving port in a case where the second shutter is in the second shielding position, and communicates with the receiving port in a case where the second shutter is in the second open position, wherein the apparatus main body includes a second seal member that is provided on the second shutter so as to surround a periphery of the communication port and seals between the second shutter positioned in the second open position and the main body base portion, and wherein an end surface of the first seal member in a rotation direction of the first shutter comes into contact with an end surface of the second seal member in the rotation direction in a state where the toner container is mounted to the main body base portion.

7. The image forming system according to claim 6, wherein the first shutter has a cylindrical shape and a circumferential surface extending in a direction of the rotation axis, the circumferential surface being provided with a shutter opening from which the discharge port is exposed, with the shutter opening allowing discharge of the toner from the toner container to the apparatus main body when the first shutter is in the first open position, and wherein the first seal member is provided such that the end surface of the first seal member is exposed from the shutter opening.

8. The image forming system according to claim 6, wherein the end surface of the first seal member and the end surface of the second seal member each extend in the rotation direction as the end surface of the first seal member and the end surface of the second seal member each extend in the direction of the rotation axis, and the end surface of the first seal member and the end surface of the second seal member are in pressure contact with each other when the toner container is mounted to the main body base portion.

9. The image forming system according to claim 6, wherein the main body base portion further includes a sheet member that slides against the second seal member when the second shutter is rotated between the second open position and the second shielding position, and wherein the sheet member includes an inclined surface provided on an end portion of the sheet member in the rotation direction, the inclined surface extending in the rotation direction as the inclined surface extends in the direction of the rotation axis.

10. The image forming system according to claim 9, wherein the end portion of the sheet member includes a surface formed so as to be continuous with the inclined surface and extending in the direction of the rotation axis.

11. The image forming system according to claim 4, wherein the first shutter includes a groove extending in a rotation direction of the first shutter, and wherein the groove prevents the toner container from being pulled out from the main body base portion in a case where the toner container is mounted to the main body base portion and where the operation lever is rotated such that the second engaging portion of the operation lever enters the groove.

12. The image forming system according to claim 11, wherein the groove includes a tapered portion that is capable of coming into contact with the second engaging portion in a case where the toner container is pulled out from the main body base portion, the tapered portion extending in the rotation direction as the tapered portion extends in a direction of the rotation axis.

13. The image forming system according to claim 4, wherein the first toner storage unit is a bag having flexibility and having one end opened, and wherein the container base portion includes a cylindrical member formed in a cylindrical shape and fixed to the one end of the first toner storage unit, and a base member detachably connected to the cylindrical member, the base member including the discharge port.

14. The image forming system according to claim 13, wherein a connecting portion, of the cylindrical member, is connected to the base member and has a hole having an area larger than that of the discharge port.

15. The toner container according to claim 1, wherein the toner container includes a seal member provided on the container shutter so as to seal between the container shutter and the container base portion in a case where the container shutter is in the shielding position, and wherein the seal member is provided such that an end surface, in a rotation direction of the container shutter, of the seal member is exposed from the shutter opening.

16. The toner container according to claim 1, wherein the toner storage unit is a bag.

17. The image forming system according to claim 5, wherein the discharge port is provided on an outer, surface of the container base portion, and extends in a direction of the rotation axis.

18. The image forming system according to claim 17, wherein the first shutter is provided outside the container base portion in a radial direction of a virtual circle centered on the rotation axis, and wherein the third engaging portion of the container base portion is provided at a position different from the discharge port in a rotation direction of the first shutter and at a position closer to the rotation axis than the outer surface is to the rotation axis in the radial direction.

19. The image forming system according to claim 5, wherein the first shutter has a cylindrical shape and a circumferential surface which extends in a direction of the rotation axis and which is provided with a shutter opening from which the discharge port is exposed when the first shutter is in the first open position, and wherein at least a part of the third engaging portion of the container base portion is exposed from the shutter opening of the first shutter in a case where the first shutter is in the first shielding position.

20. The image forming system according to claim 4, wherein the first shutter is rotated from the first shielding position to the first open position and the second shutter is rotated from the second shielding position to the second open position due to a rotation of the operation lever.

* * * * *